US012236743B2

(12) United States Patent
Nguyen

(10) Patent No.: US 12,236,743 B2
(45) Date of Patent: Feb. 25, 2025

(54) METHOD AND SYSTEM FOR TRANSFERRING VALUE FOR WAGERING USING A PORTABLE ELECTRONIC DEVICE

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 0 days.

(21) Appl. No.: 16/219,940

(22) Filed: Dec. 13, 2018

(65) Prior Publication Data

US 2019/0122490 A1 Apr. 25, 2019

Related U.S. Application Data

(63) Continuation of application No. 13/622,702, filed on Sep. 19, 2012, now Pat. No. 12,100,260, which is a continuation-in-part of application No. 12/945,888, filed on Nov. 14, 2010, now Pat. No. 10,052,551.

(51) Int. Cl.
*G07F 17/32* (2006.01)

(52) U.S. Cl.
CPC ...... *G07F 17/3223* (2013.01); *G07F 17/3204* (2013.01); *G07F 17/3237* (2013.01); *G07F 17/3241* (2013.01); *G07F 17/3244* (2013.01)

(58) Field of Classification Search
CPC ............ G07F 17/3223; G07F 17/3204; G07F 17/3237; G07F 17/3241; G07F 17/3244
See application file for complete search history.

(56) References Cited

U.S. PATENT DOCUMENTS

| | | | |
|---|---|---|---|
| 2,033,638 | A | 3/1936 | Koppl |
| 2,062,923 | A | 12/1936 | Nagy |
| 4,741,539 | A | 5/1988 | Sutton et al. |
| 4,948,138 | A | 8/1990 | Pease et al. |
| 4,969,183 | A | 11/1990 | Reese |
| 5,067,712 | A | 11/1991 | Georgilas |
| 5,275,400 | A | 1/1994 | Weingardt |
| 5,429,361 | A | 7/1995 | Raven et al. |
| 5,489,103 | A | 2/1996 | Okamoto |
| 5,618,232 | A | 4/1997 | Martin |
| 5,630,757 | A | 5/1997 | Gagin |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Office Action for U.S. Appl. No. 13/622,702, mailed Jun. 22, 2020.

(Continued)

*Primary Examiner* — Werner G Garner
(74) *Attorney, Agent, or Firm* — McAndrews, Held & Malloy, Ltd.

(57) ABSTRACT

A system, apparatus, and method for electronically transferring value using a portable electronic device. In one embodiment, a method for transferring funds to or from play a portable electronic device to facilitate playing a game of chance on a portable electronic device.

20 Claims, 27 Drawing Sheets

(56) References Cited

U.S. PATENT DOCUMENTS 5,655,961 A 8/1997 Acres et al.
5,704,835 A 1/1998 Dietz, II
5,727,786 A 3/1998 Weingardt
5,833,537 A 11/1998 Barrie
5,842,921 A 12/1998 Mindes
5,919,091 A 7/1999 Bell et al.
5,947,820 A 9/1999 Morro et al.
5,997,401 A 12/1999 Crawford
6,001,016 A 12/1999 Walker et al.
6,039,648 A 3/2000 Guinn et al.
6,059,289 A 5/2000 Vancura
6,089,977 A 7/2000 Bennett
6,095,920 A 8/2000 Sudahiro
6,110,041 A 8/2000 Walker et al.
6,142,872 A 11/2000 Walker et al.
6,146,271 A 11/2000 Kadlic
6,146,273 A 11/2000 Olsen
6,165,071 A 12/2000 Weiss
6,231,445 B1 5/2001 Acres
6,244,958 B1 6/2001 Acres
6,270,412 B1 8/2001 Crawford et al.
6,290,600 B1 9/2001 Glasson
6,293,866 B1 9/2001 Walker et al.
6,353,390 B1 3/2002 Beri et al.
6,364,768 B1 4/2002 Acres et al.
6,404,884 B1 6/2002 Marwell et al.
6,416,406 B1 7/2002 Duhamel
6,416,409 B1 7/2002 Jordan
6,443,452 B1 9/2002 Brune
6,491,584 B2 12/2002 Graham et al.
6,500,067 B1 12/2002 Luciano
6,505,095 B1 1/2003 Kolls
6,508,710 B1 1/2003 Paravia et al.
6,561,900 B1 5/2003 Baerlocker et al.
6,592,457 B1 7/2003 Frohm et al.
6,612,574 B1 9/2003 Cole et al.
6,620,046 B2 9/2003 Rowe
6,641,477 B1 11/2003 Dietz, II
6,645,078 B1 11/2003 Mattice
6,675,152 B1 1/2004 Prasad
6,699,128 B1 3/2004 Beadell
6,719,630 B1 4/2004 Seelig et al.
6,749,510 B2 6/2004 Globbi
6,758,757 B2 7/2004 Luciano, Jr. et al.
6,773,345 B2 8/2004 Walker et al.
6,778,820 B2 8/2004 Tendler
6,780,111 B2 8/2004 Cannon et al.
6,799,032 B2 9/2004 McDonnell et al.
6,800,027 B2 10/2004 Giobbi et al.
6,804,763 B1 10/2004 Stockdale et al.
6,811,486 B1 11/2004 Luciano, Jr.
6,843,725 B2 1/2005 Nelson
6,846,238 B2 1/2005 Wells
6,848,995 B1 2/2005 Walker et al.
6,852,029 B2 2/2005 Baltz et al.
6,869,361 B2 3/2005 Sharpless et al.
6,875,106 B2 4/2005 Weiss et al.
6,884,170 B2 4/2005 Rowe
6,884,172 B1 4/2005 Lloyd et al.
6,902,484 B2 6/2005 Idaka
6,908,390 B2 6/2005 Nguyen et al.
6,913,532 B2 7/2005 Bearlocher et al.
6,923,721 B2 8/2005 Luciano et al.
6,935,958 B2 8/2005 Nelson
6,949,022 B1 9/2005 Showers et al.
6,955,600 B2 10/2005 Glavich et al.
6,971,956 B2 12/2005 Rowe et al.
6,984,174 B2 1/2006 Cannon et al.
6,997,803 B2 2/2006 LeMay et al.
7,018,292 B2 3/2006 Tracy et al.
7,032,115 B2 4/2006 Kashani
7,033,276 B2 4/2006 Walker et al.
7,035,626 B1 4/2006 Luciano
7,037,195 B2 5/2006 Schneider et al.
7,048,628 B2 5/2006 Schneider
7,048,630 B2 5/2006 Berg et al.
7,063,617 B2 6/2006 Brosnan et al.
7,076,329 B1 7/2006 Kolls
7,089,264 B1 8/2006 Guido et al.
7,094,148 B2 8/2006 Bearlocher et al.
7,105,736 B2 9/2006 Laakso
7,111,141 B2 9/2006 Nelson
7,144,321 B2 12/2006 Mayeroff
7,152,783 B2 12/2006 Charrin
7,169,041 B2 1/2007 Tessmer et al.
7,169,052 B2 1/2007 Beaulieu et al.
7,175,523 B2 2/2007 Gilmore et al.
7,181,228 B2 2/2007 Boesch
7,182,690 B2 2/2007 Giobbi et al.
7,198,571 B2 4/2007 LeMay
RE39,644 E 5/2007 Alcorn et al.
7,217,191 B2 5/2007 Allen et al.
7,243,104 B2 7/2007 Bill
7,247,098 B1 7/2007 Bradford et al.
7,259,718 B2 8/2007 Patterson et al.
7,275,989 B2 10/2007 Moody
7,285,047 B2 10/2007 Gielb et al.
7,311,608 B1 12/2007 Danieli
7,314,408 B2 1/2008 Cannon et al.
7,316,615 B2 1/2008 Soltys et al.
7,316,619 B2 1/2008 Nelson
7,318,775 B2 1/2008 Brosnan et al.
7,326,116 B2 2/2008 O'Donovan et al.
7,330,108 B2 2/2008 Thomas
7,346,358 B2 3/2008 Wood et al.
7,355,112 B2 4/2008 Laakso
7,384,338 B2 6/2008 Rothschild et al.
7,387,571 B2 6/2008 Walker et al.
7,393,278 B2 7/2008 Gerson et al.
7,396,990 B2 7/2008 Lu et al.
7,415,426 B2 8/2008 Williams et al.
7,425,177 B2 9/2008 Rodgers et al.
7,427,234 B2 9/2008 Soltys et al.
7,427,236 B2 9/2008 Kaminkow et al.
7,427,708 B2 9/2008 Ohmura
7,431,650 B2 10/2008 Kessman
7,448,949 B2 11/2008 Kaminkow et al.
7,500,913 B2 3/2009 Baerlocher
7,510,474 B2 3/2009 Carter
7,513,828 B2 4/2009 Nguyen et al.
7,519,838 B1 4/2009 Suurballe
7,559,838 B2 7/2009 Walker et al.
7,563,167 B2 7/2009 Walker et al.
7,572,183 B2 8/2009 Olivas et al.
7,585,222 B2 9/2009 Muir
7,602,298 B2 10/2009 Thomas
7,607,174 B1 10/2009 Kashchenko et al.
7,611,409 B2 11/2009 Muir et al.
7,637,810 B2 12/2009 Amaitis et al.
7,644,861 B2 1/2010 Alderucci et al.
7,653,757 B1 1/2010 Fernald et al.
7,693,306 B2 4/2010 Huber
7,699,703 B2 4/2010 Muir et al.
7,722,453 B2 5/2010 Lark et al.
7,742,996 B1 * 6/2010 Kwan .................... G06Q 30/06 705/72
7,758,423 B2 7/2010 Foster et al.
7,771,271 B2 8/2010 Walker et al.
7,780,529 B2 8/2010 Rowe et al.
7,780,531 B2 8/2010 Englman et al.
7,785,192 B2 8/2010 Canterbury et al.
7,811,172 B2 10/2010 Asher et al.
7,819,749 B1 10/2010 Fish
7,822,688 B2 10/2010 Labron
7,828,652 B2 11/2010 Nguyen et al.
7,828,654 B2 11/2010 Carter
7,828,661 B1 11/2010 Fish
7,850,528 B2 12/2010 Wells
7,874,919 B2 1/2011 Paulsen et al.
7,877,798 B2 1/2011 Saunders et al.
7,883,413 B2 2/2011 Paulsen
7,892,097 B2 2/2011 Muir et al.
7,909,692 B2 3/2011 Nguyen et al.
7,909,699 B2 3/2011 Parrott et al.

(56) References Cited

U.S. PATENT DOCUMENTS 7,918,728 B2 4/2011 Nguyen et al.
7,927,211 B2 4/2011 Rowe et al.
7,927,212 B2 4/2011 Hedrick et al.
7,951,008 B2 5/2011 Wolf et al.
8,057,298 B2 11/2011 Nguyen et al.
8,057,303 B2 11/2011 Rasmussen
8,087,988 B2 1/2012 Nguyen et al.
8,117,608 B1 2/2012 Slettehaugh et al.
8,133,113 B2 3/2012 Nguyen
8,182,326 B2 5/2012 Speers et al.
8,210,927 B2 7/2012 Hedrick
8,221,245 B2 7/2012 Walker
8,226,459 B2 7/2012 Barrett
8,226,474 B2 7/2012 Nguyen et al.
8,231,456 B2 7/2012 Zielinski
8,235,803 B2 8/2012 Loose et al.
8,276,010 B2 9/2012 Vavilala
8,282,475 B2 10/2012 Nguyen et al.
8,323,099 B2 12/2012 Durham et al.
8,337,290 B2 12/2012 Nguyen et al.
8,342,946 B2 1/2013 Amaitis
8,393,948 B2 3/2013 Allen et al.
8,403,758 B2 3/2013 Hornik et al.
8,430,745 B2 4/2013 Agarwal et al.
8,461,958 B2 6/2013 Saenz
8,465,368 B2 6/2013 Hardy et al.
8,469,813 B2 6/2013 Joshi
8,529,345 B2 9/2013 Nguyen
8,597,108 B2 12/2013 Nguyen
8,602,875 B2 12/2013 Nguyen
8,613,655 B2 12/2013 Kisenwether et al.
8,613,659 B2 12/2013 Nelson et al.
8,678,901 B1 3/2014 Kelly
8,696,470 B2 4/2014 Nguyen
8,745,417 B2 6/2014 Huang et al.
8,821,255 B1 9/2014 Friedman
8,834,254 B2 9/2014 Buchholz
8,858,323 B2 10/2014 Nguyen et al.
8,864,586 B2 10/2014 Nguyen
8,942,995 B1 1/2015 Kerr
9,039,507 B2 5/2015 Allen et al.
9,235,952 B2 1/2016 Nguyen
9,292,996 B2 3/2016 Davis et al.
9,325,203 B2 4/2016 Nguyen
9,466,171 B2 10/2016 Hornik
9,483,901 B2 11/2016 Nguyen
9,486,697 B2 11/2016 Nguyen
9,486,704 B2 11/2016 Nguyen
9,530,277 B2 12/2016 Nelson
9,576,425 B2 2/2017 Nguyen
9,626,826 B2 4/2017 Nguyen
9,666,015 B2 5/2017 Acres
9,666,021 B2 5/2017 Nguyen
9,672,686 B2 6/2017 Nguyen
9,741,205 B2 8/2017 Nguyen
9,811,973 B2 11/2017 Nguyen
9,814,970 B2 11/2017 Nguyen
9,842,462 B2 12/2017 Nguyen
9,875,606 B2 1/2018 Nguyen
9,875,609 B2 1/2018 Nguyen
9,981,180 B2 5/2018 Koyanagi et al.
10,068,429 B2 9/2018 Gagner
10,115,270 B2 10/2018 Gagner
10,140,816 B2 11/2018 Nguyen
10,325,447 B2 6/2019 Malek
10,421,010 B2 9/2019 Nguyen
10,438,446 B2 10/2019 Nguyen
10,445,978 B2 10/2019 Nguyen
10,818,133 B2 10/2020 Nguyen
2001/0004607 A1 6/2001 Olsen
2001/0016516 A1 8/2001 Takatsuka
2001/0024971 A1 9/2001 Brossard
2001/0025272 A1* 9/2001 Mori .................... G06K 19/14 705/76
2001/0031659 A1* 10/2001 Perrie .................. A63F 3/0645 463/18
2001/0047291 A1 11/2001 Garahi
2002/0006822 A1 1/2002 Krintzman
2002/0042295 A1 4/2002 Walker et al.
2002/0043759 A1 4/2002 Vancura
2002/0045474 A1 4/2002 Singer
2002/0107065 A1 8/2002 Rowe
2002/0107799 A1 8/2002 Hoshino
2002/0111210 A1 8/2002 Luciano, Jr. et al.
2002/0111213 A1 8/2002 McEntee et al.
2002/0113369 A1 8/2002 Weingardt
2002/0116615 A1 8/2002 Nguyen et al.
2002/0133418 A1 9/2002 Hammond et al.
2002/0137217 A1 9/2002 Rowe et al.
2002/0142825 A1 10/2002 Lark et al.
2002/0145051 A1 10/2002 Charrin
2002/0147047 A1 10/2002 Letovsky et al.
2002/0147049 A1 10/2002 Carter, Sr.
2002/0151366 A1 10/2002 Walker et al.
2002/0152120 A1 10/2002 Howington
2002/0167536 A1 11/2002 Valdes et al.
2002/0177483 A1 11/2002 Cannon
2002/0183105 A1 12/2002 Cannon et al.
2003/0001338 A1 1/2003 Bennett et al.
2003/0003996 A1 1/2003 Nguyen
2003/0004871 A1 1/2003 Rowe
2003/0008696 A1 1/2003 Abecassis et al.
2003/0013531 A1 1/2003 Rowe
2003/0027635 A1 2/2003 Walker et al.
2003/0064805 A1 4/2003 Wells
2003/0064807 A1 4/2003 Walker et al.
2003/0078094 A1 4/2003 Gatto
2003/0092480 A1 5/2003 White et al.
2003/0100361 A1 5/2003 Sharpless et al.
2003/0103965 A1 6/2003 Jung
2003/0104860 A1 6/2003 Cannon et al.
2003/0104865 A1 6/2003 Itkis et al.
2003/0119579 A1* 6/2003 Walker ................ G07F 17/3244 463/20
2003/0125100 A1* 7/2003 Cannon .................. G07F 17/32 463/16
2003/0148809 A1 8/2003 Nelson
2003/0162588 A1 8/2003 Brosnan et al.
2003/0195024 A1 10/2003 Slattery
2003/0199295 A1 10/2003 Vancura
2003/0224852 A1 12/2003 Walker et al.
2003/0224854 A1 12/2003 Joao
2004/0002386 A1 1/2004 Wolfe et al.
2004/0005919 A1 1/2004 Walker et al.
2004/0023709 A1 2/2004 Beaulieu et al.
2004/0023716 A1 2/2004 Gauselmann
2004/0038736 A1 2/2004 Bryant
2004/0048650 A1 3/2004 Mierau et al.
2004/0068460 A1 4/2004 Feeley
2004/0082384 A1* 4/2004 Walker ................ G07F 17/3239 463/40
2004/0082385 A1 4/2004 Silva et al.
2004/0094624 A1* 5/2004 Fernandes ............. G07F 7/0866 235/449
2004/0106449 A1 6/2004 Walker et al.
2004/0127277 A1 7/2004 Walker
2004/0127290 A1 7/2004 Walker et al.
2004/0137987 A1 7/2004 Nguyen et al.
2004/0142744 A1* 7/2004 Atkinson ............ H04L 63/0428 463/29
2004/0147308 A1 7/2004 Walker et al.
2004/0152508 A1 8/2004 Lind
2004/0199631 A1 10/2004 Natsume
2004/0214622 A1 10/2004 Atkinson
2004/0224753 A1 11/2004 Odonovan et al.
2004/0229671 A1 11/2004 Stronach
2004/0256803 A1 12/2004 Ko
2004/0259633 A1 12/2004 Gentles et al.
2005/0003890 A1 1/2005 Hedrick et al.
2005/0004980 A1 1/2005 Vadjinia
2005/0026696 A1 2/2005 Hashimoto et al.
2005/0033651 A1 2/2005 Kogan

(56) References Cited

U.S. PATENT DOCUMENTS

| | | | | |
|---|---|---|---|---|
| 2005/0043996 | A1* | 2/2005 | Silver | G06Q 20/20 705/15 |
| 2005/0049037 | A1 | 3/2005 | Anderson | |
| 2005/0054446 | A1 | 3/2005 | Kammler | |
| 2005/0101376 | A1 | 5/2005 | Walker et al. | |
| 2005/0101383 | A1 | 5/2005 | Wells | |
| 2005/0130728 | A1 | 6/2005 | Nguyen et al. | |
| 2005/0130731 | A1 | 6/2005 | Englman | |
| 2005/0137014 | A1 | 6/2005 | Vetelaninen | |
| 2005/0143169 | A1 | 6/2005 | Nguyen | |
| 2005/0167921 | A1 | 8/2005 | Finocchio | |
| 2005/0170883 | A1 | 8/2005 | Muskin et al. | |
| 2005/0181865 | A1 | 8/2005 | Luciano | |
| 2005/0181870 | A1 | 8/2005 | Nguyen et al. | |
| 2005/0181875 | A1 | 8/2005 | Hoehne | |
| 2005/0187020 | A1 | 8/2005 | Amaitis et al. | |
| 2005/0202865 | A1 | 9/2005 | Kim | |
| 2005/0202875 | A1 | 9/2005 | Murphy et al. | |
| 2005/0208993 | A1 | 9/2005 | Yoshizawa | |
| 2005/0209002 | A1 | 9/2005 | Blythe et al. | |
| 2005/0221881 | A1 | 10/2005 | Lannert | |
| 2005/0223219 | A1 | 10/2005 | Gatto et al. | |
| 2005/0239546 | A1 | 10/2005 | Hedrick | |
| 2005/0255919 | A1 | 11/2005 | Nelson | |
| 2005/0273635 | A1 | 12/2005 | Wilcox et al. | |
| 2005/0277471 | A1 | 12/2005 | Russell et al. | |
| 2005/0282637 | A1 | 12/2005 | Gatto et al. | |
| 2006/0009283 | A1 | 1/2006 | Englman et al. | |
| 2006/0036874 | A1 | 2/2006 | Cockerille | |
| 2006/0046822 | A1 | 3/2006 | Kaminkow et al. | |
| 2006/0046830 | A1 | 3/2006 | Webb | |
| 2006/0046849 | A1 | 3/2006 | Kovacs | |
| 2006/0068893 | A1 | 3/2006 | Jaffe et al. | |
| 2006/0068897 | A1 | 3/2006 | Sanford | |
| 2006/0073869 | A1 | 4/2006 | LeMay et al. | |
| 2006/0073888 | A1 | 4/2006 | Nguyen | |
| 2006/0073897 | A1 | 4/2006 | Englman et al. | |
| 2006/0079317 | A1 | 4/2006 | Flemming et al. | |
| 2006/0121972 | A1 | 6/2006 | Walker | |
| 2006/0126529 | A1 | 6/2006 | Hardy et al. | |
| 2006/0148551 | A1 | 7/2006 | Walker et al. | |
| 2006/0148560 | A1 | 7/2006 | Arezina | |
| 2006/0189382 | A1 | 8/2006 | Muir et al. | |
| 2006/0217170 | A1 | 9/2006 | Roireau | |
| 2006/0217193 | A1 | 9/2006 | Walker et al. | |
| 2006/0247028 | A1 | 11/2006 | Brosnan et al. | |
| 2006/0247035 | A1 | 11/2006 | Rowe et al. | |
| 2006/0252530 | A1 | 11/2006 | Oberberger et al. | |
| 2006/0253481 | A1 | 11/2006 | Guido et al. | |
| 2006/0256135 | A1 | 11/2006 | Aoyama | |
| 2006/0281525 | A1 | 12/2006 | Borissov | |
| 2006/0281541 | A1 | 12/2006 | Nguyen et al. | |
| 2006/0287106 | A1 | 12/2006 | Jensen | |
| 2007/0004510 | A1 | 1/2007 | Underdahl et al. | |
| 2007/0026935 | A1 | 2/2007 | Wolf et al. | |
| 2007/0026942 | A1 | 2/2007 | Kinsley | |
| 2007/0054739 | A1 | 3/2007 | Amaitis et al. | |
| 2007/0060254 | A1 | 3/2007 | Muir | |
| 2007/0060306 | A1 | 3/2007 | Amaitis et al. | |
| 2007/0060319 | A1 | 3/2007 | Block et al. | |
| 2007/0060358 | A1 | 3/2007 | Amaitas et al. | |
| 2007/0077981 | A1 | 4/2007 | Hungate et al. | |
| 2007/0087833 | A1 | 4/2007 | Feeney et al. | |
| 2007/0087834 | A1 | 4/2007 | Moser et al. | |
| 2007/0093299 | A1 | 4/2007 | Bergeron | |
| 2007/0129123 | A1 | 6/2007 | Eryou et al. | |
| 2007/0129148 | A1 | 6/2007 | Van Luchene | |
| 2007/0149279 | A1 | 6/2007 | Norden et al. | |
| 2007/0149286 | A1 | 6/2007 | Bemmel | |
| 2007/0159301 | A1 | 7/2007 | Hirt et al. | |
| 2007/0161402 | A1 | 7/2007 | Ng et al. | |
| 2007/0184896 | A1 | 8/2007 | Dickerson | |
| 2007/0184904 | A1 | 8/2007 | Lee | |
| 2007/0191109 | A1 | 8/2007 | Crowder et al. | |
| 2007/0207852 | A1 | 9/2007 | Nelson et al. | |
| 2007/0207854 | A1 | 9/2007 | Wolf et al. | |
| 2007/0235521 | A1 | 10/2007 | Mateen | |
| 2007/0238505 | A1 | 10/2007 | Okada | |
| 2007/0241187 | A1 | 10/2007 | Alderucci et al. | |
| 2007/0248036 | A1 | 10/2007 | Nevalainen | |
| 2007/0257430 | A1 | 11/2007 | Hardy et al. | |
| 2007/0259713 | A1 | 11/2007 | Fiden et al. | |
| 2007/0259716 | A1 | 11/2007 | Mattice | |
| 2007/0259717 | A1 | 11/2007 | Mattice et al. | |
| 2007/0265984 | A1* | 11/2007 | Santhana | G06Q 20/223 705/65 |
| 2007/0270213 | A1 | 11/2007 | Nguyen et al. | |
| 2007/0275777 | A1 | 11/2007 | Walker et al. | |
| 2007/0275779 | A1 | 11/2007 | Amaitis et al. | |
| 2007/0281782 | A1 | 12/2007 | Amaitis et al. | |
| 2007/0281785 | A1 | 12/2007 | Amaitas et al. | |
| 2007/0298858 | A1 | 12/2007 | Toneguzzo | |
| 2007/0298873 | A1 | 12/2007 | Nguyen et al. | |
| 2008/0015032 | A1 | 1/2008 | Bradford et al. | |
| 2008/0020824 | A1 | 1/2008 | Cuddy et al. | |
| 2008/0020845 | A1 | 1/2008 | Low | |
| 2008/0032787 | A1 | 2/2008 | Low et al. | |
| 2008/0070652 | A1 | 3/2008 | Nguyen et al. | |
| 2008/0070681 | A1 | 3/2008 | Marks et al. | |
| 2008/0076505 | A1 | 3/2008 | Nguyen | |
| 2008/0076506 | A1 | 3/2008 | Nguyen et al. | |
| 2008/0076548 | A1 | 3/2008 | Paulsen | |
| 2008/0076572 | A1 | 3/2008 | Nguyen et al. | |
| 2008/0096650 | A1 | 4/2008 | Baerlocher | |
| 2008/0102916 | A1 | 5/2008 | Kovacs | |
| 2008/0102935 | A1 | 5/2008 | Finnimore | |
| 2008/0102956 | A1 | 5/2008 | Burman et al. | |
| 2008/0102957 | A1 | 5/2008 | Burnman et al. | |
| 2008/0108401 | A1 | 5/2008 | Baerlocker et al. | |
| 2008/0113772 | A1 | 5/2008 | Burrill et al. | |
| 2008/0119267 | A1 | 5/2008 | Denlay | |
| 2008/0126529 | A1 | 5/2008 | Kim | |
| 2008/0013906 | A1 | 6/2008 | Lutnick | |
| 2008/0139274 | A1 | 6/2008 | Baerlocher | |
| 2008/0139306 | A1 | 6/2008 | Lutnick | |
| 2008/0146321 | A1 | 6/2008 | Parente | |
| 2008/0146344 | A1 | 6/2008 | Rowe et al. | |
| 2008/0150902 | A1 | 6/2008 | Edpalm et al. | |
| 2008/0153583 | A1 | 6/2008 | Huntley et al. | |
| 2008/0161110 | A1 | 7/2008 | Campbell | |
| 2008/0167106 | A1 | 7/2008 | Lutnick et al. | |
| 2008/0167118 | A1 | 7/2008 | Kroeckel | |
| 2008/0182667 | A1 | 7/2008 | Davis et al. | |
| 2008/0200251 | A1 | 8/2008 | Alderucci | |
| 2008/0207296 | A1* | 8/2008 | Lutnick | G07F 17/3255 463/16 |
| 2008/0207307 | A1 | 8/2008 | Cunningham, II et al. | |
| 2008/0167130 | A1 | 9/2008 | Koreckel | |
| 2008/0214258 | A1 | 9/2008 | Brosnan et al. | |
| 2008/0214310 | A1 | 9/2008 | Brunet de Courssou | |
| 2008/0215319 | A1 | 9/2008 | Lu | |
| 2008/0234047 | A1 | 9/2008 | Nguyen | |
| 2008/0238610 | A1 | 10/2008 | Rosenbereg | |
| 2008/0248849 | A1 | 10/2008 | Lutnick | |
| 2008/0248865 | A1 | 10/2008 | Cole | |
| 2008/0252419 | A1 | 10/2008 | Batchelor | |
| 2008/0254878 | A1 | 10/2008 | Sauders et al. | |
| 2008/0254881 | A1 | 10/2008 | Lutnick et al. | |
| 2008/0254883 | A1 | 10/2008 | Patel et al. | |
| 2008/0254891 | A1 | 10/2008 | Sauders et al. | |
| 2008/0254892 | A1 | 10/2008 | Sauders et al. | |
| 2008/0254897 | A1 | 10/2008 | Sauders et al. | |
| 2008/0263173 | A1 | 10/2008 | Weber et al. | |
| 2008/0268959 | A1 | 10/2008 | Bryson | |
| 2008/0300058 | A1 | 12/2008 | Sum et al. | |
| 2008/0305864 | A1 | 12/2008 | Kelly | |
| 2008/0305865 | A1 | 12/2008 | Kelly et al. | |
| 2008/0305866 | A1 | 12/2008 | Kelly et al. | |
| 2008/0311994 | A1 | 12/2008 | Amaitas et al. | |
| 2008/0318669 | A1 | 12/2008 | Buchholz | |
| 2008/0318686 | A1 | 12/2008 | Crowder et al. | |
| 2009/0005165 | A1 | 1/2009 | Arezina et al. | |
| 2009/0011822 | A1 | 1/2009 | Englman | |
| 2009/0017906 | A1 | 1/2009 | Jackson | |

(56) References Cited

U.S. PATENT DOCUMENTS

2009/0021381 A1 1/2009 Kondo
2009/0029766 A1 1/2009 Lutnick et al.
2009/0042611 A1* 2/2009 Aigner ................. G06Q 20/352 455/557
2009/0054149 A1 2/2009 Brosnan et al.
2009/0061985 A1 3/2009 Inamura
2009/0061990 A1 3/2009 Schwartz
2009/0069063 A1 3/2009 Thomas
2009/0077396 A1 3/2009 Tsai et al.
2009/0088258 A1 4/2009 Saunders et al.
2009/0098925 A1 4/2009 Gagner et al.
2009/0104977 A1 4/2009 Zielinski
2009/0104983 A1 4/2009 Okada
2009/0118002 A1 5/2009 Lyons
2009/0118013 A1 5/2009 Finnimore et al.
2009/0118022 A1 5/2009 Lyons et al.
2009/0124366 A1 5/2009 Aoki et al.
2009/0124390 A1 5/2009 Seelig et al.
2009/0131146 A1 5/2009 Arezina
2009/0131151 A1 5/2009 Harris et al.
2009/0131155 A1 5/2009 Hollibaugh
2009/0132163 A1 5/2009 Ashley et al.
2009/0137255 A1 5/2009 Ashley et al.
2009/0138133 A1 5/2009 Buchholz et al.
2009/0143141 A1 6/2009 Wells
2009/0149245 A1 6/2009 Fabbri
2009/0149261 A1 6/2009 Chen et al.
2009/0153342 A1 6/2009 Thorn
2009/0156303 A1 6/2009 Kiely et al.
2009/0163272 A1 6/2009 Baker
2009/0176578 A1 7/2009 Herrmann et al.
2009/0191962 A1 7/2009 Hardy et al.
2009/0197684 A1 8/2009 Arezina et al.
2009/0216547 A1 8/2009 Canora et al.
2009/0219901 A1 9/2009 Bull et al.
2009/0221342 A1 9/2009 Katz et al.
2009/0227302 A1 9/2009 Abe
2009/0239666 A1 9/2009 Hall et al.
2009/0264190 A1 10/2009 Davis et al.
2009/0270166 A1 10/2009 Thukral
2009/0270170 A1 10/2009 Patton
2009/0271287 A1 10/2009 Halpern
2009/0275402 A1 11/2009 Backover
2009/0275410 A1 11/2009 Kisenwether et al.
2009/0275411 A1 11/2009 Kisenwether et al.
2009/0280910 A1* 11/2009 Gagner ............... G07F 17/3209 463/30
2009/0282469 A1 11/2009 Lynch
2009/0298468 A1 12/2009 Hsu
2010/0002897 A1 1/2010 Keady
2010/0004058 A1 1/2010 Acres
2010/0007496 A1 1/2010 Orlassino
2010/0016069 A1 1/2010 Herrmann
2010/0049738 A1 2/2010 Mathur et al.
2010/0056248 A1 3/2010 Acres
2010/0062833 A1 3/2010 Mattice et al.
2010/0062840 A1 3/2010 Herrmann et al.
2010/0079237 A1 4/2010 Falk
2010/0081501 A1 4/2010 Carpenter et al.
2010/0081509 A1 4/2010 Burke
2010/0099499 A1 4/2010 Amaitis et al.
2010/0105454 A1* 4/2010 Weber .................... G06Q 50/34 463/1
2010/0106612 A1 4/2010 Gupta
2010/0115591 A1 5/2010 Kane-Esrig
2010/0120486 A1 5/2010 DeWaal
2010/0124967 A1 5/2010 Lutnick et al.
2010/0130276 A1 5/2010 Fiden
2010/0160035 A1 6/2010 Herrmann
2010/0160043 A1 6/2010 Fujimoto et al.
2010/0178977 A1 7/2010 Kim et al.
2010/0184509 A1 7/2010 Sylla
2010/0197383 A1 8/2010 Rader et al.
2010/0197385 A1 8/2010 Aoki et al.
2010/0203955 A1 8/2010 Sylla
2010/0203957 A1 8/2010 Enzminger
2010/0203963 A1 8/2010 Allen
2010/0224681 A1 9/2010 Triplett
2010/0227662 A1 9/2010 Speers et al.
2010/0227670 A1 9/2010 Arezina et al.
2010/0227671 A1 9/2010 Laaroussi
2010/0227687 A1 9/2010 Speers et al.
2010/0234091 A1 9/2010 Baerlocher et al.
2010/0278345 A1* 11/2010 Alsina ................... H04W 12/06 709/227
2010/0279764 A1 11/2010 Allen et al.
2010/0323780 A1 12/2010 Acres
2010/0325703 A1 12/2010 Etchegoyen
2011/0009181 A1 1/2011 Speers et al.
2011/0039615 A1 2/2011 Acres
2011/0053679 A1 3/2011 Canterbury
2011/0065492 A1 3/2011 Acres
2011/0076941 A1 3/2011 Taveau
2011/0086696 A1 4/2011 MacEwan
2011/0105216 A1 5/2011 Cohen
2011/0111827 A1 5/2011 Nicely et al.
2011/0111843 A1 5/2011 Nicely et al.
2011/0111860 A1 5/2011 Nguyen
2011/0117991 A1* 5/2011 Belger ................ G07F 17/3258 463/43
2011/0118010 A1 5/2011 Brune
2011/0159966 A1 6/2011 Gura et al.
2011/0183732 A1 7/2011 Block
2011/0183749 A1 7/2011 Allen
2011/0189981 A1 8/2011 Faith
2011/0207525 A1 8/2011 Allen
2011/0212711 A1 9/2011 Scott
2011/0212767 A1 9/2011 Barclay et al.
2011/0223993 A1 9/2011 Allen et al.
2011/0244952 A1 10/2011 Schueller
2011/0263318 A1 10/2011 Agarwal et al.
2011/0269548 A1 11/2011 Barclay et al.
2011/0275443 A1 11/2011 Cole
2011/0306400 A1 12/2011 Nguyen
2011/0306426 A1 12/2011 Novak et al.
2012/0004037 A1* 1/2012 Hill ......................... G07F 17/32 463/42
2012/0015709 A1 1/2012 Bennett et al.
2012/0028703 A1 2/2012 Anderson et al.
2012/0028718 A1 2/2012 Barclay et al.
2012/0034968 A1 2/2012 Watkins et al.
2012/0046110 A1 2/2012 Amaitis
2012/0094769 A1 4/2012 Nguyen et al.
2012/0100908 A1 4/2012 Wells
2012/0108319 A1 5/2012 Caputo et al.
2012/0122561 A1 5/2012 Hedrick
2012/0122567 A1 5/2012 Gangadharan et al.
2012/0122584 A1 5/2012 Nguyen
2012/0122590 A1 5/2012 Nguyen
2012/0172130 A1 7/2012 Acres
2012/0184362 A1 7/2012 Barclay et al.
2012/0184363 A1 7/2012 Barclay et al.
2012/0185398 A1 7/2012 Weis
2012/0190426 A1 7/2012 Acres
2012/0194448 A1 8/2012 Rothkopf
2012/0208618 A1 8/2012 Frerking
2012/0228718 A1 9/2012 Lin
2012/0231885 A1 9/2012 Speer, II
2012/0239566 A1 9/2012 Everett
2012/0322563 A1 12/2012 Nguyen et al.
2012/0330740 A1 12/2012 Pennington et al.
2013/0005433 A1 1/2013 Holch
2013/0005443 A1 1/2013 Kosta
2013/0005453 A1 1/2013 Nguyen et al.
2013/0059650 A1 3/2013 Sylla et al.
2013/0065668 A1 3/2013 LeMay
2013/0281188 A1 3/2013 Guinn
2013/0103965 A1 4/2013 Golembeski
2013/0104193 A1 4/2013 Gatto et al.
2013/0130766 A1 5/2013 Harris
2013/0132745 A1 5/2013 Schoening et al.
2013/0165210 A1 6/2013 Nelson
2013/0185559 A1 7/2013 Morel
2013/0196756 A1 8/2013 Nguyen

(56) References Cited

U.S. PATENT DOCUMENTS

| | | | | |
|---|---|---|---|---|
| 2013/0196776 | A1 | 8/2013 | Nguyen | |
| 2013/0205919 | A1 | 8/2013 | Bousack | |
| 2013/0210513 | A1 | 8/2013 | Nguyen | |
| 2013/0210514 | A1 | 8/2013 | Nguyen | |
| 2013/0210530 | A1 | 8/2013 | Nguyen | |
| 2013/0225279 | A1 | 8/2013 | Patceg | |
| 2013/0225282 | A1 | 8/2013 | Williams et al. | |
| 2013/0252730 | A1 | 9/2013 | Joshi | |
| 2013/0281187 | A1 | 10/2013 | Skelton | |
| 2013/0316808 | A1 | 11/2013 | Nelson | |
| 2013/0337878 | A1 | 12/2013 | Shepherd | |
| 2013/0337889 | A1 | 12/2013 | Gagner | |
| 2014/0006129 | A1 | 1/2014 | Heath | |
| 2014/0057716 | A1 | 2/2014 | Massing et al. | |
| 2014/0087862 | A1 | 3/2014 | Burke | |
| 2014/0094295 | A1 | 4/2014 | Nguyen | |
| 2014/0094316 | A1 | 4/2014 | Nguyen | |
| 2014/0121005 | A1 | 5/2014 | Nelson | |
| 2014/0179431 | A1 | 6/2014 | Nguyen | |
| 2014/0274306 | A1 | 9/2014 | Crawford, III | |
| 2014/0274309 | A1 | 9/2014 | Nguyen | |
| 2014/0274319 | A1 | 9/2014 | Nguyen | |
| 2014/0274320 | A1 | 9/2014 | Nguyen | |
| 2014/0274342 | A1 | 9/2014 | Nguyen | |
| 2014/0274357 | A1 | 9/2014 | Nguyen | |
| 2014/0274360 | A1 | 9/2014 | Nguyen | |
| 2014/0274367 | A1 | 9/2014 | Nguyen | |
| 2014/0274388 | A1 | 9/2014 | Nguyen | |
| 2015/0089595 | A1 | 3/2015 | Telles | |
| 2015/0133223 | A1 | 5/2015 | Carter | |
| 2015/0143543 | A1 | 8/2015 | Phegade | |
| 2016/0125695 | A1 | 5/2016 | Nguyen | |
| 2016/0277891 | A1* | 9/2016 | Dvortsov | H04W 4/12 |
| 2017/0016819 | A1 | 4/2017 | Nguyen | |
| 2017/0116819 | A1 | 4/2017 | Nguyen | |
| 2017/0116823 | A1 | 4/2017 | Nguyen | |
| 2017/0144071 | A1 | 5/2017 | Nguyen | |
| 2017/0148259 | A1 | 5/2017 | Nguyen | |
| 2017/0148261 | A1 | 5/2017 | Nguyen | |
| 2017/0148263 | A1 | 5/2017 | Nguyen | |
| 2017/0206734 | A1 | 7/2017 | Nguyen | |
| 2017/0228979 | A1 | 8/2017 | Nguyen | |
| 2017/0243440 | A1 | 8/2017 | Nguyen | |
| 2017/0337770 | A1 | 11/2017 | Nguyen | |
| 2018/0144581 | A1 | 5/2018 | Nguyen | |
| 2019/0005773 | A1 | 1/2019 | Nguyen | |
| 2019/0122490 | A1 | 4/2019 | Nguyen | |
| 2019/0122492 | A1 | 4/2019 | Nguyen | |
| 2019/0213829 | A1 | 7/2019 | Nguyen | |
| 2020/0372753 | A1 | 11/2020 | Nguyen | |

FOREIGN PATENT DOCUMENTS

| | | |
|---|---|---|
| GB | 2096376 | 10/1982 |
| GB | 2097570 | 11/1982 |
| GB | 2335524 | 9/1999 |
| WO | WO 05073933 | 8/2005 |
| WO | WO 2008/027621 | 3/2008 |
| WO | WO 2010/017252 A1 | 2/2010 |

OTHER PUBLICATIONS

Bentson, Liz, "Harrahs Launches iPhone App; Caesars Bypasses Check-in," Las Vegas Sun, Las Vegas, NV. Jan. 8, 2010.
Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/article/20130424telecom-equipped-drones-could-revolutionize-wireless-market.html, downloaded Jul. 2, 2013, 2 pages.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Office Action for U.S. Appl. No. 12/945,888, mailed Jan. 22, 2016.
Office Action for U.S. Appl. No. 13/622,702, mailed Mar. 22, 2016.
Final OA for U.S. Appl. No. 12/945,888, mailed Jun. 28, 2016.
Office Action for U.S. Appl. No. 12/945,888, mailed Feb. 28, 2017.
Advisory Action for U.S. Appl. No. 13/801,256, mailed Dec. 5, 2014.
Office Action for U.S. Appl. No. 13/622,702, mailed Aug. 31, 2017.
Office Action for U.S. Appl. No. 12/945,888, mailed Sep. 1, 2017.
Final Office Action for U.S. Appl. No. 13/622,702, mailed Feb. 22, 2018.
Final Office Action for U.S. Appl. No. 13/622,702, mailed Feb. 27, 2018.
Office Action for U.S. Appl. No. 13/622,702, mailed Oct. 3, 2018.
Office Action for U.S. Appl. No. 16/559,553, mailed Sep. 11, 2020.
Office Action for U.S. Appl. No. 16/794,212, mailed Sep. 11, 2020.
Restriction Requirement for U.S. Appl. No. 16/600,395, mailed Sep. 18, 2020.
Final Office Action for U.S. Appl. No. 16/248,759, mailed Oct. 6, 2020.
Final Office Action for U.S. Appl. No. 15/671,133, mailed Oct. 7, 2020.
Final Office Action for U.S. Appl. No. 16/357,316, mailed Oct. 8, 2020.
Final Office Action for U.S. Appl. No. 16/183,632, mailed Oct. 9, 2020.
Office Action for U.S. Appl. No. 16/590,347, mailed Oct. 13, 2020.
Office Action for U.S. Appl. No. 16/449,717, mailed Nov. 9, 2020.
Final Office Action for U.S. Appl. No. 13/622,702, mailed Nov. 30, 2020.
Final Office Action for U.S. Appl. No. 15/674,480, mailed Dec. 7, 2020.
Office Action for U.S. Appl. No. 16/168,813, mailed Dec. 8, 2020.
Office Action for U.S. Appl. No. 16/600,395, mailed Dec. 22, 2020.
"Professional Casino Slot Machine", Posted at www.vbtutor.net/VB.Sample/vbslot2.htm on Oct. 20, 2009.
Final Office Action for U.S. Appl. No. 16/559,553, mailed Jan. 21, 2021.
Final Office Action for U.S. Appl. No. 16/449,717, mailed Jan. 29, 2021.
Notice of Allowance for U.S. Appl. No. 15/811,654, mailed Feb. 3, 2021.
Notice of Allowance for U.S. Appl. No. 14/017,150, mailed Feb. 5, 2021.
Final Office Action for U.S. Appl. No. 16/794,212, mailed Feb. 17, 2021.
Office Action for U.S. Appl. No. 16/351,416, mailed Feb. 23, 2021.
Office Action for U.S. Appl. No. 15/674,480, mailed Mar. 25, 2021.
Final Office Action for U.S. Appl. No. 16/219,940, mailed Mar. 26, 2021.
Office Action for U.S. Appl. No. 16/183,632, mailed May 4, 2021.
Office Action for U.S. Appl. No. 16/559,553, mailed Jun. 1, 2021.
Office Action (Final Rejection) dated Jan. 24, 2022 for U.S. Appl. No. 13/622,702 (pp. 1-24).
Office Action (Final Rejection) dated Apr. 15, 2022 for U.S. Appl. No. 16/916,001 (pp. 1-17).
Office Action (Non-Final Rejection) dated May 9, 2022 for U.S. Appl. No. 16/183,632 (pp. 1-29).

(56) References Cited

OTHER PUBLICATIONS

Office Action (Non-Final Rejection) dated May 24, 2022 for U.S. Appl. No. 13/622,702 (pp. 1-22).
Office Action (Notice of Allowance and Fees Due (PTOL-85)) dated Jul. 25, 2022 for U.S. Appl. No. 16/916,001 (pp. 1-9).
Office Action (Final Rejection) dated Jan. 25, 2023 for U.S. Appl. No. 16/183,632 (pp. 1-33).
Office Action (Final Rejection) dated Feb. 9, 2023 for U.S. Appl. No. 13/622,702 (pp. 1-29).
Office Action (Non-Final Rejection) dated Sep. 7, 2023 for U.S. Appl. No. 13/622,702 (pp. 1-26).
Office Action (Non-Final Rejection) dated Sep. 8, 2023 for U.S. Appl. No. 16/183,632 (pp. 1-30).
Office Action (Final Rejection) dated May 13, 2024 for U.S. Appl. No. 13/622,702 (pp. 1-9).
Office Action (Final Rejection) dated May 15, 2024 for U.S. Appl. No. 16/183,632 (pp. 1-11).
Office Action (Notice of Allowance and Fees Due (PTOL-85)) dated Jun. 28, 2024 for U.S. Appl. No. 13/622,702 (pp. 1-7).
Office Action (Notice of Allowance and Fees Due (PTOL-85)) dated Jul. 2, 2024 for U.S. Appl. No. 16/183,632 (pp. 1-8).
Office Action (Notice of Allowance and Fees Due (PTOL-85)) dated Jul. 22, 2024 for U.S. Appl. No. 16/183,632 (pp. 1-5).

* cited by examiner

METHOD AND SYSTEM FOR TRANSFERRING VALUE FOR WAGERING USING A PORTABLE ELECTRONIC DEVICE

CROSS-REFERENCE TO RELATED APPLICATIONS

This application is continuation of U.S. patent application Ser. No. 13/622,702, filed Sep. 19, 2012, and entitled "MULTI-FUNCTIONAL PERIPHERAL DEVICE", which is hereby incorporated herein by reference for all purposes, which in turn is a continuation-in-part of U.S. patent application Ser. No. 12/945,888, filed Nov. 14, 2010, and entitled "MULTI-FUNCTIONAL PERIPHERAL DEVICE", which is hereby incorporated herein by reference for all purposes.

FIELD OF INVENTION

The present disclosure relates generally to multi-functional peripheral devices. More particularly, the present disclosure relates generally to using the multi-functional peripheral devices in a gaming environment. Even more particularly, the present disclosure relates generally to using the multi-functional peripheral devices in a gaming environment to transfer values such as funds and credits.

BACKGROUND OF INVENTION

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic devices may be configured to be updated so as to allow for the presentation of additional multimedia services or applications. Portable electronic devices may also be configured to have wireless transmission and receiving capabilities so as to permit communication with one or more other sources.

Gaming machines may comprise any number of peripheral devices associated with the act of playing a game of chance. For example, peripheral devices such as a display, bill acceptor, keypad, ticket printer, and user input switches may be used to play a game of chance. Gaming establishments are always looking for new ways and/or gaming options to attract players to increase profits. However, presenting new services on gaming machines may be costly, time-consuming, and generally undesirable for many casinos owners for numerous reasons such as regulatory requirements, maintenance, and the like.

SUMMARY

The disclosure describes a system, apparatus, and method for electronically transferring funds using a portable electronic device. In one embodiment, a method for transferring funds to or from play a portable electronic device to facilitate playing a game of chance on a portable electronic device.

The disclosure also describes a system, apparatus, and method for electronically transferring funds using a multi-functional peripheral device. The multi-functional peripheral device may include a housing, a bezel coupled to an exterior of the housing, and at least one sensor device coupled to the bezel. The at least one sensor device can be configured to detect at least one sensory input.

In one embodiment, a multi-functional peripheral device for use with a gaming device may have a housing, a bezel coupled to an exterior of the housing, at least one sensor device coupled to the bezel, a memory having at least one value transfer program configured to wirelessly transfer funds, and a processor configured to execute the at least one value transfer program in accordance with the at least one sensory input. The at least one sensor device can be configured to detect at least one sensory input. The at least one value transfer program can be configured to wirelessly transfer funds between a portable electronic device and the gaming device.

In one embodiment, a gaming machine for playing a game of chance can include a display configured to present a representation of the game of chance, an input device configured to receive an input used to play the game of chance, and a plurality of peripheral devices configured to perform at least one peripheral function associated with the game of chance. The plurality of peripheral devices may include at least one proximity sensor configured to detect at least one sensory input induced by a portable electronic device.

In one embodiment, a method for transferring values may include: detecting, by a value transfer device, presence of a portable electronic device via a sensory input from the portable electronic device; receiving a value amount; determining, after detecting the sensory input, whether the value amount is to be transferred to the portable electronic device; and transferring the value amount to the portable electronic device if the determining determines the fund amount is to be transferred to the portable electronic device.

In one embodiment, a method for transferring funds to play a game of chance on a portable electronic device may include: detecting, by a first value transfer device, presence of the portable electronic device via a sensory input from the portable electronic device; receiving a fund amount at the first value transfer device; transferring the fund amount to the portable electronic device after detecting the presence of the portable electronic device and receiving the fund amount; and playing a game of chance on the portable electronic device, using at least a portion of the fund amount transferred to the portable electronic device as a wager to play the game of chance.

In one embodiment, a value transfer system can include at least one portable electronic device configured to receive a value, at least one value transfer device, and a gaming server configured to transmit a plurality of gaming information to the at least one portable electronic device. Each of the at least one value transfer devices may include a multifunctional peripheral device having a housing, a bezel coupled to an exterior of the housing, at least one sensor device coupled to the bezel, a memory having at least one value transfer program configured to wirelessly transfer values, a wireless interface configured to communicate with the at least one portable electronic device, and a processor configured to execute the at least one value transfer program in accordance with the at least one sensory input. The at least one sensor device can be configured to detect at least one sensory input. The at least one value transfer program is configured to wirelessly transfer values between the at least one portable electronic device and a gaming device.

In one embodiment, a method can transfer funds to play a game of chance on a portable electronic device. The method, for example, can include the operations of: detecting, by a value transfer device, input of a monetary value; detecting the presence of a portable electronic device; authenticating the portable electronic device; receiving, at the value transfer device, a request to transfer at least a portion of the monetary value to the portable electronic device; transferring the at least a portion of the monetary value to the portable electronic device; and playing a game of chance on the portable electronic device, using at least a portion of the monetary value transferred to the portable electronic device as a wager to play the game of chance.

In one embodiment, a method can transfer funds to a portable electronic device is disclosed. The method, for example, can include the operations of: detecting, by a first value transfer device, presence of the portable electronic device via a sensory input from the portable electronic device; receiving a fund amount at the first value transfer device; transferring the fund amount to the portable electronic device after detecting the presence of the portable electronic device and receiving the fund amount; playing a game of chance on the portable electronic device, using at least a portion of the fund amount transferred to the portable electronic device as a wager to play the game of chance; detecting, by a second value transfer device, presence of the portable electronic device via another sensory input; receiving, at the second value transfer device, a fund amount transfer request including a requested fund amount to be transferred to the second value transfer device; and transferring the requested fund amount from the portable electronic device to the second value transfer device.

In one embodiment, a program storage device readable by a machine tangibly embodying a program of instructions executable by the machine can perform a method for transferring funds to play a game of chance on a portable electronic device. The method, for example, can include the operations of: computer program code for detecting, by a value transfer device, input of a monetary value; computer program code for detecting the presence of a portable electronic device; computer program code for authenticating the portable electronic device; computer program code for receiving, at the value transfer device, a request to transfer at least a portion of the monetary value to the portable electronic device; computer program code for transferring the at least a portion of the monetary value to the portable electronic device; and computer program code for playing a game of chance on the portable electronic device, using at least a portion of the monetary value transferred to the portable electronic device as a wager to play the game of chance.

In one embodiment, a program storage device readable by a machine tangibly embodying a program of instructions executable by the machine can perform a method for transferring funds to a portable electronic device. The method, for example, can include the operations of: computer program code for detecting, by a first value transfer device, presence of the portable electronic device via a sensory input from the portable electronic device; computer program code for receiving a fund amount at the first value transfer device; computer program code for transferring the fund amount to the portable electronic device after detecting the presence of the portable electronic device and receiving the fund amount; computer program code for playing a game of chance on the portable electronic device, using at least a portion of the fund amount transferred to the portable electronic device as a wager to play the game of chance; computer program code for detecting, by a second value transfer device, presence of the portable electronic device via another sensory input; computer program code for receiving, at the second value transfer device, a fund amount transfer request including a requested fund amount to be transferred to the second value transfer device; and computer program code for transferring the requested fund amount from the portable electronic device to the second value transfer device.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION

Embodiments are described herein in the context of a multi-functional peripheral device. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one or more embodiments, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The disclosure describes a system, apparatus, and method for communicating information between a gaming device and a portable electronic device using a multi-functional peripheral device associated with the gaming device. The multi-functional peripheral device may include a sensor to detect sensory input from the user and/or the portable electronic device associated with the user to play a game of chance on the gaming device.

Figure 1:
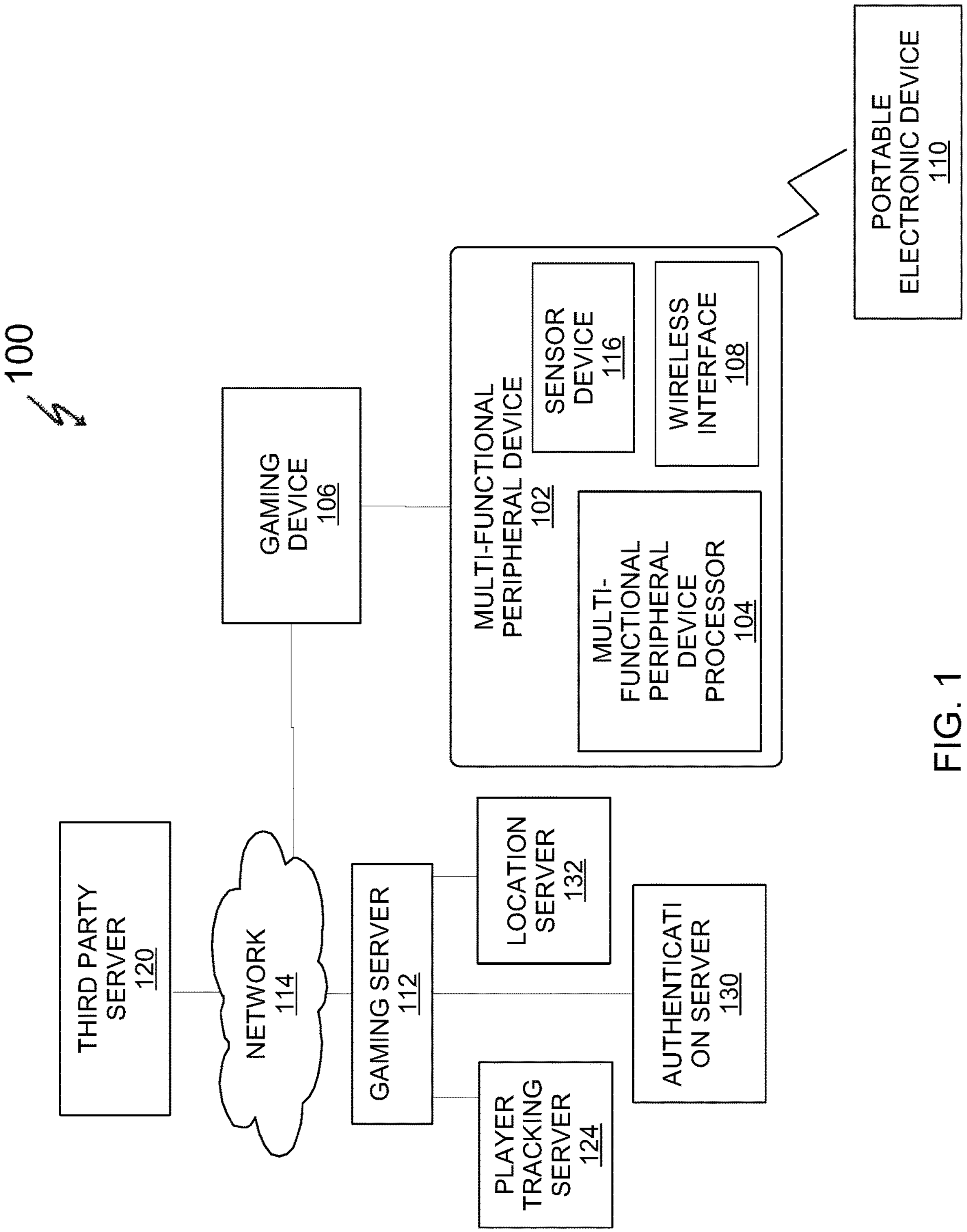
FIG. 1 illustrates an embodiment of a system for using a multi-functional peripheral device in a gaming environment.

FIG. 1 illustrates an embodiment of a system for using a multi-functional peripheral device in a gaming environment. Although described with use in a gaming environment, this is not intended to be limiting as the multi-functional peripheral device may be used in other environments such as in grocery stores, banks, merchant stores, and the like. The system 100 may include a multi-functional peripheral device 102 associated with a gaming device 106. The multi-functional peripheral device 102 may have a multi-functional peripheral device processor 104 and at least one sensor device 116. The multi-functional peripheral device 102 may be configured to communicate with at least one portable electronic device 110 via wireless interface 108. The gaming device 106 may be configured to communicate with a gaming server 112 via network 114. Although illustrated with one gaming device 106 and one portable electronic device 110, this is not intended to be limiting as any number of gaming machines and portable electronic devices may be used.

Typically, the multi-functional peripheral device 102 serves as a peripheral device for gaming machine or device 106. The multi-functional peripheral device 102 can include a multi-functional peripheral device controller or processor 104 that is configured to control operation of the multi-functional peripheral device 102. In one embodiment, the multi-functional peripheral device 102 supports not only a base peripheral function but also one or more additional peripheral functions. The multi-functional peripheral device 102 can thus be used to replace an existing peripheral device and can serve to provide additional capabilities beyond that available in the existing peripheral device, as further described with reference to FIGS. 3A and 3B.

The multi-functional device 102 may have at least one sensor device 116 configured to receive and/or detect at least one sensory input by the at least one portable electronic device 110. The at least one sensory device 116 may be any known device configured to detect and/or receive a sensory input. For example, the at least one sensor device 116 may be an accelerometer, camera, touch screen display, microphone, touchpad, retina scanner, radio frequency identification reader, near-field magnetic reader, proximity sensor, infrared sensor, thermal sensor, switch, magnetic sensor, RF sensor, or any other device capable of receiving and detecting sensory input such as a vibration, displacement, or any other sensory input.

The sensory input may be any type of known sensory input such as an audio, visual, and/or physical contact received from a user. The type of sensory input received or detected may be based on the sensory device. For example, a user may physically contact the sensor device 116 via a tap, touch, or any other physical contact on a touchpad. The physical contact may initiated by the user (e.g. using a finger to tap the sensor device 116), physical object (e.g. pen, coin, and the like), and/or a remote device associated with the user. The remote device may, for example, be any portable computing device such as a cellular phone, portable media player, personal digital assistant (PDA), and the like. In another embodiment, the sensory input may be an audio input received by a microphone associated with the multi-functional peripheral device 102.

In general, the sensory input may need to be in close proximity to the sensory device for transmission. For example, a user's voice may be in close to the microphone in order for the sensory input (i.e. user's voice) to be received by the microphone. In another example, a user's touch may need to physically contact the touchpad, a tap may need to vibrate an accelerometer, a player gesture may need to be in the camera's focus in order to be received by the camera, and the like. This type of proximity sensing may be desired for secured transactions (e.g., pairing a portable electronic device to the gaming device, logging in to a player's account, fund or value transfer, authentication, and the like).

The sensor device 116 may detect the sensory input and transmit a notification of the sensory input to the multi-functional peripheral device processor 104. In one embodiment, multi-functional peripheral device 102 may also receive a transmission from the at least one portable electronic device 110 via wireless interface 108. Wireless interface 108 may be any known wireless methods or device such as a 3G wireless technology, 4G wireless technology, Bluetooth, Wireless USB, Near-field magnetic, Fire Wire, WiMax, IEEE 802.11x technology, radio frequency, and the like.

The transmission may be contextual based and associated with or correspond to the sensory input received by the multi-functional peripheral device 102. For example, if the sensory input was received in the context of playing a game of chance on the gaming machine, the transmission may correspond to an action to play the gamine of chance, such as cashing out, dealing, playing a maximum bet, redeeming a game promotional voucher, and the like. In another example, if the sensory input was received in the context of transferring fund or value, the transmission may be a confirmation to transfer the funds to the gaming machine. In still another embodiment, if the sensory input was received in the context of gaming establishment services, the transmission may be a reservation request for a table in a restaurant, a seat in a tournament, or a request to buy tickets to watch a movie. The value in this case may be the fund transferred (e.g., cash or credit), a redemption of a promotional coupon for a discount, and the like. In general, value can be defined as funds, credits, player points, discounts, upgrade of services, digital merchandise (e.g., a song, a movie ticket, an entry into a lottery game, a game virtual asset, a free spin on a slot machine, and the like), promotional credits, or anything of benefit to the player.

Gaming server may 112 may be configured to communicate with player tracking server 124, location server 132, and authentication server 130. In one embodiment, player tracking server 124 may be configured to collect player data as well as determine a location of a customer within a gaming environment. Player tracking sever 124 may have a database configured to store player tracking information such as name, games the player likes to play, accumulated and used points, number of wins and losses, and the like. Player tracking server 124 may also be configured to store the location of all gaming machines within the gaming environment such that if a player inputs their player tracking card in a gaming machine, the player's gaming activities as well as the location of the player may be tracked.

In another embodiment, if the player is an anonymous player, location server 132, may be used to locate the location of the player in the gaming environment and assign an arbitrary identification (ID) to the anonymous player. Whether the player is an anonymous player or a player having a player tracking account, the location server 132 may include a database containing the location of all gaming devices (stationary and mobile gaming devices) in the gaming environment. Location server 132 may locate players within the gaming environment using any known wireless location methods such as global positioning systems (GPS), indoor Wi-Fi triangulations, and the like. In one embodiment, location server 132 may be configured to locate the position of the player using a portable electronic device of the player 110 and the location of the nearest gaming device 106. In another embodiment, the location server 132 may be configured to locate the player in the gaming environment using only the portable electronic device of the player 110.

Authentication server 130 may be used to authenticate and/or verify the player, gaming device 106, the digital content being transferred, and/or the at least one portable electronic device 110. Any known authentication methods may be used, such as public-private key authentication algorithms, random number generators, authentication keys, and the like, as further discussed below.

In one embodiment, authentication server 130 may have a memory (not shown) having a location verification program configured to conduct verification and/or authorization for gaming and non-gaming activities, such as to authorize a fund or value transfer request based upon the location of the gaming devices. Memory may also have a rules database configured to store a plurality of local jurisdictional gaming rules. Authentication server 132 may be configured to communicate with location server 132 to obtain the location of all gaming devices (stationary and mobile gaming devices) in the gaming environment. Based upon the location of the gaming devices, authentication server 132 may determine if the tracked location of the portable electronic device and the multi-functional peripheral device conflict with at least one of the plurality of jurisdictional gaming rules. If authentication server 132 determines that the tracked location of the portable electronic device and the multi-functional peripheral device conflicts with at least one of the plurality of jurisdictional gaming rules, the fund or value transfer request (or any other request) may be disallowed. If authentication server 132 determines that the tracked location of the portable electronic device and the multi-functional peripheral device do not conflict with at least one of the plurality of jurisdictional gaming rules, the funds transfer request (or any other request) may be allowed. For example, some local state rules may only allow the maximum transfer of $100.00 to a gaming machine. Authentication server 132 may receive a fund or value transfer request for $150.00. Since the funds transfer request is greater than the $100 maximum transfer limit, authentication server 132 may disallow the funds transfer request.

Gaming device 106, gaming server 112, and/or multi-functional peripheral device 102 may also be configured to communicate with a third party server 120. Third party server 120 may be any server necessary to carry out, assist, or perform the at least one request received by the portable electronic device such as a banking server, merchant server, credit card server, advertisement server, and the like. For example, if the request received by the multi-functional peripheral device 102 is a request to transfer funds from the player's bank account to the gaming device 106, the third party server 120 may be the player's banking server. In another example, if the request received by the multi-functional peripheral device 102 is a request to charge $100 to the a credit card of the player, the third party server 120 may be a credit card server. In still another example, if the request received by the multi-functional peripheral device 102 is a request to debit a merchant card, such as a gift card, the third party server 120 may be a merchant server.

Figure 2A:
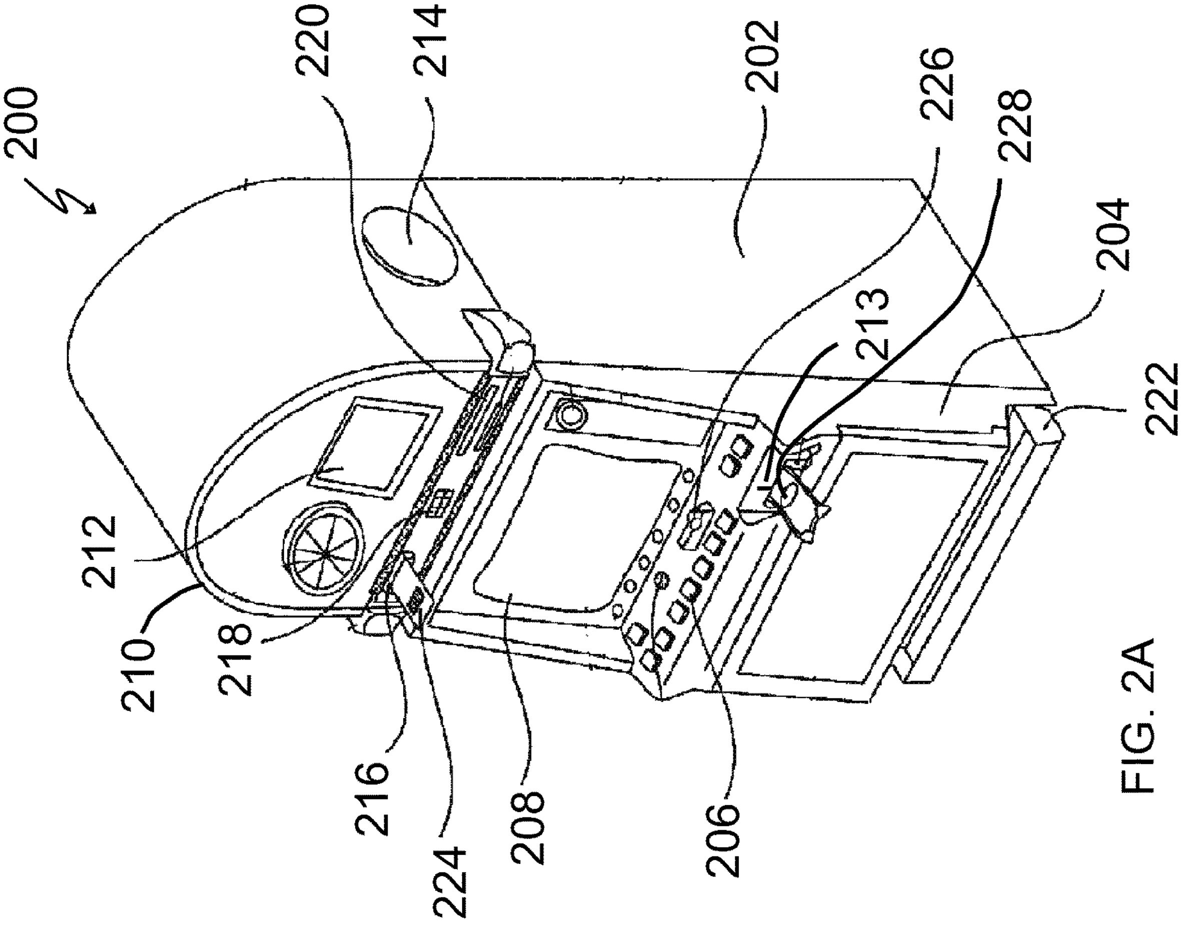
FIGS. 2A and 2B illustrate example gaming machines.

FIG. 2A illustrates a perspective view of an example gaming machine. The gaming machine 200 may include a main cabinet 202. The main cabinet 202 may include a main door 204, which may be configured to open to provide access to an interior of the gaming machine. The main door 204 may have a plurality of peripheral devices. The plurality of peripheral devices may include at least one button or switch 206 configured to receive player input or command, a display 208, a secondary display 212, a speaker 214, a ticket printer 216, a keypad 218 for entering player tracking information, a player tracking device 220, a coin acceptor 226, and a multi-functional peripheral device 228 including at least one sensor device 213. The gaming machine 200 may be configured to display a game of chance on the display 208 and/or the secondary display 212. The game of chance may be any game of chance, including but not limited to, video poker, video blackjack, video keno, video slot games, and any other theme. Although illustrated as a stationary physical slot machine, a gaming device can also be a portable electronic device such as a smart phone, a tablet computer, PDA, a laptop computer, a handheld media player, a table game, and the like.

Player inputs may be detected from the at least one button or switch 206. When selected, the gaming machine may detect the input and transmit the input to the gaming machine processor. For example, the button 206 may be used to increase or decrease a betting amount. In another embodiment, the display 208 may be a touch screen display such that the user may input selections via the display 208. The display 208 may be, for example, one of a cathode ray tube, high resolution flat-panel liquid crystal display ("LCD"), a plasma display, a light-emitting diode ("LED") display, or any other monitor and/or display configured to present information and/or allow the user to play a game of chance. The display 208 may include one or more display windows to allow for multiple games or multiple services to be provided simultaneously to a user.

A top box 210 may be designed to house a plurality of peripheral devices, including but not limited to the secondary display 212 and the speakers 214. During certain gaming events, the gaming machine 200 may be configured to display a plurality of visual and auditory effects that are perceivable by the user. Such visual effects may be displayed via the display 208 and the secondary display 212. The plurality of auditory and visual effects may serve to enhance user experience during game play. The secondary display 212 may be, for example, a cathode ray tube, high resolution flat-panel LCD, a plasma display, an LED display, or any other monitor and/or display configured to present information and/or allow the user to play a game of chance. The secondary display 212 may be configured to present a bonus game, services, video player, tournaments, move times, or any other information. Audio effects may be presented via the speakers 214.

The main cabinet 202 may include the ticket printer 216 configured to print an electronically-readable ticket 224, the keypad 218 for entering player tracking information, the player tracking device 220, the coin tray 222, the coin acceptor 226, and the multi-functional peripheral device 228. Following a completion of a gaming session, the ticket printer 216 may be configured to print an electronically-readable ticket 224. The electronically-readable ticket 224 provides one means of dispensing currency to the player when they are ready to "cash out". The electronically-readable ticket 224 may also include information relating to the gaming session, including a cash-out amount, a validation number, a gaming venue, a print date and time, gaming machine identification (ID) number, or any other relevant content.

The surface of the electronically-readable ticket 224 may also include a bar code. When the electronically-readable ticket 224 is inserted into a gaming machine, the bar code may be read and processed by another gaming machine so as to derive relevant content related to a prior gaming session. The electronically-readable ticket 224 may be either accepted by the multi-functional peripheral device 228 so as to add previously accumulated credits of another gaming machine to the existing credits or the electronically-readable ticket 224 may be exchanged for cash.

The multi-functional peripheral device 228 may be configured to perform a plurality of gaming and non-gaming functions. In one embodiment, the multi-functional peripheral device 228 may be configured to control and command and/or request the printer to print the electronically-readable ticket 224. In one example, the multi-functional device 228 may include a printer to print the electrically-readable ticket. In another embodiment, the multi-functional peripheral device 228 may be configured to accept cash of a variety of currency or denomination as well as the electronically-readable ticket 224 having a cash value. In another example, the multi-functional device may be used to authenticate the user, conduct social networking functions, act as a wireless communication gateway with portable electronic devices, transfer funds, redeeming a voucher, and other gaming or non-gaming activities or functions.

The multi-functional peripheral device 228 may have at least one sensor device 213. The at least one sensor device 213 can be any device that can detect a sensory input from a user. The at least one sensor device may be an accelerometer, a camera, a microphone, a touchpad, a switch, a touch screen, radio frequency identification reader, a thermal sensor, an IR detector, near-field magnetic reader, and the like. The at least one sensor device 213 may be configured to communicate with a processor of the multi-functional peripheral device 228. In one example, the sensory input may be a predefined user action that may be associated with a gaming or non-gaming function. For example, a sensory input for one tap on a touch pad may be associated with a request to transfer funds. In another example, a sensory input for two taps on a touch pad may be associated with a "Hit" request while playing a video black jack game of chance. In still another example, a sensory input of one tap detected by an accelerometer may be associated with a confirmation to cash out of the gaming machine. It will now be known that many other combinations and/or predefined actions may be possible and are contemplated.

The secondary display 212, the keypad 218, and the player tracking device 220 may, in conjunction, comprise a player tracking service to provide for the accurate recording of information obtained during the gaming session. The player tracking service may display information relevant to the player's preferences as based on the recorded information on the secondary display 212. The player tracking service may be initiated when a magnetic striped card containing player tracking information is inserted into the player tracking device 220 and a personal identification number (PIN) is entered using the keypad 218. During the player tracking session, commands made by the player may be recorded such as in a memory (e.g. non-volatile random access memory (NVRAM), flash memory, dynamic random access memory ("DRAM")) on the gaming machine, a player tracking server, or in any other data storage device. For example, during the player tracking session, the player tracking software may monitor the amount of time and activity that the player spends at a particular gaming machine, derive timely and accurate marketing information, and subsequently present commercialization opportunities based on that player's gaming preferences.

Figure 2B:
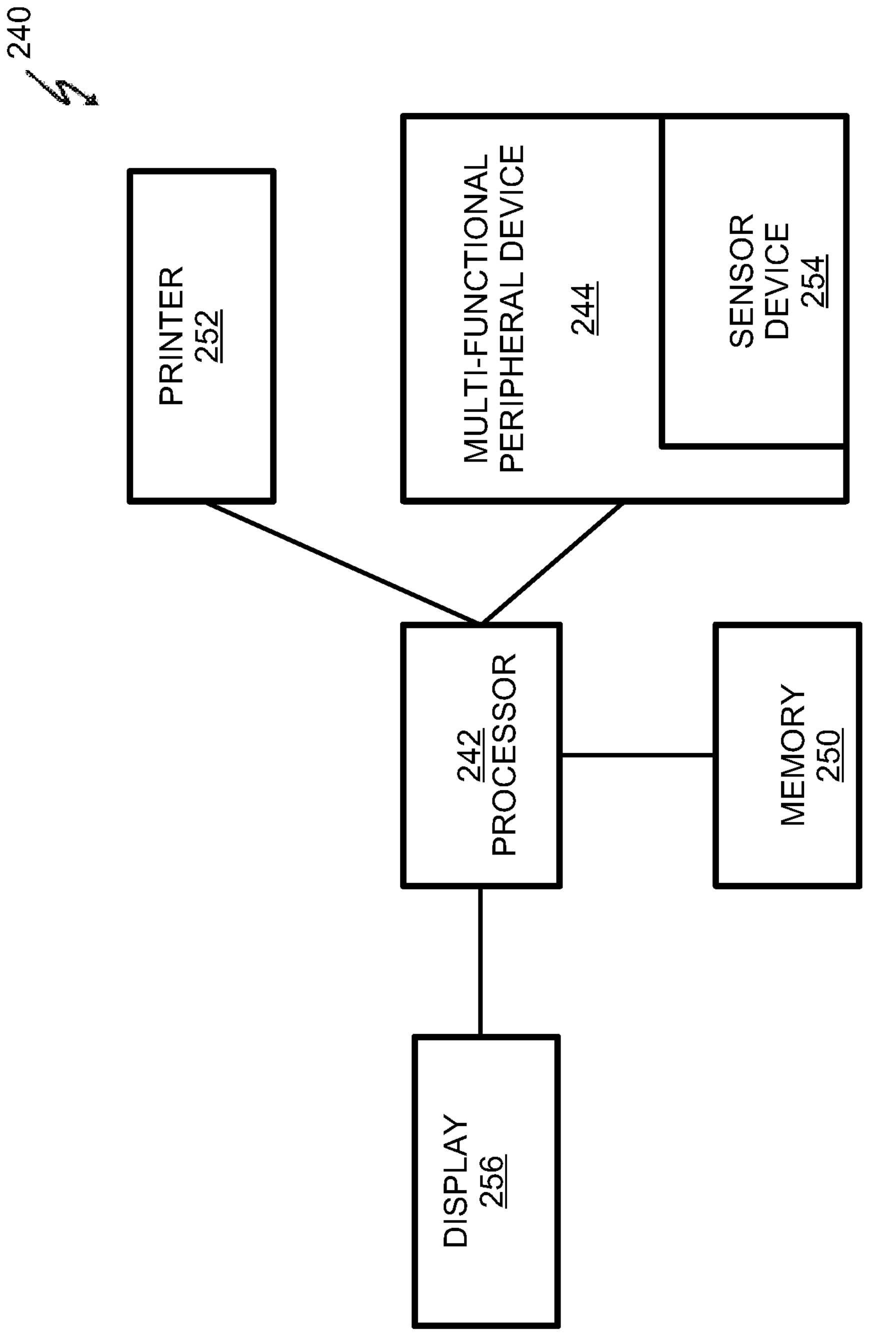

FIG. 2B illustrates an example block diagram of a gaming device. The gaming device 240 can have a processor 242 configured to communicate with a multi-functional peripheral device 244, a memory 250, a printer 252, and a display 256. Although illustrated with specific components, this is not intended to be limiting as any other components may be used, such as an informational display, secondary display, progressive meters, human interface devices, camera, microphone, player tracking device, bill acceptor, and the like.

The multi-functional peripheral device 244 may have at least one sensor device 254. The at least one sensor device 254 can be any device that can detect a sensory input from a user. The at least one sensor device may be an accelerometer, a camera, a microphone, a touchpad, a touch screen, radio frequency identification reader, near-field magnetic reader, fingerprint reader, and the like. The at least one sensor device 254 may be configured to communicate with a processor of the multi-functional peripheral device 244. In one example, the sensory input may be a predefined user action that may be associated with a gaming or non-gaming function. For example, a sensory input for one tap on a touch pad may be associated with a request to transfer funds. In another example, a sensory input for two taps on a touch pad may be associated with a "Hit" request while playing a video black jack game of chance. In still another example, a sensory input of one tap detected by an accelerometer may be associated with a confirmation to cash out of the gaming machine. It will now be known that many other combinations and/or predefined actions may be possible and are contemplated.

Display 256 may be a touch screen display such that the user may input selections via display 256. Display 256 may be display 212 or 208 as illustrated in FIG. 2A. Display 256 may be any type of display configured to present or display information, data, a game of chance, or the like. For example, display 256 may be one of a cathode ray tube, high resolution flat-panel liquid crystal display ("LCD"), a plasma display, a light-emitting diode ("LED") display, or any other monitor and/or display configured to present information and/or allow the user to play a game of chance. The display 256 may include one or more display windows to allow for multiple games or multiple services to be provided simultaneously to a user.

Memory 250 may be type of memory capable of storing data such as game data, game play information, paytables, and the like. Memory 250 may be any type of memory such as dynamic random access memory (DRAM), flash memory, non-volatile random access memory (NVRAM), and the like. Printer 252 may be any type of printer capable of providing receipts, electronically-readable tickets, and the like.

Figure 3A:
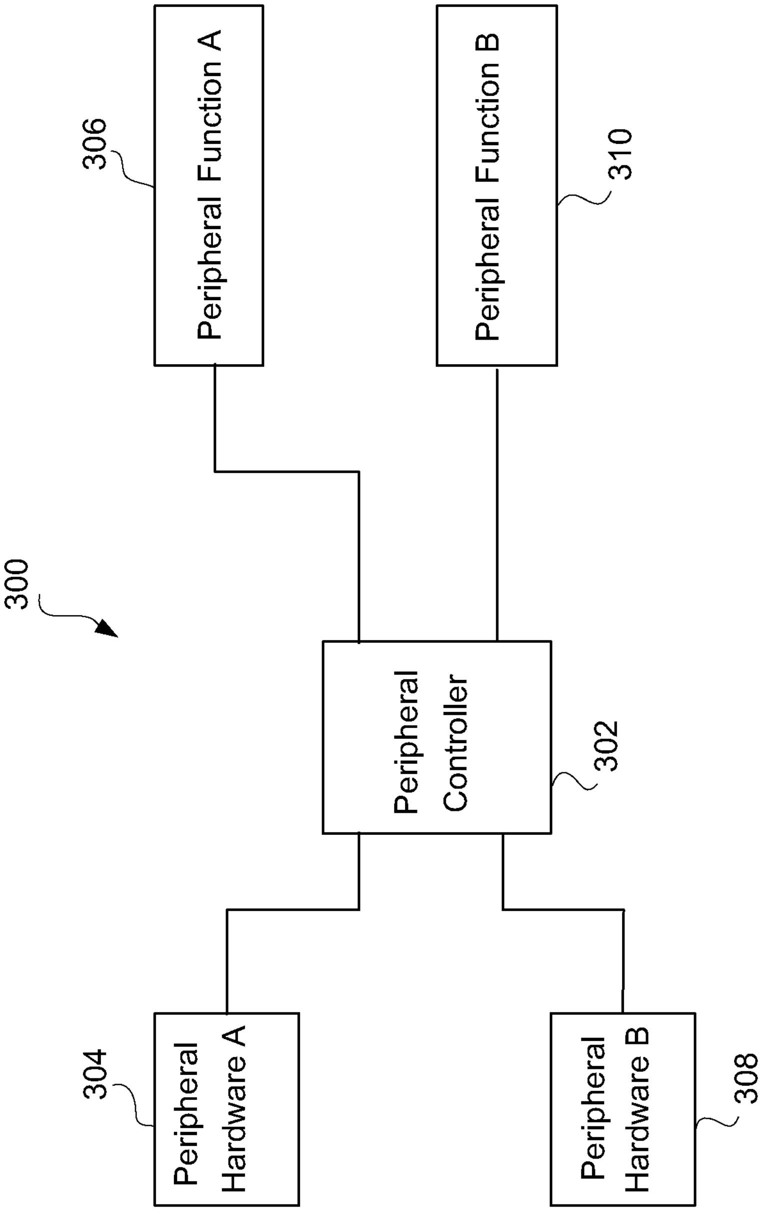
FIGS. 3A and 3B illustrate example block diagrams of a multifunctional peripheral device.
Figure 3B:
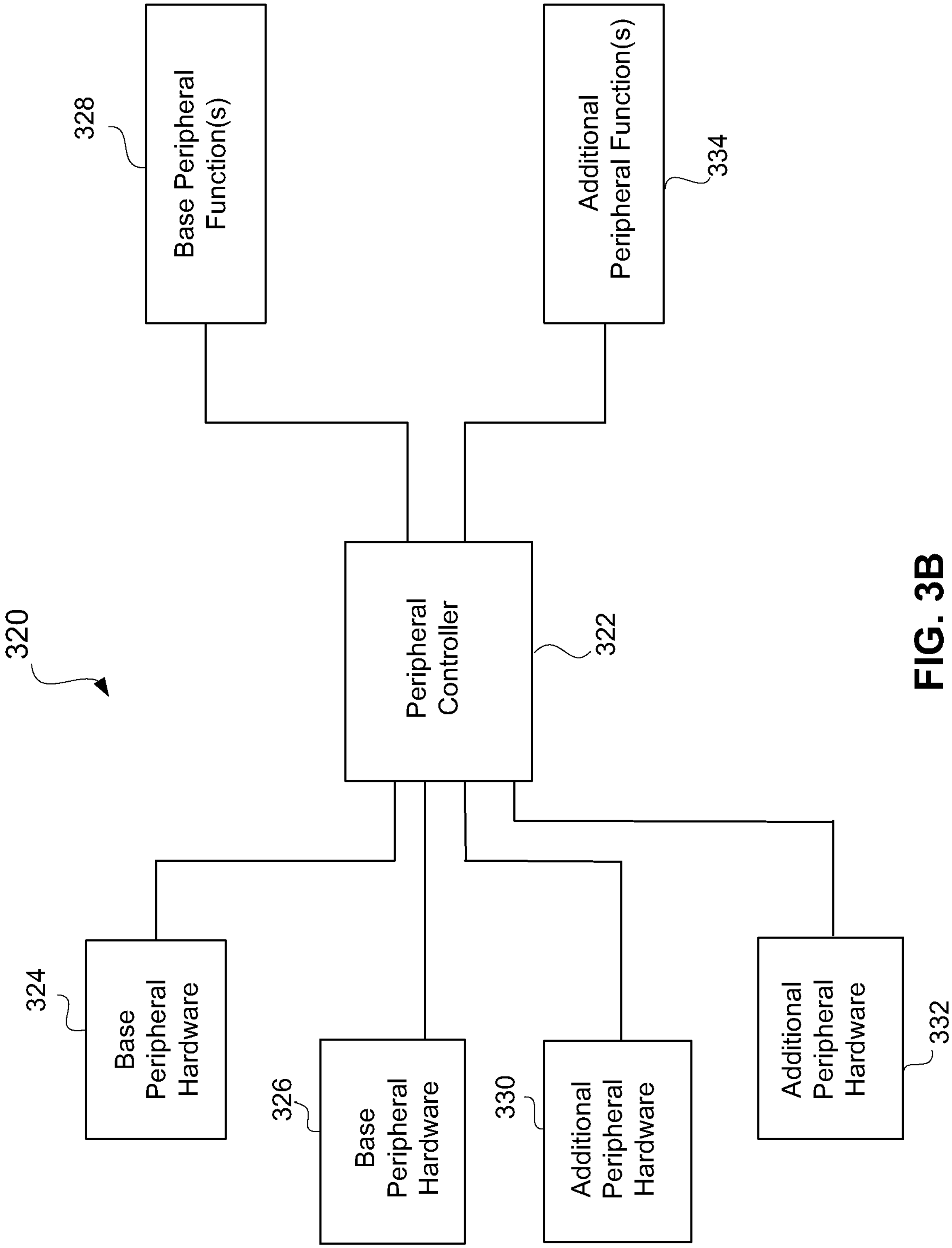

FIGS. 3A and 3B illustrate example block diagrams of a multifunctional peripheral device. Referring to FIG. 3A, typically, the multi-functional peripheral device 300 serves as a peripheral device for a gaming machine. The multi-functional peripheral device 300 can include a peripheral controller 302 that is configured to control operation of the multi-functional peripheral device 300. The peripheral controller 302 can be coupled to a peripheral hardware A 304 and a peripheral function A 306. The peripheral controller 302 can also be coupled to a peripheral hardware B 308 and a peripheral function B 310. In one implementation, the multi-functional peripheral device 300 supports two primary functions, such as a first primary function and a second primary function. The peripheral hardware A 304 and the peripheral function A 306 can be used by the first primary function, while the peripheral hardware B 308 and the peripheral function B 310 can be used by the second primary function.

The gaming machine can include one or more integrated single function peripherals, such as a bill acceptor, a player tracking peripheral, a voucher printer, camera, touch screen, sensory input device (e.g., motion sensor, accelerometer, and the like), user input devices (e.g., buttons and switches), and any other single function peripheral devices. In the multi-functional peripheral device 300, the multiple functions can be consolidated in a single peripheral device. In the multi-functional peripheral device 300, the peripheral device is able to include functionality to operate as two or more function peripherals. As one example, the multi-functional peripheral 300 can provide player tracking and a camera (e.g., for user detection, user authentication, user input, such as gesture recognition, and other gaming or non-gaming functions). As another example, the multi-functional peripheral 300 can provide bill acceptance capabilities and a sensory input device (e.g., accelerometer, camera, touchpad, and the like). In yet another embodiment, the multi-functional peripheral 300 can provide credit/debit/cash card reading and electronic signature capability. In still another embodiment, the multi-functional peripheral device 300 can provide bill acceptance capabilities and voucher printing.

In one embodiment, the multi-functional peripheral device 300 can serve as a peripheral that is added to the gaming machine. The multi-function peripheral device 300 can also replace a legacy peripheral device such as the prevalent single-function bill acceptor, player tracking unit, printer, and any other peripheral device. The multi-functional peripheral device 300 can be integrated with the gaming machine or can be external but connected to the gaming machine via any wired or wireless methods such as such as universal serial bus, Ethernet, Serial Advanced Technology Attachment (SATA), 3rd Generation ("3G") wireless technology, 4th Generation ("4G") wireless technology, Fire Wire, Worldwide Interoperability for Microwave Access ("WiMax"), IEEE 802.11x technology, Near-Field Magnetic Network, radio frequency, and the like.

As previously noted, the multi-functional peripheral device 300 can be a peripheral for the gaming machine. The multi-functional peripheral device 300 can be either a new peripheral device or a replacement peripheral device. When the multi-functional peripheral device 300 is a replacement peripheral device, the multi-functional peripheral device 300 typically includes not only the peripheral function of a peripheral device being replaced but also a least one new peripheral function. Although discussed with use in the gaming machine, this is not intended to be limiting as the multi-functional peripheral device 300 may be used in other technologies and fields such as a banking machine, drink and snack machines, and the like.

FIG. 3B is a block diagram of a multi-functional peripheral device 320 according to another embodiment. Typically, the multi-functional peripheral device 320 serves as a peripheral device for a gaming machine. The multi-functional peripheral device 320 can include a peripheral controller 322 that is configured to control operation of the multi-functional peripheral device 320. The peripheral controller 322 can be coupled to a base peripheral hardware 324 and 326, and a base peripheral function(s) 328. In one implementation, the multi-functional peripheral device 320 supports not only a base peripheral function but also one or more additional peripheral functions. To support at least one additional function, the multi-functional peripheral device 320 can also include an additional peripheral hardware 330 and 332, and an additional peripheral function(s) 334. The peripheral controller 322 can also be coupled to the additional peripheral hardware 330, the additional peripheral hardware 332, and to the additional peripheral function(s) 334.

The multi-functional peripheral device 320 can thus be used to replace an existing peripheral device. Here, the base peripheral hardware 324 and 326 and the base peripheral function(s) 328 can serve to enable the multi-functional peripheral device 320 to in effect provide (at least) the same capabilities as the existing peripheral device. Moreover, the additional peripheral hardware 330 and 332 and the additional peripheral function(s) 334 can serve to provide the multi-functional peripheral device 320 with additional capabilities beyond that available in the existing peripheral device. In one implementation, the multi-functional peripheral device 320 can have the same form factor as the existing peripheral device so that the multi-functional peripheral device 320 is conveniently able to be swapped for the existing peripheral device.

Figure 4A:
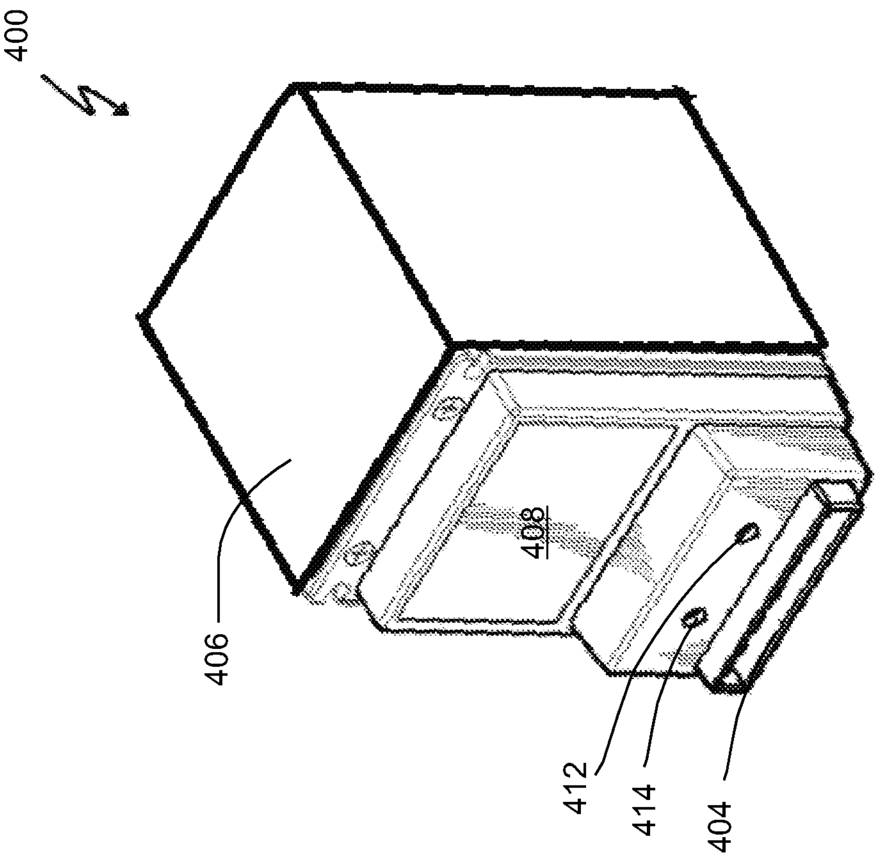
FIGS. 4A-4B illustrate an embodiment of a multi-functional peripheral device.
Figure 4B:
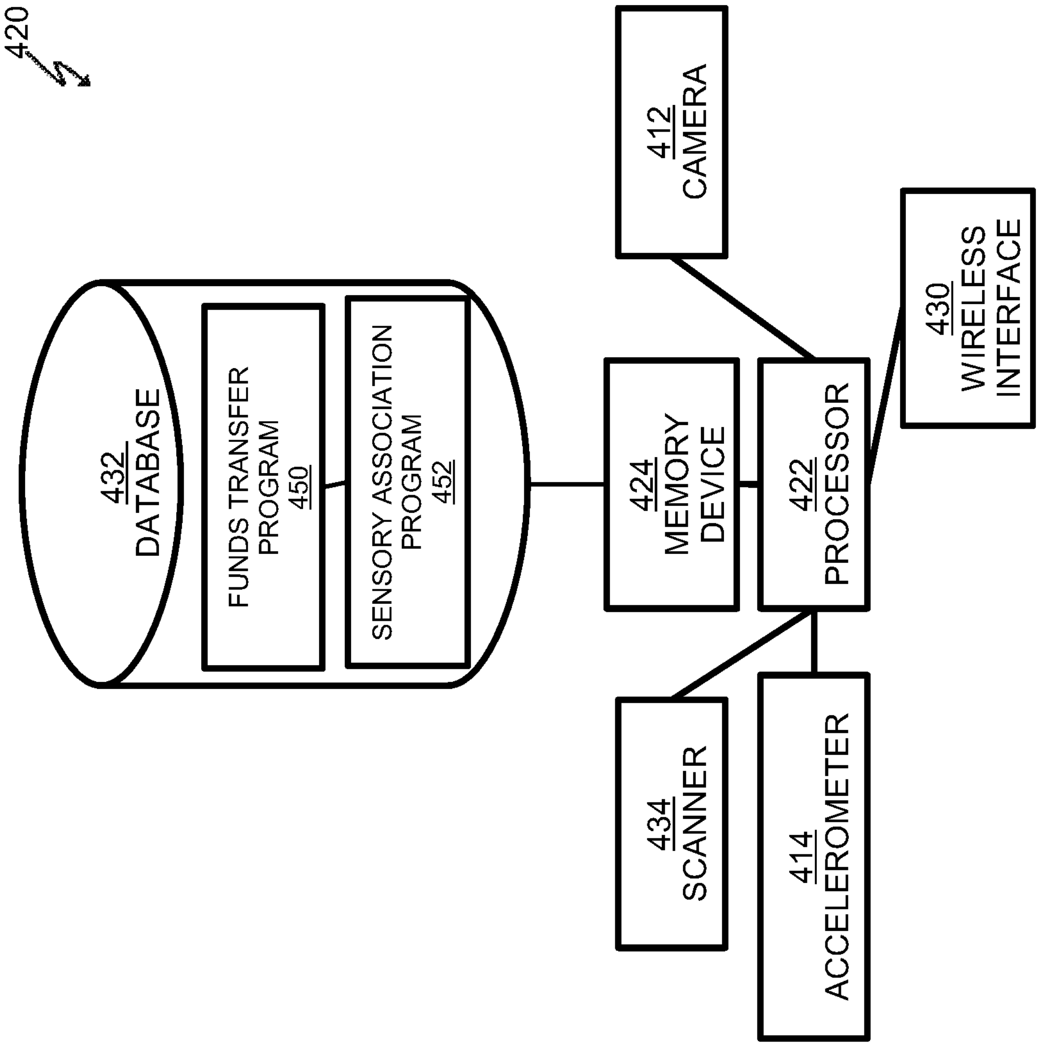

FIGS. 4A-4B illustrate an embodiment of a multi-functional peripheral device. FIG. 4A illustrates a perspective view of an example multi-functional peripheral device. In one embodiment, as illustrated, the multi-functional peripheral device 400 may be a bill acceptor. The multi-functional peripheral device 400 may be encased in a housing 406 to encase at least one sensory device such as an accelerometer 414, a camera 412, and a value receiving device 404. The multi-functional peripheral device 400 may also have at least one display 408 to display information and data to the user. Although illustrated with three sensor devices, this is not intended to be limiting as any number and/or types of sensor device may be used such as a microphone, touchpad, retina scanner, radio frequency identification reader, thermal sensor, near-field magnetic reader, or any other device capable of receiving and detecting sensory input. For instance, the touchpad could be integrated to give the bill acceptor electronic signature capturing capability.

The at least one display 408 may be any type of display configured to present or display information, data, instructions, successful or error notifications, transferred fund amounts, and the like. The at least one display 408 may be one of a cathode ray tube, high resolution flat-panel LCD, a plasma display, an LED display, touch screen, or any other similar type of display. In one example, the at least one display 408 may present gaming and non-gaming related events and promotions offered by a gaming establishment such as future contests, tournaments, restaurant specials, discounts at stores, and the like. The at least one display 408 may further include a touch screen to capture player inputs.

Value receiving device 404 may be configured to accept multiple forms of credit and values. For example, value receiving device 404 may be configured to accept monetary bills of varying currency, types, and denominations, credit cards, cash cards, electronically-readable tickets, paper vouchers, digital vouchers (e.g., digital version of the paper voucher presented on a portable electronic device's display, a digital file, a script, and the like), an RFID tag, and the like. In one embodiment, value receiving device 404 may include a scanner (e.g. scanner 434 as illustrated in FIG. 4B) to detect the currency, credit card, and/or tickets. In another embodiment, value receiving device 404 may include a card reader to read smartcards, magnetic stripe cards, RFID cards, near-field magnetic cards, and the like. In yet another embodiment, value receiving device 404 may include one or more RF transceivers to receive digital transmissions that represent digital vouchers that contain all the data needed to complete the transaction (e.g., transaction identification (ID), casino ID, amount of credit, time, expiration date, value of voucher, player ID, and the like).

The camera 412 may be any device capable of capture images and video. In one embodiment, the camera 412 may allow the multi-functional device 400 to authenticate a user or portable electronic device, scan the barcode of a paper voucher, scan a barcode displayed on the portable electronic device, assist a player to play a game of chance on the gaming device, conduct video conferencing, and perform other gaming or non-gaming functions. For example, the camera 412 may be a smart camera configured to conduct facial recognition of the player for authentication and/or verification purposes. For example, the camera 412 may take a picture of the player, which is transmitted to authentication server (e.g. authentication server 130 as illustrated in FIG. 1) from multi-functional peripheral device 400. Authentication server may then compare the picture with other pictures in its database for a match.

In another example, the camera 412 may be used to assist the user to play a gaming of chance on the gaming machine. Camera 412 may detect user gestures which represent and/or are associated with at least one gaming function to play the game of chance. In one example, in a video black jack game, the user may move his hands horizontally to "Stand" or move his hands vertically to "Hit". The camera 412 may detect such sensory inputs and transmit them to the multi-functional peripheral device 400 for processing.

An accelerometer 414 may be configured to detect sensory input. The accelerometer 414 may be any device used to detect movement, displacement, and the like such as a piezoelectric accelerometer, shear mode accelerometer, thermal accelerometer, bulk micro-machined capacitive accelerometer, capacitive spring mass base accelerometer, and the like. The accelerometer 414 may be configured to detect the sensory input and transmit notification of the input to the multi-functional peripheral device 400 for processing. In one example, the accelerometer 414 may be configured to assist the user with a transfer of funds to or from the gaming machine as further described in detail with reference to FIGS. 6-9.

In another example, accelerometer 414 may be configured to assist the user in playing a gaming of chance on the gaming machine. For example, accelerometer 414 may detect user gestures which represent and/or are associated with at least one gaming function to play the game of chance. In one example, in a video black jack game, the user may tap the accelerometer once to "Hit", twice to "Stand", and three times to "Double Down". The accelerometer 414 may detect such sensory inputs and transmit them to the multi-functional peripheral device for processing.

FIG. 4B Illustrates a block diagram of the multi-functional peripheral device illustrated in FIG. 4A. The multi-functional peripheral device 420 may have a processor 422 configured to communicate with at least one sensory device such as an accelerometer 414, a camera 412, and a scanner 434. Scanner 434 may be used in conjunction with value receiving device 404 illustrated in FIG. 4A.

Figure 5:
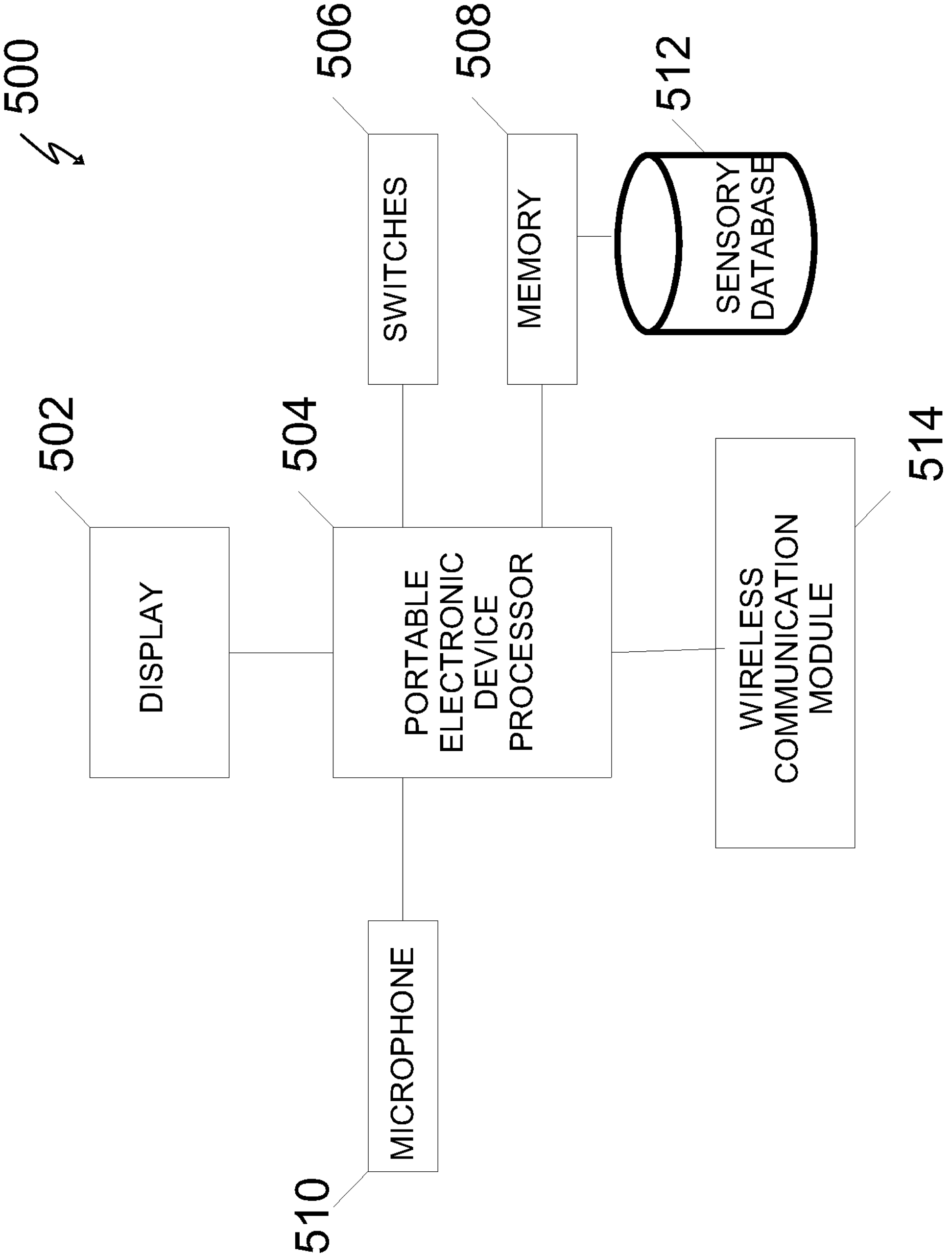
FIG. 5 illustrates an example block diagram of a portable electronic device.

The multi-functional peripheral device 420 may also have a wireless interface 430 configured to communicate with remote computing devices such as a portable electronic device (e.g. portable electronic device 110 illustrated in FIG. 1 and portable electronic device 500 illustrated in FIG. 5). Wireless interface 430 may be any known wireless methods or device such as a 3G wireless technology, 4G wireless technology, Bluetooth, Wireless USB, Near-field magnetic, Fire Wire, WiMax, IEEE 802.11x technology, radio frequency, and the like.

Multi-functional peripheral device 420 may also have a memory 424 storing a database 432. Memory 324 may be any memory configured to store information or data such as non-volatile random access memory (NVRAM), dynamic random access memory (DRAM), Ferroelectric Random Access Memory (FRAM), Electrically Erasable Programmable Read-Only Memory (E2PROM), flash memory, a disk drive, and the like.

Database 432 may be configured to store data and software programs such as a funds transfer program 450, a sensory association program 452, and the like. Funds transfer program 450 may be configured to assist with the transfer of funds from or to the gaming machine by a portable electronic device as further described with reference to FIGS. 6-9. Sensory association program 452 may be configured to associate sensory input received by the at least one sensor device to a gaming or non-gaming function based on the context in which the sensory input is detected. For example, the multi-functional peripheral device may, simultaneously or in conjunction with the detection of the sensory input, receive a funds transfer request from the portable electronic device. Thus, a sensory input detection of one tap (e.g. an accelerometer associated with the multi-functional peripheral device may detect movement of one tap) may be associated with an initiation to transfer funds to a gaming machine in the context of a transfer of funds. In another example, a sensory input detection of two taps (e.g. a touch pad associated with the multi-functional peripheral device may detect movement of two taps) may be associated with an initiation to transfer funds from a gaming machine in the context of a transfer of funds—in other words, the player has completed playing the game of chance and would like to cash out his credits from the gaming machine. In another example, the multi-functional peripheral device 420 may detect that the portable electronic device is being used as a remote device to play a game of video black jack on a gaming machine. If the processor 422 receives notification of a sensory input for two taps (e.g. the accelerometer 414 associated with the portable electronic device 420 may detect movement of two taps), the two taps may be associated with a "Hit" request in the context of playing a game of video black jack. Processor 422 may then prepare and transmit a hit request to the gaming machine.

Figure 4C:
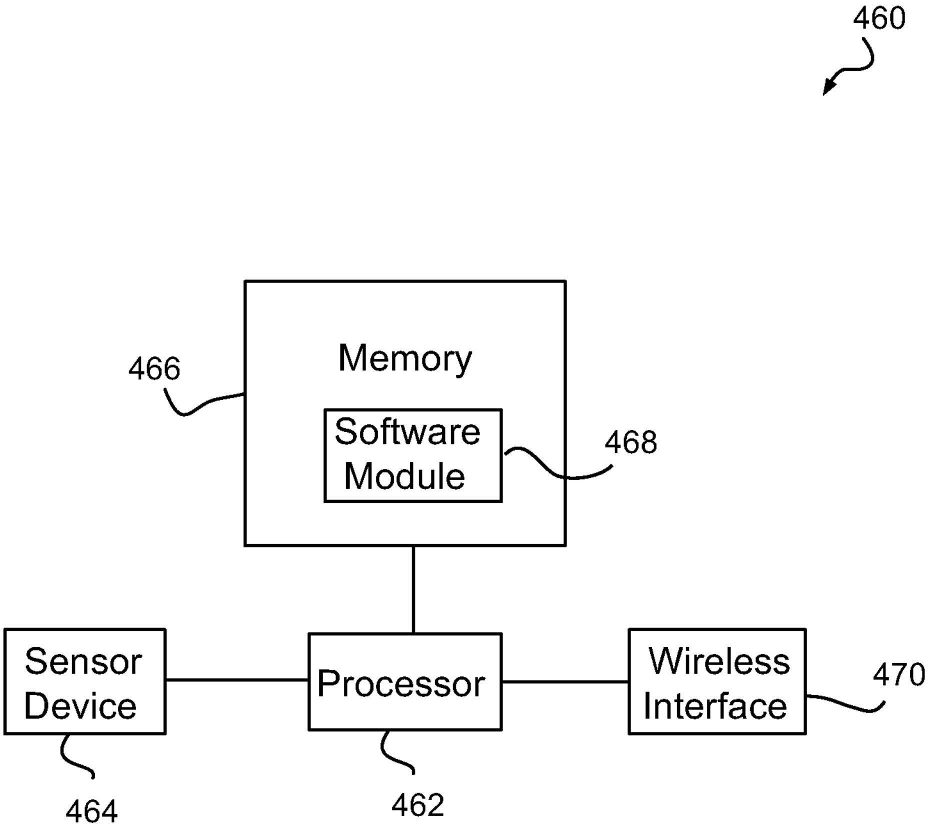
FIG. 4C illustrates a block diagram of an exemplary multi-functional peripheral device for use with a value transfer device.

FIG. 4C illustrates a block diagram of another exemplary multi-functional peripheral device. The multi-functional peripheral device 460 may be used with another device, such as a value transfer device. The value transfer device may be a gaming machine, an automatic teller machine, a kiosk, a portable electronic device, or the like. The multi-functional peripheral device 460 can be any device that performs two or more peripheral functions. Examples of peripheral functions may include currency acceptance, ticket printing, player tracking functions, and the like. The multi-functional peripheral device can have a processor 462 configured to communicate with a wireless interface 470, a sensor device 464, and a memory 466. In one embodiment, the processor 462 may be configured to communicate with the value transfer device. In another embodiment, the processor 462 may be configured to communicate with a server, such as a gaming server, an authentication server, a TITO server, a player tracking server or any other server external to the multi-functional peripheral device and the value transfer device.

The wireless interface 470 can be configured to wirelessly communicate with other devices such as portable electronic devices, portable game playing devices, gaming devices, and the like. In one embodiment, the wireless interface 470 may be configured to wirelessly communicate with the value transfer device. In another embodiment, the wireless interface 462 may be configured to wirelessly communicate with the server. The wireless interface 470 can use any wireless communication technology such as IEEE 802.11x, Bluetooth, cellular technology such as 3G and 4G, radio frequency, near-field magnetics, and the like.

The sensor device 464 may be configured to monitor for a sensory input and transmit a signal. The sensor device 464 may include a sensor and a circuit mounted to a carrier. The carrier can pertain to a substrate such as a circuit board. The sensor can be configured to detect a sensory input. In one embodiment, the sensor may be an accelerometer configured to detect sensory inputs, such as vibrations, accelerations and other movement. The circuit may consist of electronic components such as resistors, capacitors, microchips and the like. The circuit may be configured to communicate with the sensor and be configured to process and generate a signal following detection of the sensory input by the sensor. The circuit can also be configured to transmit the signal to the processor 462.

The memory 466 may be any type of memory configured to store information or data such as non-volatile random access memory (NVRAM), dynamic random access memory (DRAM), ferroelectric random access memory (FRAM), electrically erasable programmable read-only memory (E2PROM), flash memory, hard disk, and the like. The memory 466 can store at least one software module 468. The software module 468 may include a value transfer program configured to assist with the transfer of funds between a portable electronic device and the value transfer device.

In one embodiment, the value transfer program may be configured to authenticate the portable electronic device, a physical voucher (e.g., paper voucher), or a digital voucher (e.g., a file) being transferred to/from the portable electronic device. However, the authentication may be conducted by any other device such as the value transfer device, the gaming machine, a third party server, or any other device or server. The value transfer program may be configured to initiate a fund transfer, direct funds to be transferred to at least one final destination, and perform other such actions in the transfer of funds.

Figure 4D:
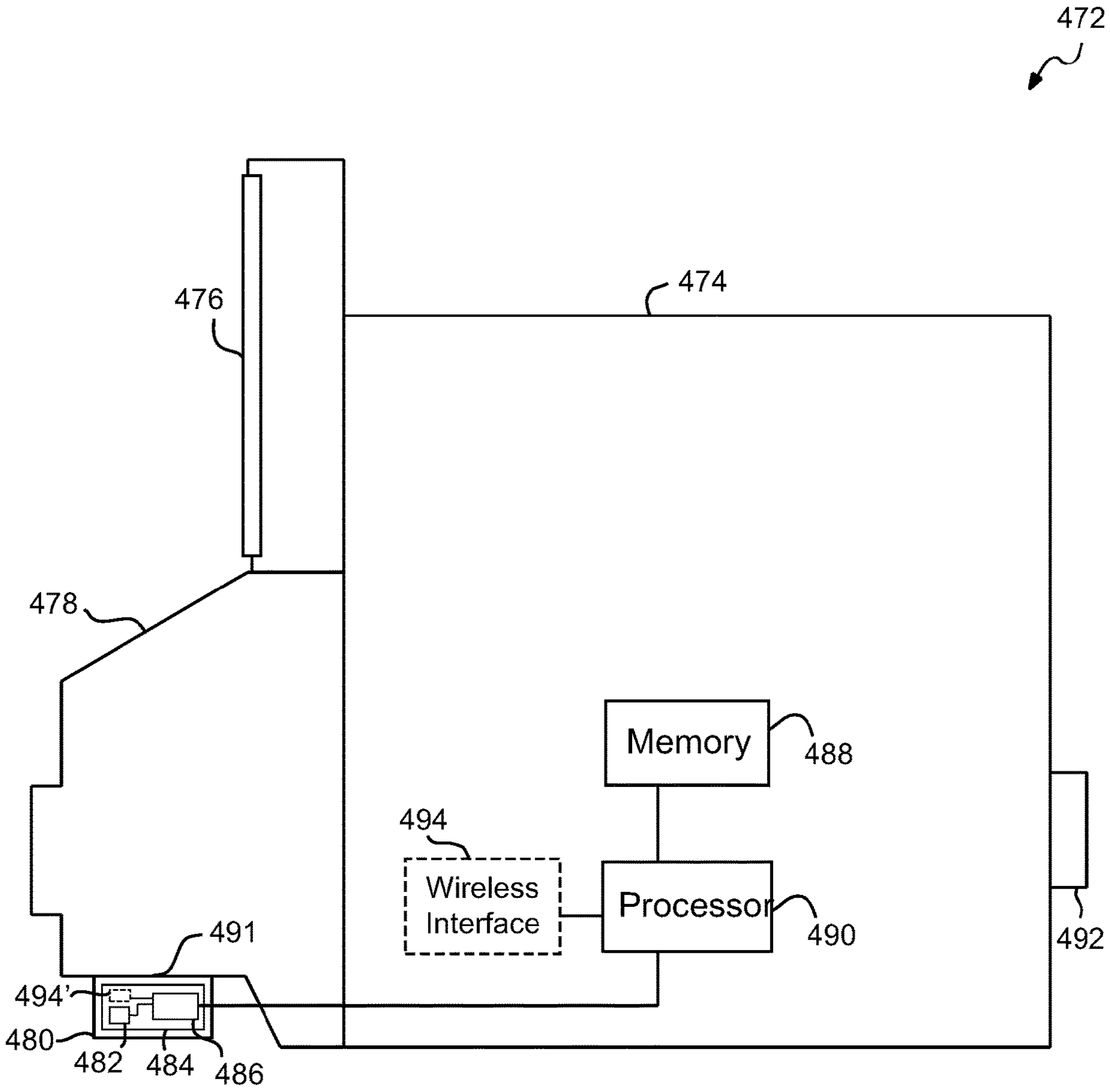
FIG. 4D illustrates a side view of an example multi-functional peripheral device.

FIG. 4D illustrates a side view of an example multi-functional peripheral device. The multi-functional peripheral device 472 is illustrated as a bill acceptor, but this is not intended to be limiting as the multi-functional peripheral 472 device can be any device that performs two or more peripheral functions. For example, the multi-functional peripheral device 472 may accept currency, print tickets and receipts, perform player tracking functions, and the like. The multi-functional peripheral device 472 can operate as an external or internal peripheral device to a value transfer device, such as a gaming machine, an automatic teller machine, a kiosk, a portable electronic device, or the like. The multi-functional peripheral device 472 may include a housing 474, a display 476 and a bezel 478. Processor 490, memory 488, and wireless interface 494, may be contained or housed within housing 474.

In one embodiment, bezel 478 may have a visual or audio element configured to draw attention to the multi-functional peripheral device 472. In one embodiment, the visual element can be graphics, text, or other similar indicia to draw the player's attention to the multi-functional peripheral device 472. In another embodiment, the visual element can be a light source. For example, the bezel 478 can contain blinking light emitting diodes that attract casino visitors to a slot machine. If the multi-functional peripheral device 472 has bill acceptor functionality, the bezel 478 may control and guide entry of bills, coins, cards, tickets and the like into the multi-functional peripheral device 472. In another embodiment, the audio element may be speakers configured to emit music, advertisements, random sounds, and the like.

The bezel 478 can be coupled to a front side of the housing 474 with adhesive, bonding agent, screws, bolts, nails or any other attachment means. The bezel 478 may be formed or made from plastic, metal, or other materials.

The sensor device 480 may be configured to monitor and receive a sensory input and transmit a signal associated with the sensory input. The sensor device 480 can be coupled to the bezel 478 with adhesive, bonding agent, screws, bolts, nails or any other materials commonly used for attachment. Although the sensor device 480 is illustrated as being coupled to the bottom surface 491 of the bezel 478, this is not intended to be limiting as the sensor device 480 can be coupled to any surface of the bezel 478 or other surfaces of the housing 474.

The sensor device 480 may include a carrier 484, a sensor 482, and a circuit 486. The carrier 484 can be a circuit board or any similar medium upon which the sensor 482 and the circuit 486 can be mounted to. The sensor 482 may be in communication with the circuit 486. The sensor 482 may be configured to detect or receive the sensory input from, for example, a portable electronic device. The sensor 482 can include one or more accelerometers, cameras, microphones, touchpads, retina scanners, radio frequency identification readers, near-field magnetic readers, or any other type of sensors. In one embodiment, the sensor 482 may be an accelerometer and the sensory input may be accelerations or vibrations. The circuit 486 may consist of electronic components such as resistors, capacitors, microchips and the like. The circuit 486 may be configured to generate a signal following detection of the sensory input by the sensor 482. The circuit 486 can also be configured to transmit the signal to the processor 490.

The memory 488 can store at least one software module. The memory 488 may be any type of memory configured to store information or data such as an NVRAM, DRAM, FRAM, E2PROM, flash memory, hard disk, and the like. In one embodiment, the software module may include a fund transfer program configured to assist with the transfer of funds between the portable electronic device and any device housing the multi-functional peripheral device 472 such as a gaming machine, an automatic teller machine, another portable electronic device, or a kiosk.

In one embodiment, the fund transfer program may be configured to authenticate the portable electronic device. However, the authentication may be conducted by any other device such as the value transfer device, a gaming machine, a third party server, or any other device or server. The fund transfer program may be configured to initiate a fund transfer, direct funds to be transferred to at least one final destination, and perform other such actions in the transfer of funds.

The wireless interface 494 can be configured to wirelessly communicate with other devices such as portable electronic devices, portable game playing devices, value transfer devices, gaming devices, and the like. The wireless interface 494 can use any wireless communication technology such as IEEE 802.11x, Bluetooth, cellular technology such as 3G and 4G, radio frequency, near-field magnetics, and the like. In one embodiment, the wireless interface 494 can be disposed within the housing 474 and configured for direct communication with the processor 490. In another embodiment, the wireless interface 494' may be disposed within the sensor device 480.

The multi-functional peripheral device 472 can have an input/output interface 492 configured to facilitate communication with other devices.

Figure 4E:
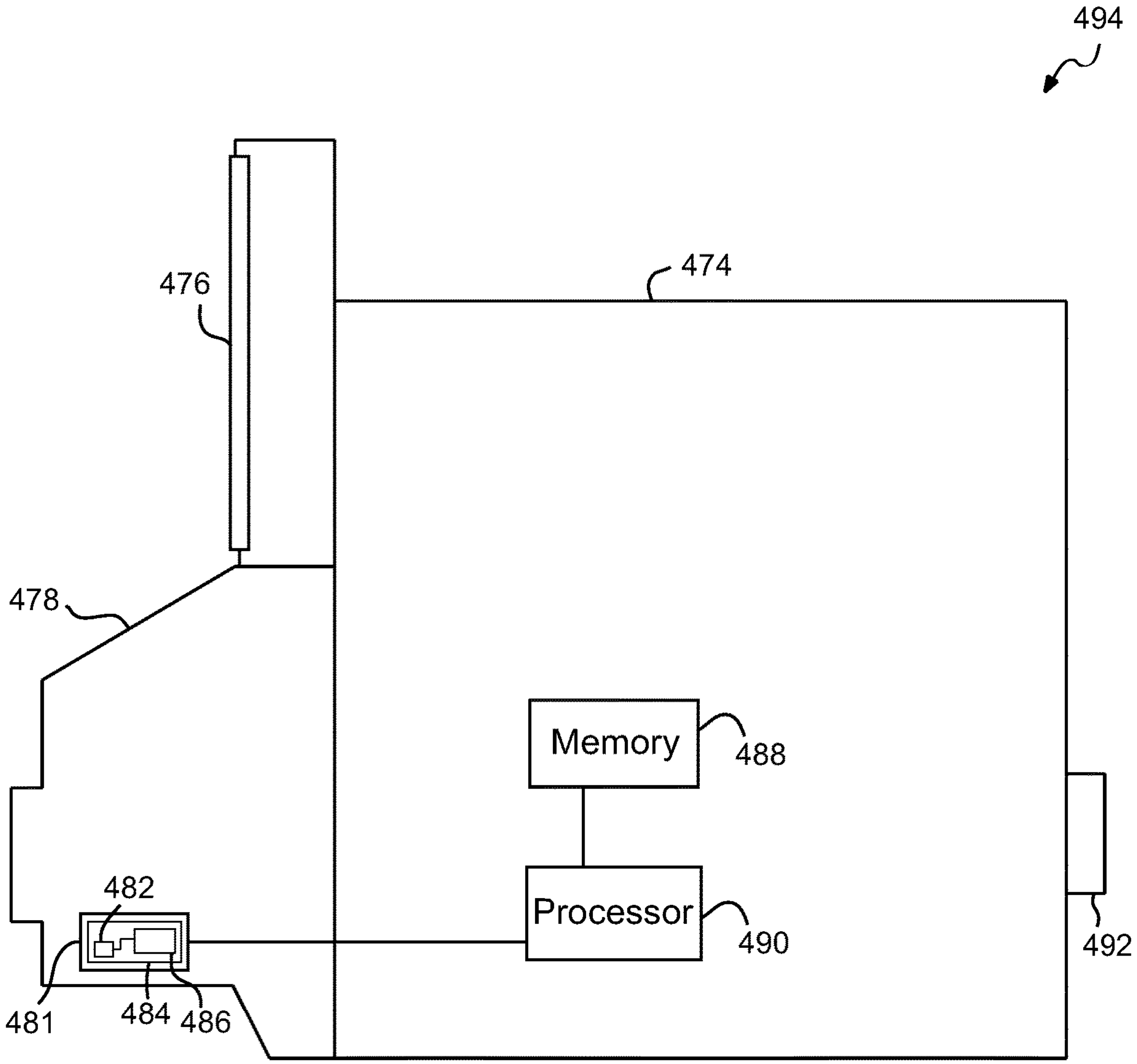
FIG. 4E illustrates a side view of another example multi-functional device.

FIG. 4E illustrates a side view of another example multi-functional device. The multi-functional peripheral device 494 is illustrated as a bill acceptor, but this is not intended to be limiting as the multi-functional peripheral 472 device can be any device that performs two or more peripheral functions. The multi-functional peripheral device 494 may include a housing 474, a display 476, a bezel 478, a sensor device 481, a memory 488, a processor 490, and an input/output interface 492 s.

In this embodiment, similar to FIG. 4D, sensor device 481 can be positioned or housed within the bezel 478. In one embodiment, the bezel 478 can include a cavity within which the sensor device 480 resides. In another embodiment, the sensor device 480 may be integrated into the bezel 478. For example, the sensor device 480 can be placed within a mold. Liquid plastic or metal material may then be poured into the mold to encase the sensor device 480. The liquid plastic material can then harden to form the bezel 478 around the sensor device 480. In yet another embodiment, various components of the sensor device 480, such as the sensor 482, the circuit 486, and the carrier 484, may be separately disposed within the bezel 478.

FIG. 5 illustrates an example block diagram of a portable electronic device. The portable electronic device 500 may be any type of portable computing device. For example, portable electronic device 500 may be a cellular phone, portable media player, PDA, netbook, portable computer, electronic reader, and the like. Portable electronic device 500 may have a processor 504, display 502, memory 508, at least one user button or switch 506, sensor device 510 configured to receive any type of sensory input, and a wireless communication module 514. Although illustrated with specific components, this is not intended to be limiting as portable electronic device 500 may have other components such as an antenna, power source, speaker, camera, and the like.

Display 502 may be any type of display such as a touch screen display, LCD, plasma display, LED display, or any other monitor and/or display configured to present information and/or allow the user to play a game of chance. For example, display 502 may be configured to display a plurality of indicators (as discussed and illustrated in FIGS. 6A-6G). Each indicator may be associated with or correspond to one or more applications stored in the memory 508. Selection of one of the plurality of indicators may initiate the one or more applications. In one embodiment, display 502 may include a touch screen sensor such that the processor may be configured to detect a user selection of at least one of the indicators. In another embodiment, selection of one of the plurality of indicators may be made using switches 506.

Wireless communication module 514 may be configured to transmit and receive information or data from multi-functional peripheral device. Wireless communication module 514 may be any module capable of wireless transmission such as 3G wireless technology, 4G wireless technology, Bluetooth, wireless USB, wireless UWB), WiMAX, near field communication, radio frequency, and the like. In one embodiment, wireless communication module 514 may be configured to transmit gaming and non-gaming requests to the multi-functional peripheral device (e.g. multi-functional peripheral device 102 illustrated in FIG. 1 or multi-functional peripheral device 244 illustrated in FIG. 2B). For example, the portable electronic device may transmit a funds transfer request to transfer funds to the gaming machine to allow the player to play a game of chance on the gaming machine. In another embodiment, the portable electronic device may transmit a cash-out request to print an electronically-readable ticket on the printer of the gaming machine. In still another embodiment, the portable electronic device may transmit a reservation request to reserve a table at a restaurant at the gaming establishment.

The sensor device 510 can be any device that can detect a sensory input from a user. The at least one sensor device may be an accelerometer, a camera, a microphone, a touch-pad, a touch screen, radio frequency identification reader, near-field magnetic reader, and the like. The sensor device 510 may be configured to communicate with the portable electronic device processor 504. In one example, the sensory input may be a predefined user action that may be associated with a gaming or non-gaming function. For example, a sensory input for one tap on a touch pad may be associated with a request to transfer funds. In another example, a sensory input for two taps on a touch pad may be associated with a "Hit" request while playing a video black jack game of chance. In still another example, a sensory input of one tap detected by an accelerometer may be associated with a confirmation to cash out of the gaming machine. It will now be known that many other combinations and/or predefined actions may be possible and are contemplated.

Portable electronic device 500 may have a memory 508 configured to store any type of information, data, and/or software to play a game of chance on a gaming machine and/or perform any other gaming functions such as checking a player tracking account, transferring funds to play the game of chance, and the like. Memory 508 may be any type of memory such as DRAM, NVRAM, Ferro-electric Random Access Memory (FRAM), Flash memory, Electrically Erasable Programmable Read-Only Memory (E2PROM), and the like.

In use, when processor 504 receives a notification of a sensory input from sensory device 510, processor 504 may determine what the user is requesting based on the associated function of the sensory input received. The sensory input may be a predefined user action that may be associated with a gaming or non-gaming function and may be context based. In one embodiment, processor 504 may be configured to communicate with memory 508, which may include a sensory database 512, to determine the function of the sensory input. In another embodiment, processor 504 may be configured to communicate directly with sensory database 512. Sensory database 512 may be configured to store information such as the type of sensory input detected, the function associated with the sensory input, and the context for which the sensory input was provided. For example, the user may have selected a "Transfer Funds" indicator on the portable electronic device. Thus, if the processor receives notification of a sensory input for one tap (e.g. the accelerometer associated with the portable electronic device 500 may detect movement of one tap), the one tap may be associated with an initiation to transfer funds to a gaming machine in the context of a transfer of funds. Processor 504 may then prepare and transmit a funds transfer request to the multi-functional peripheral device. The funds transfer request may include any information necessary to facilitate a transfer of funds such as a portable electronic device identifier, destination address (e.g. which gaming machine to transfer the funds to), amount of funds to be transferred, and the like.

In another example, portable electronic device 500 may be used as a remote device to play a game of video black jack on a gaming machine. If the processor receives notification of a sensory input for two taps (e.g. the accelerometer associated with the portable electronic device 500 may detect movement of two taps), the two taps may be associated with a "Hit" request in the context of playing a game of video black jack. Processor 504 may then prepare and transmit a hit request to the multi-functional peripheral device.

Figure 6A:
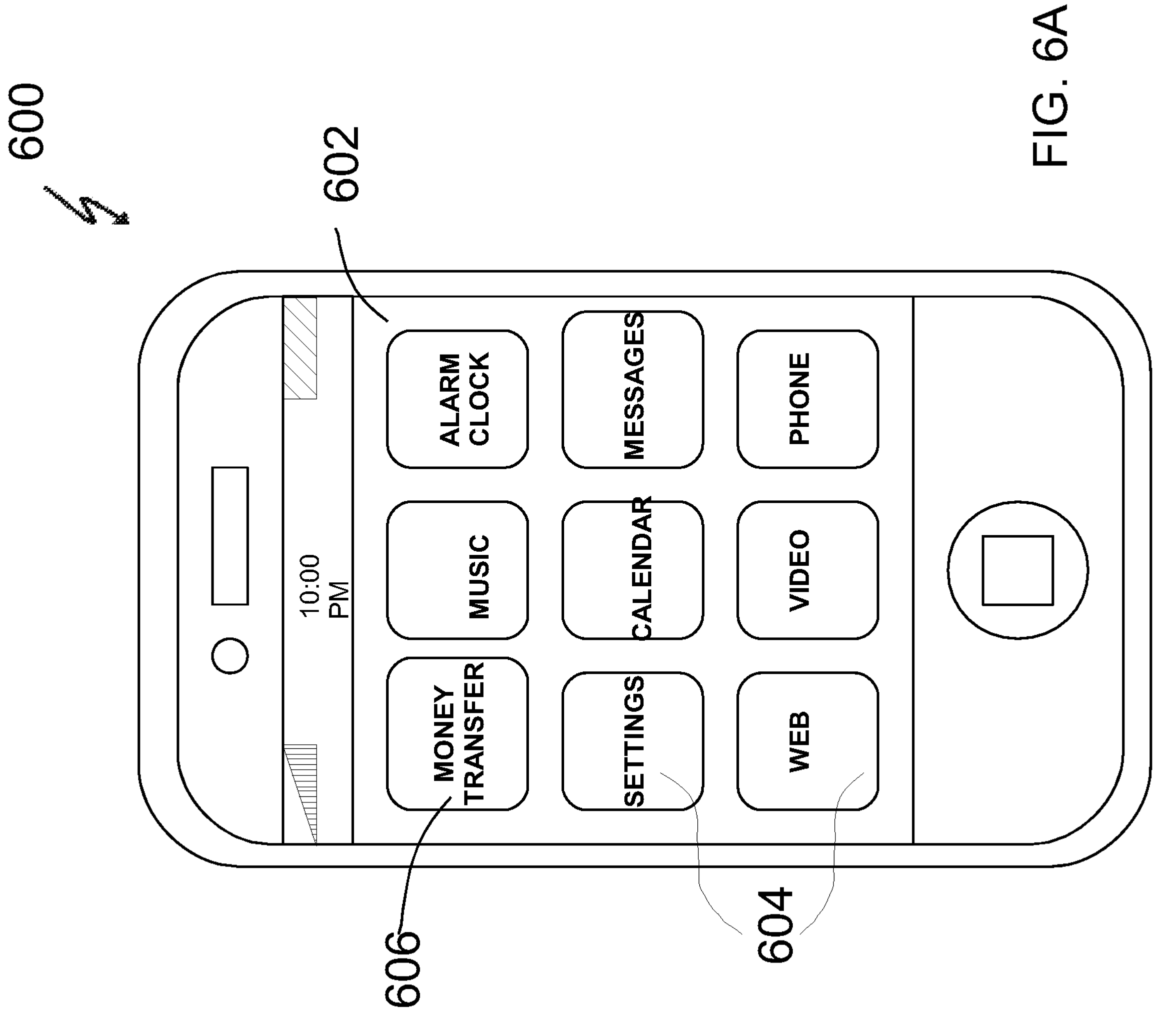
FIGS. 6A-6G illustrate exemplary graphical user interfaces of a portable electronic device for communicating with a gaming machine.

FIGS. 6A-6G illustrate exemplary graphical user interfaces of a portable electronic device for communicating with a gaming machine. FIG. 6A illustrates an exemplary user selectable menu displaying a plurality of indicators 604 on a display 602 of the portable electronic device 600. Each of the plurality of indicators 604 may correspond to an associated software application stored in a database (e.g. database 512 as illustrated in FIG. 5) of the portable electronic device 600. The portable electronic device 600 may initiate a software application when a user selection of a corresponding indicator 604 is detected. For example, a user may select the "Casino Money Transfer" indicator 606, which may be detected by the portable electronic device processor. The portable electronic device processor may associate the selection of the "Casino Money Transfer" indicator 606 to a funds transfer program on the portable electronic program and initiate the funds transfer program.

Figure 6B:
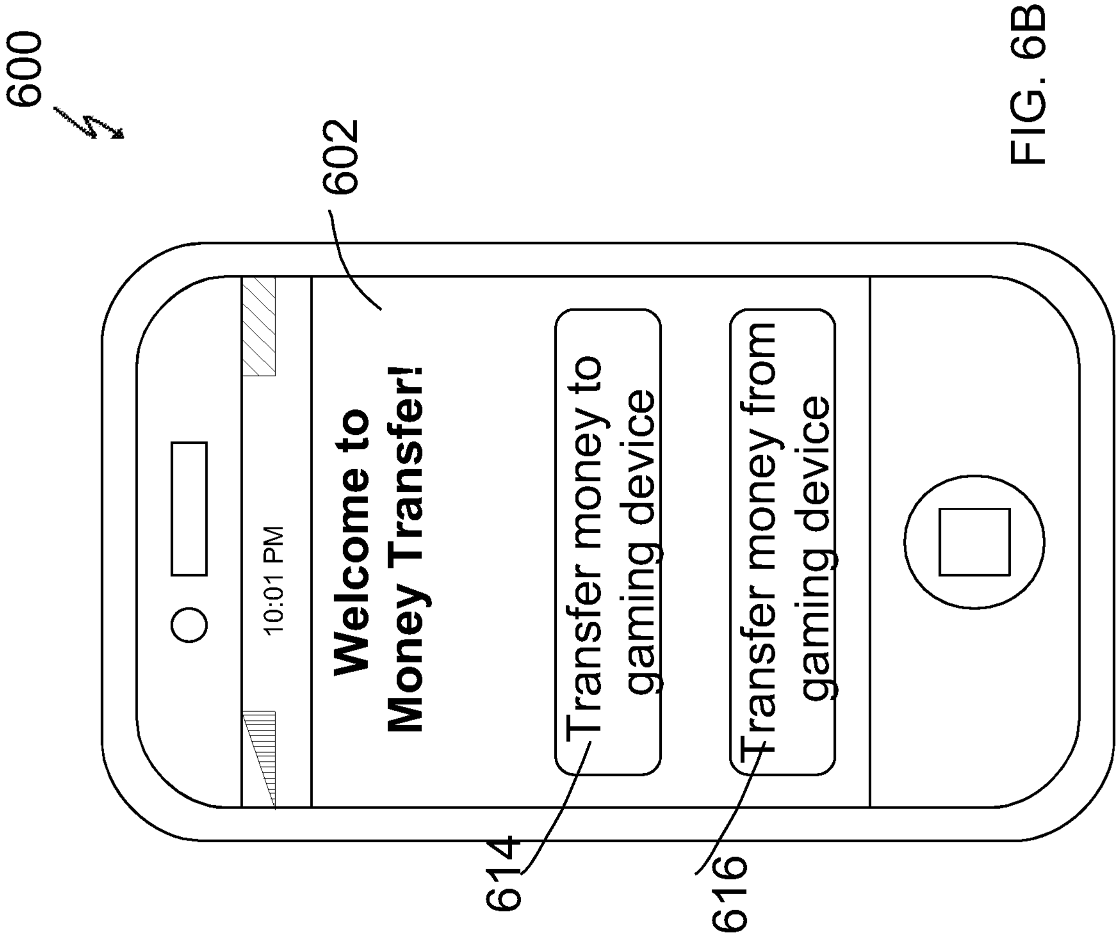

FIG. 6B illustrates an exemplary initial graphical user interface for a funds transfer program. The user of the portable electronic device may be prompted to select whether to transfer funds from the portable electronic device to the gaming device or to transfer funds from the gaming device to the portable electronic device. In one embodiment, a "Transfer Money To Gaming Device" indicator 614 and a "Transfer Money From Gaming Device" indicator 616 may be presented on the display 602 of the portable electronic device 600. In another embodiment, the portable electronic device may simply present a question, such as, "Transfer Funds To Gaming Machine?" and display a "Yes" or "No" indicator.

Figure 6C:
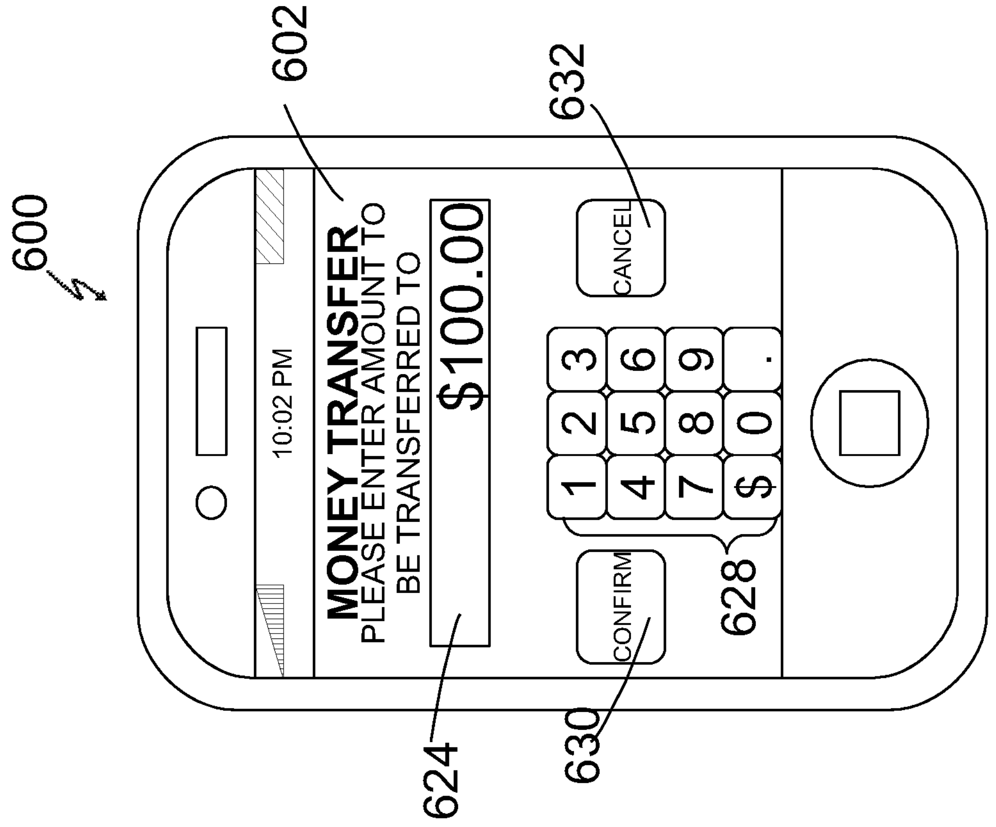

Upon selection of the "Transfer Money To Gaming Device" indicator 614, the user may be prompted to input a fund amount, as illustrated in FIG. 6C. The portable electronic device 600 may display a user-enterable field 624 on display 602. The user-enterable field 624 may prompt the user to enter a fund amount, credit amount, or any other information necessary to complete a transfer of funds to the gaming machine. For example, the fund amount may be a specific monetary amount, such as 1100.00" as illustrated in FIG. 6C. In another example, the user may enter a credit amount, such as credit accumulated in his player tracking account. The user-enterable field 624 may be populated using a numerical keypad 628, joystick, or any other user-input buttons or switches. In another embodiment, the fund amount may be a predefined or preset amount. For example, the preset amount maybe $20 and is the default value for each user action. Thus, the use may use one tap for a $20.00 transfer request to the gaming device, two taps for a $40 transfer request, and so on.

In one example, the user may confirm the amount inputted in the user-enterable field 624 by selecting a "Confirm" indicator 630. In another example, the user may cancel the selection by selecting the "Cancel" indicator 632. Selecting the "Cancel" indicator 632 may result in removal of the amounts entered in the user-selectable field 624. On the other hand, selection of the "Confirm" indicator 630 may result in the generation of a funds transfer request by the portable electronic device.

Figure 6D:
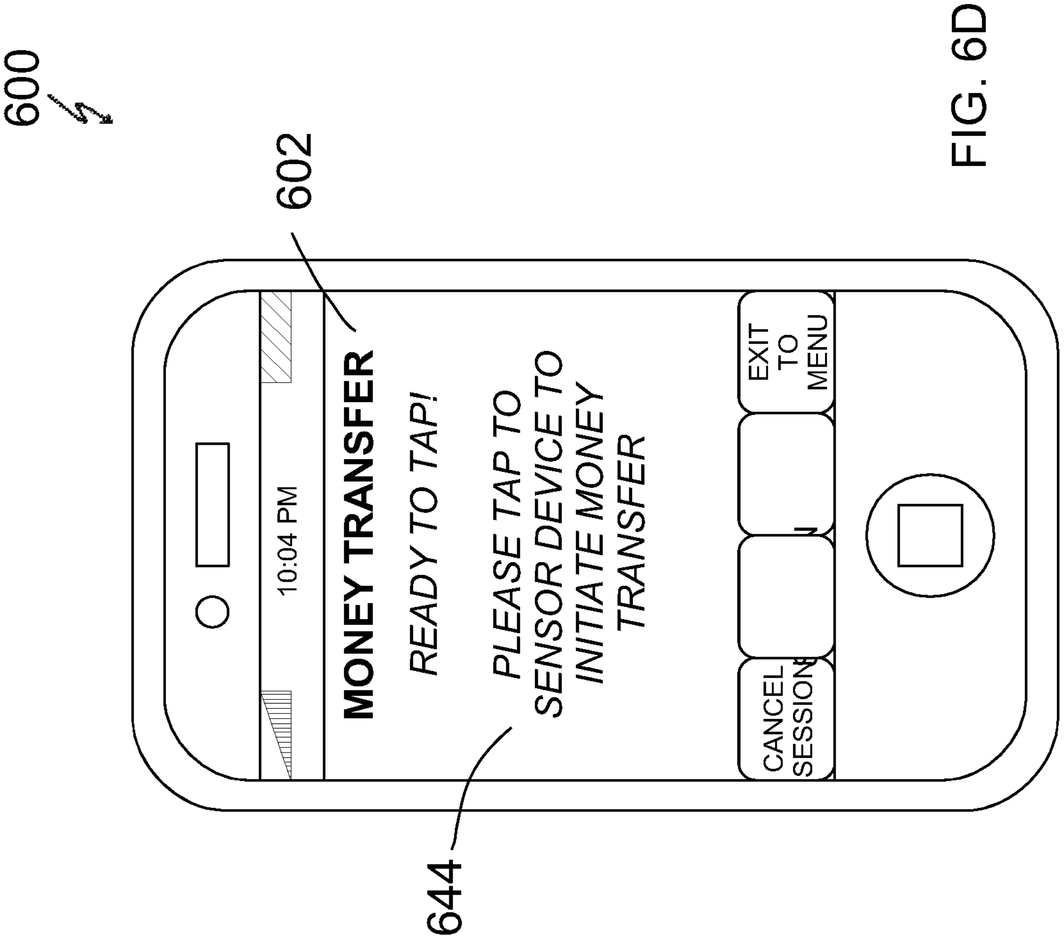

Referring now to FIG. 6D, an exemplary illustration of a graphical user interface to initiate money transfer. The portable electronic device 600 may display instructions on the display 602 to instruct the user how to initiate the transfer of funds to the gaming device. In one embodiment, the portable electronic device 600 may instruct the user to tap the portable electronic device on a sensor device (e.g. sensor device 116 as illustrated in FIG. 1 and sensor device 254 as illustrated in FIG. 2B). For example, the instructions may be to "Please Tap To Sensor Device To Initiate Money Transfer". In another embodiment, portable electronic device 600 may instruct the user to orally confirm transfer of funds to a microphone of the multi-functional peripheral device. For example, the instructions 644 may be to "Please Confirm Transfer By Saying 'Initiate Money Transfer' Into The Microphone".

Figure 6E:
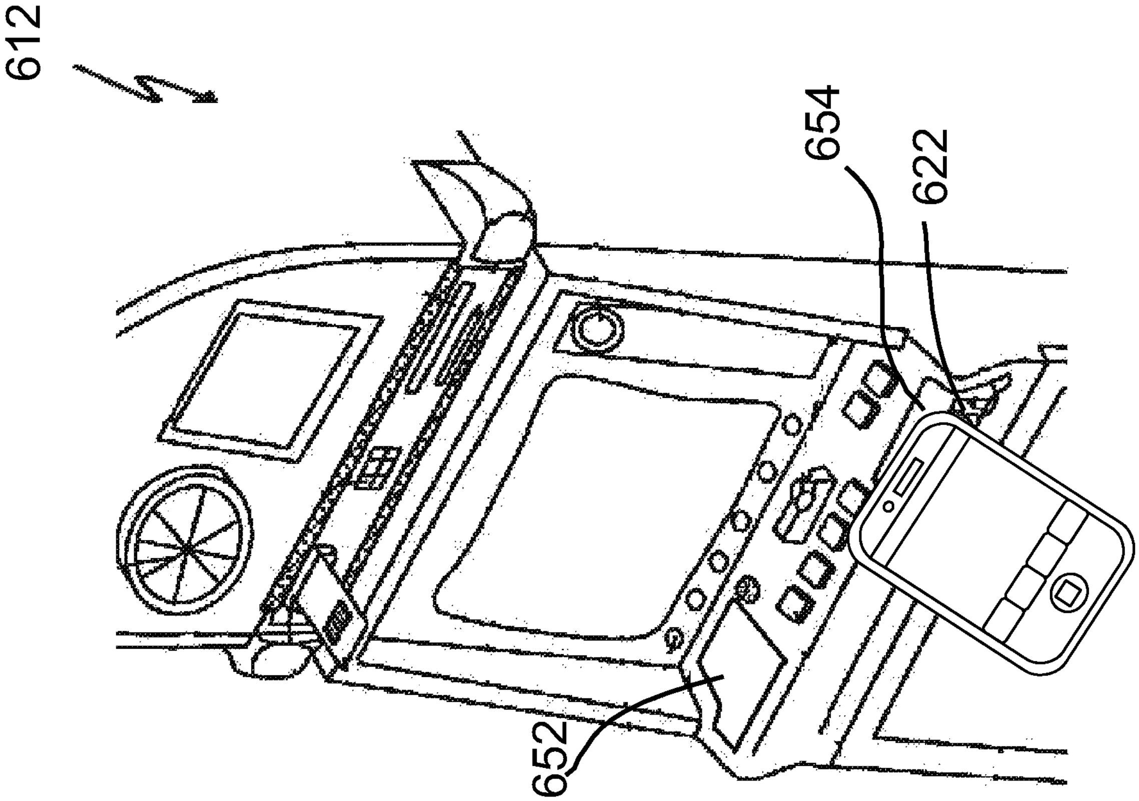

FIG. 6E illustrates an example transfer of funds by contacting, with a portable electronic device, a sensor device associated with the multi-functional peripheral device. As illustrated, the portable electronic device 600 may physically contact a sensor device 654 proximate to the bill acceptor 622. The sensor device 654 may be any known device configured to detect and/or receive a sensory input. For example, the sensor device 654 may be an accelerometer, camera, microphone, touchpad, retina scanner, radio frequency identification reader, near-field magnetic reader, or any other device capable of receiving and detecting sensory input.

As illustrated, in another embodiment, the sensor device may be a touchpad 652 located on the gaming machine 612. Thus, to initiate the transfer of funds, the user may physically tap or contact the touchpad 652 with the portable electronic device 600.

Subsequent to physically contacting the sensor device 654, the portable electronic device may transmit a transfer funds request to the multi-functional peripheral device. The funds transfer request may include any information and requests to facilitate transfer of funds to the gaming machine. For example, the funds transfer request may include a unique user identification (ID), password, fund amount, funding source such as bank routing and checking account number and/or player tracking account number, and any other information or data necessary to facilitate the transfer of funds. In another embodiment, the funds transfer request may include location information of the portable electronic device, location information of the gaming device, time stamp data, and any other data or information that may be used to authenticate and/or verify the portable electronic device and the gaming device to ensure that the funds are transferred to the proper gaming device as further discussed with reference to FIG. 8.

Figure 6F:
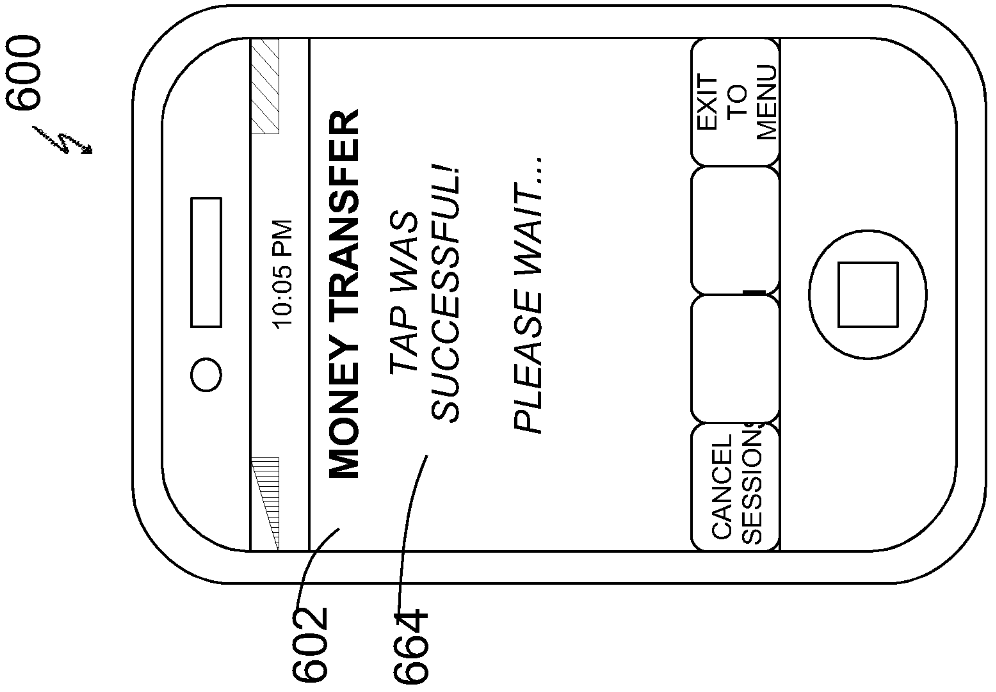

FIG. 6F illustrates an example graphical user interface indicating that contact with the sensor device as successful. In one embodiment, successful contact with the sensor device may be based upon receipt of a successful message by the portable electronic device 600 from the multi-functional peripheral device. In another embodiment, successful contact with the sensor device may be based upon successful transmission of the funds transfer request from the portable electronic device 600 to the multi-functional peripheral device. In one example, the message 664 may inform the user that the user action was successfully performed, the sensor device detected the sensory input, and that the multi-functional peripheral device is processing the funds transfer request.

If contact was not successful (e.g. the sensor device did not detect a sensory input), the portable electronic device 600 may display an unsuccessful message (not shown). For example, a "Please Try Again" message may be displayed on the display 602 of the portable electronic device 600. In another embodiment, if the sensor device associated with the multi-functional peripheral device does not detect a sensory input within a predetermined amount of time (e.g. after 30 seconds, 1 minute, or any other predetermined time period), the portable electronic device 600 may display an unsuccessful message.

Figure 6G:
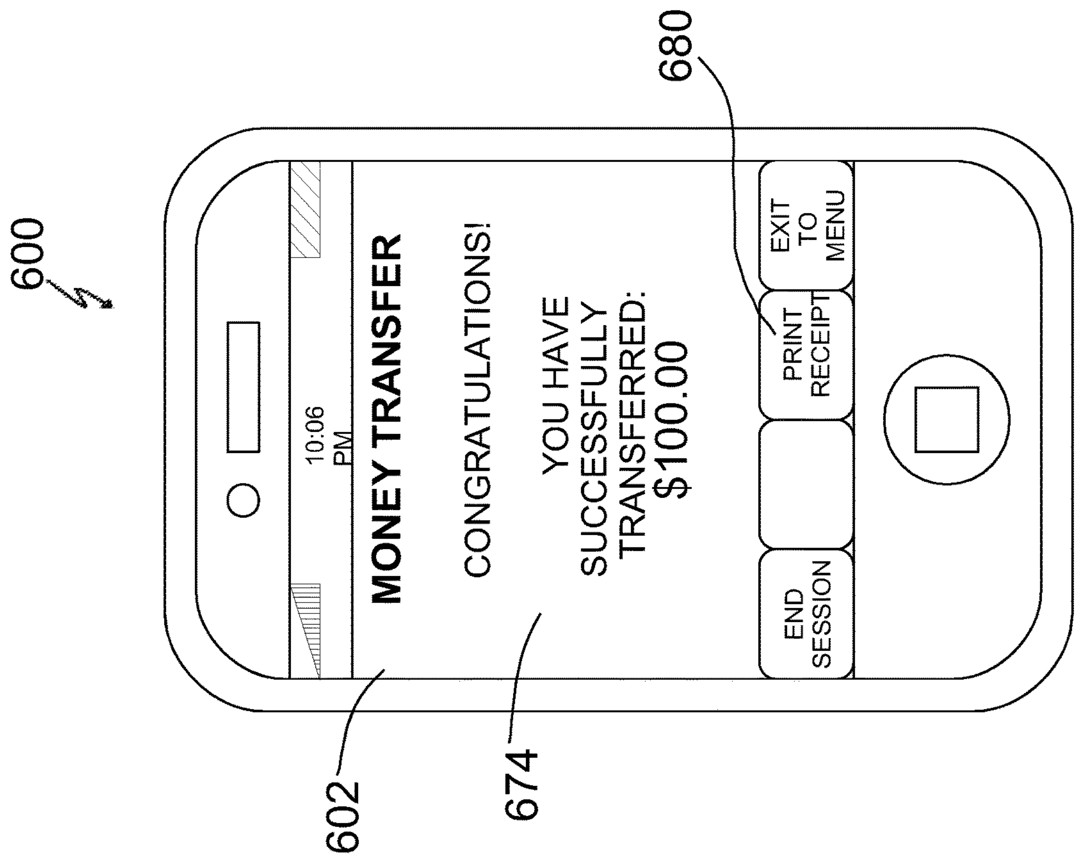

FIG. 6G illustrates an exemplary graphical user interface representing the completion of the funds transfer. Upon receipt of the funds transfer request received from the portable electronic, the multi-functional peripheral device may process the funds transfer request. In other words, the multi-functional peripheral device may parse the funds transfer request to determine at least one of (i) the fund amount; (ii) the source of the funds; (iii) unique user ID and password; (iv) sufficient funds to transfer the fund amount; (v) location of the transaction, and any other necessary information to facilitate the transfer of funds from or to the gaming machine. For example, the multi-functional peripheral device may determine that the user would like to debit $100 from his Credit Union checking account. The multi-functional peripheral device may transmit a debit request to the Credit Union server (e.g. third-party server 120 as illustrated in FIG. 1). The debit request may include the fund amount, user ID and password, bank routing and checking account number, and any other necessary information or data. If there are sufficient funds in the user's checking account, the Credit Union may debit the user's checking account by the fund amount and transmit the fund amount to the multi-functional peripheral device.

In another embodiment, the multi-functional peripheral device may determine that the user would like to charge $100 to his credit card. The multi-functional peripheral device may transmit a charge request to the credit card server (e.g. third-party server 120 as illustrated in FIG. 1). The charge request may include the fund amount, user ID and password, credit card number, security code, zip code, and any other necessary information or data. If the user's credit limit is not exceeded, the user's account may be charged the fund amount and the fund amount may be transmitted to the multi-functional peripheral device.

In still another embodiment, the multi-functional peripheral device may determine that the user would like to debit player credits from the user's player tracking account. The multi-functional peripheral device may transmit a debit credit request to the player tracking server (e.g. player tracking server 124 as illustrated in FIG. 1). The debit credit request may include the fund amount, user ID and password, player tracking number, and any other necessary information or data. If the user has sufficient credit in his player tracking account, the user's account may be debited the credit amount and the credit amount may be transmitted to the multi-functional peripheral device.

If the multi-functional peripheral device receives a fund amount from a third-party server, a successful acknowledgement may be transmitted to the portable electronic device as illustrated in FIG. 6G. In one example, the portable electronic device 600 may present a message 674 such as "Congratulations: You have successfully transferred $100.00.". Optionally, the user may be able to print a receipt recoding the transfer of funds. For example, the user may select the "Print Receipt" indicator 680 to create a virtual receipt. The portable electronic device 600 may then display the virtual receipt (not shown) on the display 602 and digitally store the virtual receipt in a memory of the portable electronic device 600.

According to one embodiment, the amount of funds or credits received by the multi-functional peripheral device may also be displayed on a display of the gaming device as credits for use in playing a game of chance on the gaming machine. The multi-functional peripheral device may transmit a funds notification to the gaming machine processor to notify the gaming machine that the user has transferred funds to the gaming machine. The gaming machine processor may then display the credit amount on the display of the gaming device.

Figure 7A:
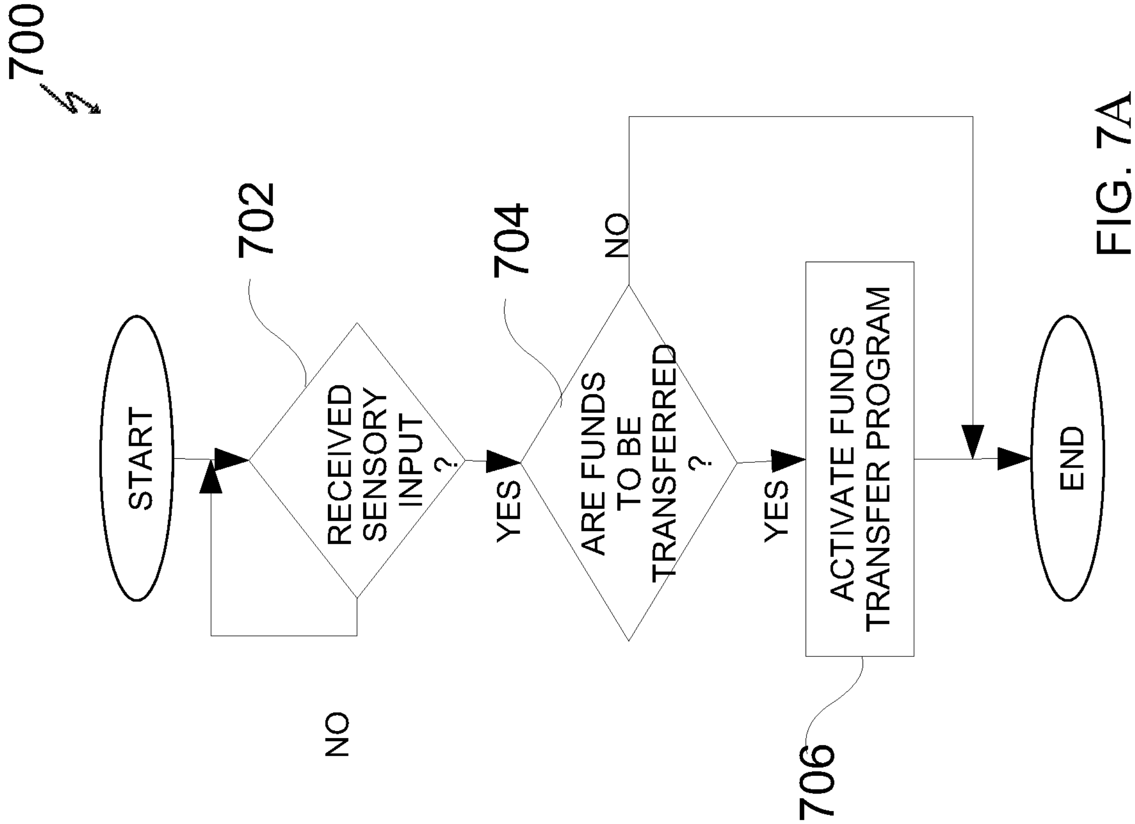
FIG. 7A illustrates an example flow diagram of a method for transferring funds between a portable electronic device and a gaming device.

FIG. 7A illustrates an example flow diagram of a method for transferring funds between a portable electronic device and a gaming device. The method 700 initially begins with determining whether a sensory input is detected or received by the multi-functional peripheral device at 702. If no sensory input is detected or received, then the multi-functional peripheral device may continue to wait for the sensory input.

The sensory input may be detected or received by at least one sensor device associated with the multi-functional peripheral device. The sensory device may be any known device configured to detect and/or receive a sensory input. For example, the at least one sensor device may be an accelerometer, camera, microphone, touchpad, retina scanner, radio frequency identification reader, near-field magnetic reader, or any other device capable of receiving and detecting sensory input. The type of sensory input received or detected may be based on the sensory device. For example, a user may physically contact the sensor device via a tap, touch, or any other physical contact on a touchpad. The physical contact may initiated by the user (e.g. using a finger to tap the sensor device), physical object (e.g. pen, coin, and the like), and/or a remote device associated with the user. The remote device may, for example, be any portable computing device such as a cellular phone, portable media player, PDA, and the like. In another embodiment, the sensory input may be an audio input received by a microphone associated with the multi-functional peripheral device.

Based upon the sensory input received as well as the context in which the sensory input is detected, a function may be associated with the sensory input. For example, as illustrated in FIG. 7, a determination is made as to whether funds should be transferred to or from a gaming machine at 704. This determination may, in part, be made based upon the context. For example, the multi-functional peripheral device may, simultaneously or in conjunction with the detection of the sensory input, receive a funds transfer request from the portable electronic device. Thus, a sensory input detection of one tap (e.g. an accelerometer associated with the multi-functional peripheral device may detect movement of one tap) may be associated with an initiation to transfer funds to a gaming machine in the context of a transfer of funds. In another example, a sensory input detection of two taps (e.g. a touch pad associated with the multi-functional peripheral device may detect movement of two taps) may be associated with an initiation to transfer funds from a gaming machine in the context of a transfer of funds—in other words, the player has completed playing the game of chance and would like to cash out his credits from the gaming machine.

If it is determined that funds are to be transferred at 704, the multi-functional peripheral device may activate a funds transfer program at 706. The funds transfer program may be any program configured to facilitate a transfer of funds to or from a gaming machine. In one embodiment, the program stored in a memory of the multi-functional peripheral device (e.g. memory 424 as illustrated in FIG. 4B). When activated, the multi-functional peripheral device may parse or process a funds transfer request from the portable electronic device to determine at least one of (i) the fund amount; (ii) the source of the funds; (iii) unique user ID and password; (iv) sufficient funds to transfer the fund amount; (v) location of the transaction, and any other necessary information to facilitate the transfer of funds from or to the gaming device. For example, the multi-functional peripheral device may determine that the user would like to debit $100 from his Credit Union checking account. The multi-functional peripheral device may transmit a debit request to the Credit Union server (e.g. third-party server 120 as illustrated in FIG. 1). The debit request may include the fund amount, user ID and password, bank routing and checking account number, and any other necessary information or data. If there are sufficient funds in the user's checking account, the Credit Union may debit the user's checking account by the fund amount and transmit the fund amount to the multi-functional peripheral device.

In another embodiment, the multi-functional peripheral device may determine that the user would like to charge $100 to his credit card. The multi-functional peripheral device may transmit a charge request to the credit card server (e.g. third-party server 120 as illustrated in FIG. 1). The charge request may include the fund amount, user ID and password, credit card number, security code, zip code, and any other necessary information or data. If the user's credit limit is not exceeded, the user's account may be charged the fund amount and the fund amount may be transmitted to the multi-functional peripheral device.

In still another embodiment, the multi-functional peripheral device may determine that the user would like to debit player credits from the user's player tracking account. The multi-functional peripheral device may transmit a debit credit request to the player tracking server (e.g. player tracking server 124 as illustrated in FIG. 1). The debit credit request may include the fund amount, user ID and password, player tracking number, and any other necessary information or data. If the user has sufficient credit in his player tracking account, the user's account may be debited the credit amount and the credit amount may be transmitted to the multi-functional peripheral device.

Although the communication to the external fund source was described above as being initiated by the multi-functional peripheral device, in another embodiment, the fund transfer request can also be made by the portable electronic device directly to the fund source via its own communication link. For example, the portable electronic device can directly contact a bank (e.g. third-party server 120 as illustrated in FIG. 1) to request a secured virtual check to be transferred to the gaming device 200 or transferred from the gaming device 200 for deposit to the bank account.

Figure 7B:
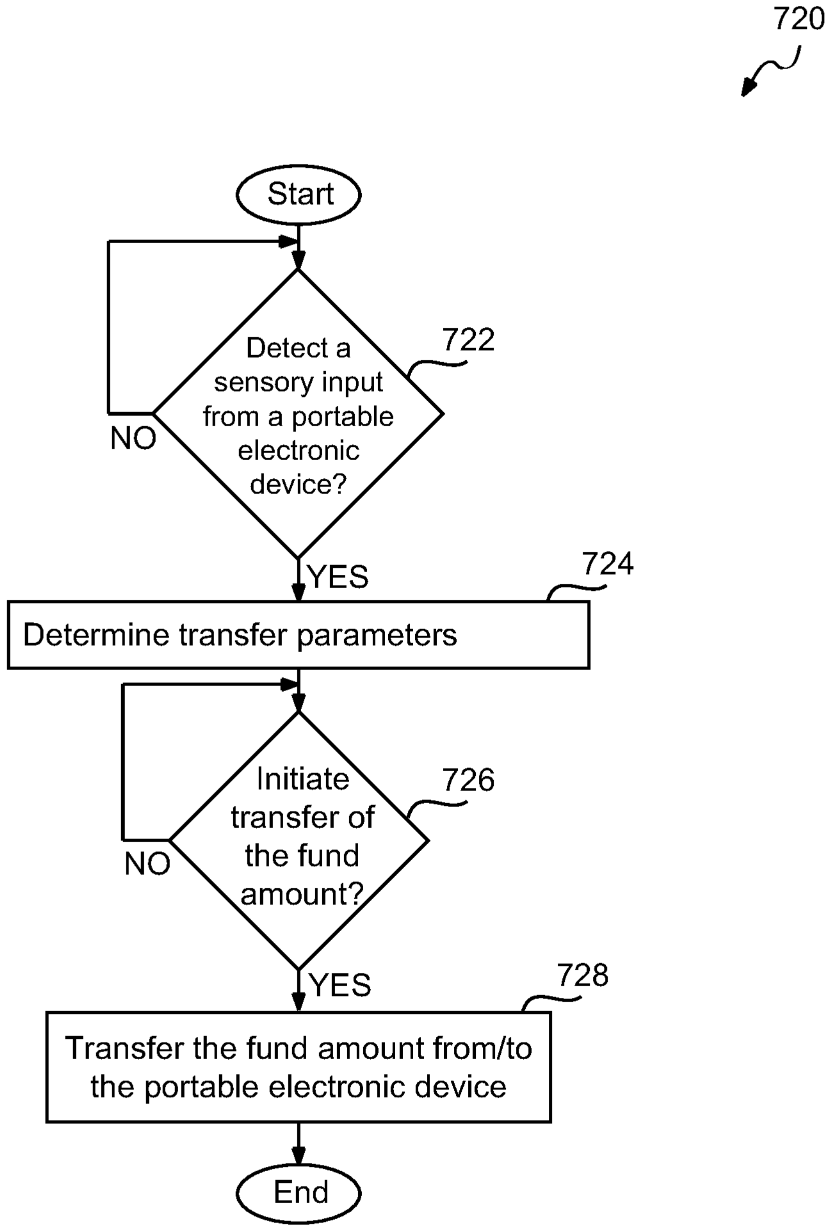
FIG. 7B illustrates a flow diagram of an example method for transferring funds to and from a portable electronic device.

FIG. 7B illustrates a flow diagram of an example method for transferring funds or other values to and from a portable electronic device. The portable electronic device can be a cellular phone, smartphone, portable media player, tablet computer, laptop computer, PDA, and the like. The method 720 may be performed by any machine configured to communicate with a multi-functional peripheral device. In one example, the machine may be a value transfer device.

The method 720 may begin by determining whether a sensory input is detected at 722. The sensory input may be detected by a sensor of a sensor device of the multi-functional peripheral device. In one embodiment, the sensory input may be generated through physical contact using a portable electronic device (PED). For example, the sensory input can be vibrations, accelerations, or other movements detected by the sensor. The physical contact may be performed at a variety of locations on the machine. For example, the user may directly bump, tap, touch, or otherwise physically contact the sensor device. In another embodiment, a bezel coupled to the multi-functional peripheral device, the multi-functional peripheral device, or the value transfer device may be configured to detect a physical contact from, for example, a portable electronic device.

In another embodiment, the sensory input may be generated by the PED and detected by the sensor without physical contact. Example technologies for contactless or wireless sensory input detection include: near field communication (NFC), radio frequency identification (RFID), Bluetooth, barcode, and the like. In one embodiment, determining whether a sensory input is detected may include detecting whether a PED is located proximate the sensor. This may include receiving a request to authenticate the PED if it is detected that the PED is within a satisfactory distance to trigger the transaction. In another embodiment, determining whether a sensory input is detected may include establishing communication between the multi-functional peripheral device and the PED manually by the player. In this example, the player may wish to transfer money or other values stored on a PED to a casino kiosk. The player can press a touch screen of the PED, then press a touch screen on the casino kiosk, to initiate a money or value transfer function on an electronic fund management application running on the PED. The sequential selection between the touch screen of the PED and the casino kiosk signifies the player's intent to pair the two chosen devices. The time window between the selections implies the proximity of the two devices thereby minimizing ambiguities with other nearby devices. This manual approach is equivalent to detecting a sensory input and can be used to trigger the next action in the process. The electronic fund management application may assist the user with transferring funds, storing funds, print a paper voucher, viewing a balance and other functions associated with electronic fund management. If no sensory input is detected at 722, the value transfer device may continue to wait for the sensory input.

If a sensory input is detected at 722, transfer parameters are determined at 724. In one embodiment, the determination may be performed by the multi-functional peripheral device. Transfer parameters may include data such as the fund or value quantity or amount to be transferred, location of the sensory input or funds, a transfer destination (e.g. such as to transfer to a PED or another device such as a gaming machine), type or classification of fund or value (e.g. money, credits, tokens, ticket vouchers, promotional game credits, digital assets, player points, or any other form of currency or value), and any other desired information. The location can indicate a machine or device where the funds reside.

In one example, a player playing a slot machine in a casino may decide to cash out. The player may push the "cash out" button on the slot machine. A processor of the multi-functional peripheral device can receive the request to cash out which may also include the cash out amount remaining in the gaming machine, location or identification of the gaming machine, and/or location or identification of the PED to transfer the funds to.

In one embodiment, the transfer quantity or amount can be all or a portion of the funds. The processor can determine the transfer quantity from a transfer quantity input. The transfer quantity input may be a percentage or fractional amount of the funds, such as 100%, 50%, ¾, ⅒, or any other percentage or fractional determination. For example, the player may want to allocate ¼ of the funds for slot play. They player can make a transfer quantity input of "¼" using the electronic fund management application. Thus, ¼ of the total funds can be transferred. In one embodiment, the electronic fund management application may present a plurality of buttons configured to represent different proportions. For example, the electronic fund management application can display buttons configured to represent ¼, ½, ¾, and all. In another embodiment, the electronic fund management application may present a dropdown menu having options for different proportions. In yet another embodiment, the electronic fund management application may have a slider. For example, the player can use the touch screen and slide an indicator of the slider to the appropriate proportion to be transferred.

The transfer quantity input can also be a numerical value, such as $105.24, 3 credits, 21,954 tokens, 500 loyalty points, or any specific amount or quantity. The user can perform the transfer quantity input on the portable electronic device or the value transfer device. For example, the player may want to transfer $300.50 from a tablet computer to a video poker machine. The player may use a touch screen input mechanism of the tablet computer to enter "$300.50" into the electronic fund management application of the tablet computer. The electronic fund management application can transmit a fund transfer request of "$300.50" to the processor of the multi-functional peripheral device of the video poker machine.

To determine a location to transfer the funds, in one embodiment, the transfer destination may be the multi-functional peripheral device. For example, the player may want to transfer virtual tokens from a portable media player to an electronic horseracing themed gaming machine. Upon detecting a sensory input, a transfer signal may be transmitted from the portable media player to the multi-functional peripheral device of the electronic horseracing themed gaming machine. The multi-functional peripheral device may receive the transfer signal and determine that the user would like to transfer the virtual tokens to play a game of chance on the electronic horseracing machine.

In another embodiment, a plurality of transfer destinations may be displayed on a menu presented on a display of the machine or value transfer device. A graphical user interface can prompt the player to select at least one transfer destination, which may include a portable electronic device, portable media player, laptop, cellular phone, bank, or any other location or device.

In yet another embodiment, the processor may automatically determine the transfer destination. For example, the player may want to transfer tokens from a portable media player to the electronic horseracing machine. Upon detecting a sensory input (i.e. physical contact), such as a bump from the portable media player, the processor of the multi-functional peripheral device may establish a communication session with the portable media player and the electronic horseracing machine. If the location of the fund amount to be transferred has been determined to be the portable media player, the processor of the multi-functional peripheral device may automatically determine the electronic horseracing machine as the transfer destination.

A determination of whether to initiate transfer of the fund amount may be made at 726. For example, the processor of the multi-functional peripheral device can determine whether to initiate transfer of the fund amount. In one embodiment, the multi-functional peripheral device may initiate transfer of the fund amount upon receipt of a confirmation request from the user using the PED or the value transfer device. For example, a confirmation dialogue may appear in a graphical user interface of the portable electronic device such as: "Please Confirm Transfer Of Funds". A "YES" and "NO" indicator may also be displayed on the display for the user to select. Upon detection of selection of the "YES" indicator, receipt of the confirmation request is received and the multi-functional peripheral device may transfer the fund amount at 728.

In another embodiment, initiation of the transfer of the fund amount can be based upon verification of at least one transfer parameter. For example, one transfer parameter may be a determination of whether there are funds to be transferred at the fund location (e.g. funds in a gaming machine, funds in a bank account, or funds from another device). If it is determined that there are no funds at the fund location, the transfer of funds will not be initiated. In another example, if the fund amount at the fund location is less than the transfer amount requested to be transferred, the transfer of funds will not be initiated. In still another example, no funds will be transferred if it is determined that the destination machine or device is unavailable (e.g. outside of communications range, powered down, not accepting fund transfers, or the like).

If it is determined the transfer of the fund amount is to be initiated at 726, the fund amount can be transferred from or to the portable electronic device at 728. If it is determined that the transfer destination is the portable electronic device (e.g. based on the transfer parameters determined at 724), the transfer amount can be transmitted to the portable electronic device. If it is determined that the transfer destination is a value transfer device (e.g. based on the transfer parameters determined at 724), the transfer amount can be transmitted to the value transfer device.

Figure 7C:
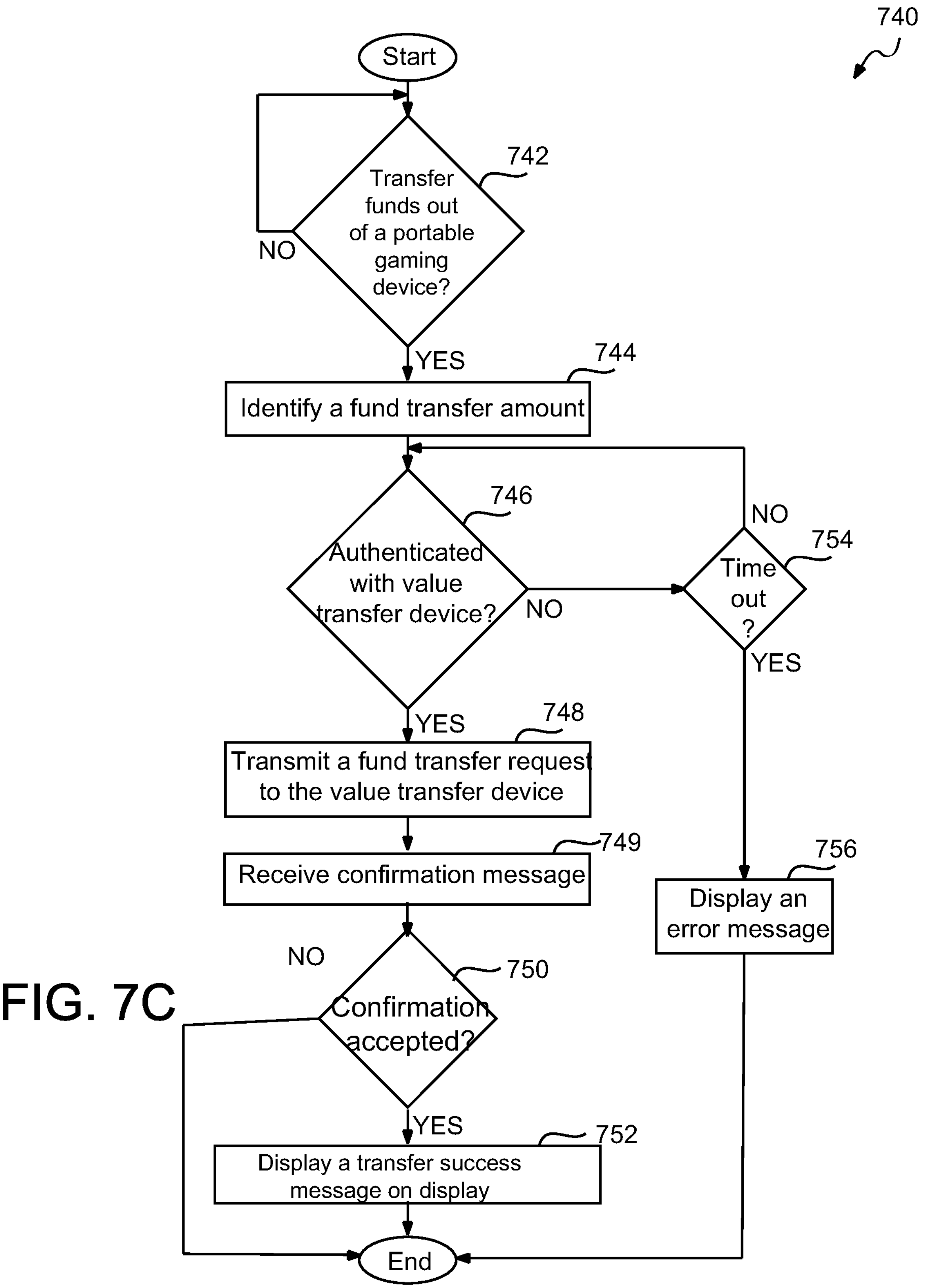
FIG. 7C illustrates a flow diagram of an example method for transferring funds from a portable electronic device.

FIG. 7C illustrates a flow diagram of an example method for transferring funds from a portable electronic device. A method 740 for transferring funds from a portable electronic device can be performed by a portable electronic device, such as a cellular phone, smartphone, portable media player, tablet computer, laptop computer, PDA, or any other PED configured to play a game of chance.

The method 740 may begin by determining whether to transfer funds out of a portable electronic device at 742. In one embodiment, the determination can be based upon a user transfer out request. For example, a user may generate and initiate the transfer out request using an electronic fund management application on the portable electronic device. In another embodiment, the determination may be based on a value transfer device detecting the presence of the portable electronic device. For example, the value transfer device may be configured to detect the presence of portable electronic devices proximate its vicinity. Once detected, the value transfer device may transmit a response signal (i.e. an initiation signal) to the portable electronic device. A processor of the portable electronic device may automatically determine, from the response signal, that funds are to be transferred out of the portable electronic device.

If it is determined that funds are to be transferred out of the portable electronic device at 742, a fund transfer amount may be identified at 744. Identifying the fund transfer amount may include selecting a source, determining what the fund or value type is (e.g. cash or voucher), and the like. Selecting the source can include, but is not limited to, selecting a source fund type and/or a source account as the portable electronic device may store more than one fund type and include more than one account of funds. The fund or value types may include money of different currencies, credits, tokens, ticket vouchers, promotional game credits, digital assets, player points and the like. In one embodiment, the account of funds can be accounts for different gaming environments (as illustrated further in FIG. 12), such as casinos, shopping centers, cruise boats, and the like. For example, the portable electronic device may have a casino 1 account, a casino 2 account, and a riverboat casino A account. In another embodiment, the account of funds can be accounts for different transaction types. For example, the portable electronic device may have a gaming account and a shopping account. In yet another embodiment, the account of funds may be accounts for different transaction types from different gaming environments. For example, the user may have a casino A slot machine account, a casino A food and drink account, and a casino B gaming account.

In one embodiment, the user may select the source of the funds. For example, the portable electronic device may have a graphical user interface configured to present at least one source option. The at least one source option representing, but not limited to, any source fund types and any source accounts stored on the portable electronic device. The user can select the source using any input mechanism of the portable electronic device, such as a button, key, touch screen, microphone, or the like.

In another embodiment, a default source may be used. For example, the value transfer device may only accept funds from certain accounts or sources with certain characteristics. For example, the value transfer device may only accept credits, such as in a casino gaming environment.

Identifying the fund transfer amount at 744 may also include determining or authenticating a quantity. The quantity can be all or a portion of the plurality of funds. In one embodiment, the quantity can be determined from a quantity input. In one embodiment, the transfer quantity or amount can be all or a portion of the funds. The processor can determine the transfer quantity from a transfer quantity input. The transfer quantity input may be a percentage or fractional amount of the funds, such as 100%, 50%, ¾, ⅒, or any other percentage or fractional determination. For example, the player may want to allocate ¼ of the funds for slot play. The player can make a transfer quantity input of "¼" using the electronic fund management application. Thus, ¼ of the total funds can be transferred. In one embodiment, the electronic fund management application may present a plurality of buttons configured to represent different proportions. For example, the electronic fund management application can display buttons configured to represent ¼, ½, ¾, and all. In another embodiment, the electronic fund management application may present a drop-down menu having options for different proportions. In yet another embodiment, the electronic fund management application may have a slider. For example, the player can use the touch screen and slide an indicator of the slider to the appropriate proportion to be transferred.

A determination of whether the portable electronic device is authenticated with the value transfer device may be made at 746. In other words, a determination is made as to whether the portable electronic device was previously authenticated by the value transfer device. In one embodiment, the value transfer device may authenticate or validate the portable electronic device by confirmation of a password, biometric identifier, personal identification number(s), user names, or any other authentication or validation methods. Once authenticated, the value transfer device may transmit an authentication signal to the portable electronic device. In another embodiment, the value transfer device may be configured to automatically authenticate the portable electronic device based upon an identifier, such as a MAC address, confirming validity of a key file (which may or may not be encrypted) stored on the user device, hashing and comparing contents of the key file to a record maintained by the value transfer device or any server configured to communicate with the value transfer device, or any other commonly used methods of verifying the validity of a data file. In yet another embodiment, the value transfer device may authenticate the portable electronic device using a unique address, such as a short code or a web link.

In one embodiment, either in lieu of or in addition to the portable electronic device authentication at 746, the authentication of the information being transferred may be authenticated. Authentication of documents, messages and data normally involves technologies related to digital signatures, digital certificates, digital watermarking, and cryptography to ensure privacy of the transaction, to verify that the data or message being sent has not been altered or corrupted, and that it did come from the claimed sender. For example, a casino promotional voucher for $20 of free play on of a new video poker game being redeemed may be authenticated to ensure it was issued by the casino, is for $20, is being redeemed by the intended player, being applied to the allowed game type, and it has not been previously redeemed or expired.

If it is not determined that the portable electronic device was authenticated with the value transfer device at 746, a determination of whether the method for transferring funds should time out at 754. In one embodiment, the method 740 can time out if the portable electronic device is not authenticated with the value transfer device before a predetermined time. The predetermined time may begin counting down upon identification of the fund transfer amount, determining funds are to be transferred out of the portable electronic device, and/or detection of the presence of the portable electronic device by the value transfer device. If it is determined that the method 740 for transferring funds should not time out at 754, the determination of whether the portable electronic device has been authenticated with the value transfer device at 746 continues.

If it is determined that the method 740 should time out at 754, an error message may be displayed at 756. The error message may include any combination of text, graphics, or other indicia indicating an error has occurred. For example, the error message can be a large red stop sign accompanied by text stating, "Authentication has time out." The error message may also include text, graphics, or other indicia indicating at least one option for addressing the error. In one embodiment, the error message can be displayed on a display of the portable electronic device. In another embodiment, the error message can be displayed on a display of the value transfer device. The method 740 may end upon display of the error message.

If it is determined that the portable electronic device is authenticated with the value transfer device at 746, a fund transfer request may be transmitted to the value transfer device at 748. The fund transfer request may be a request to transfer funds to the value transfer device and based upon at least one fund transfer parameter. In one embodiment, the fund transfer request can be transmitted using any wireless communication technology such as IEEE 802.11x, Bluetooth, cellular technology such as 3G and 4G, radio frequency, near-field magnetics, and other similar methods. In another embodiment, the fund transfer request can be transmitted using wired communication technology, such as Ethernet cables, USB, Firewire, serial cables, and other similar methods. The at least one fund transfer parameter may have a plurality of criteria such as which communications device to use to transfer the fund, the location or account to which the funds are to be transferred, which type of encryption to use to protect the fund transfer, any information from the fund transfer amount identified at 744, or any other criteria necessary to facilitate the fund transfer.

The portable electronic device may receive a confirmation message from the value transfer device at 749 to confirm that the user would like to transfer the funds out of the portable electronic device. The confirmation message may be displayed on a display of the portable electronic device, valued transfer device, or any other device. In one example, the message displayed may be a "Please confirm transfer of funds" with a "YES" and "NO" indicator.

A determination of whether the confirmation is accepted is made at 750. If the user, does not want to transfer the funs, the "NO" indicator may be selected and method 740 may end. If the user would like to confirm the fund transfer, the user may select the "YES" indicator" and the funds may then be transferred based upon at least one of the fund transfer parameters. The value transfer device may prepare and/or initiate the fund transfer.

A transfer success message may be transmitted to and displayed on a display at 752. Once the transfer of funds is completed, the value transfer device may transmit the success message to the portable electronic device to inform the user that the transfer was successful and completed. The message may include any combination of text, graphics, or other indicia indicating the fund transfer was successful. For example, the transfer success message can be a "thumbs up" graphic accompanied by text stating, "Transfer Successful." In one embodiment, the transfer success message can be displayed on a display of the portable electronic device. In another embodiment, the transfer success message can be displayed on a display of the value transfer device. The method 740 may end upon display of the confirmation message.

Figure 7D:
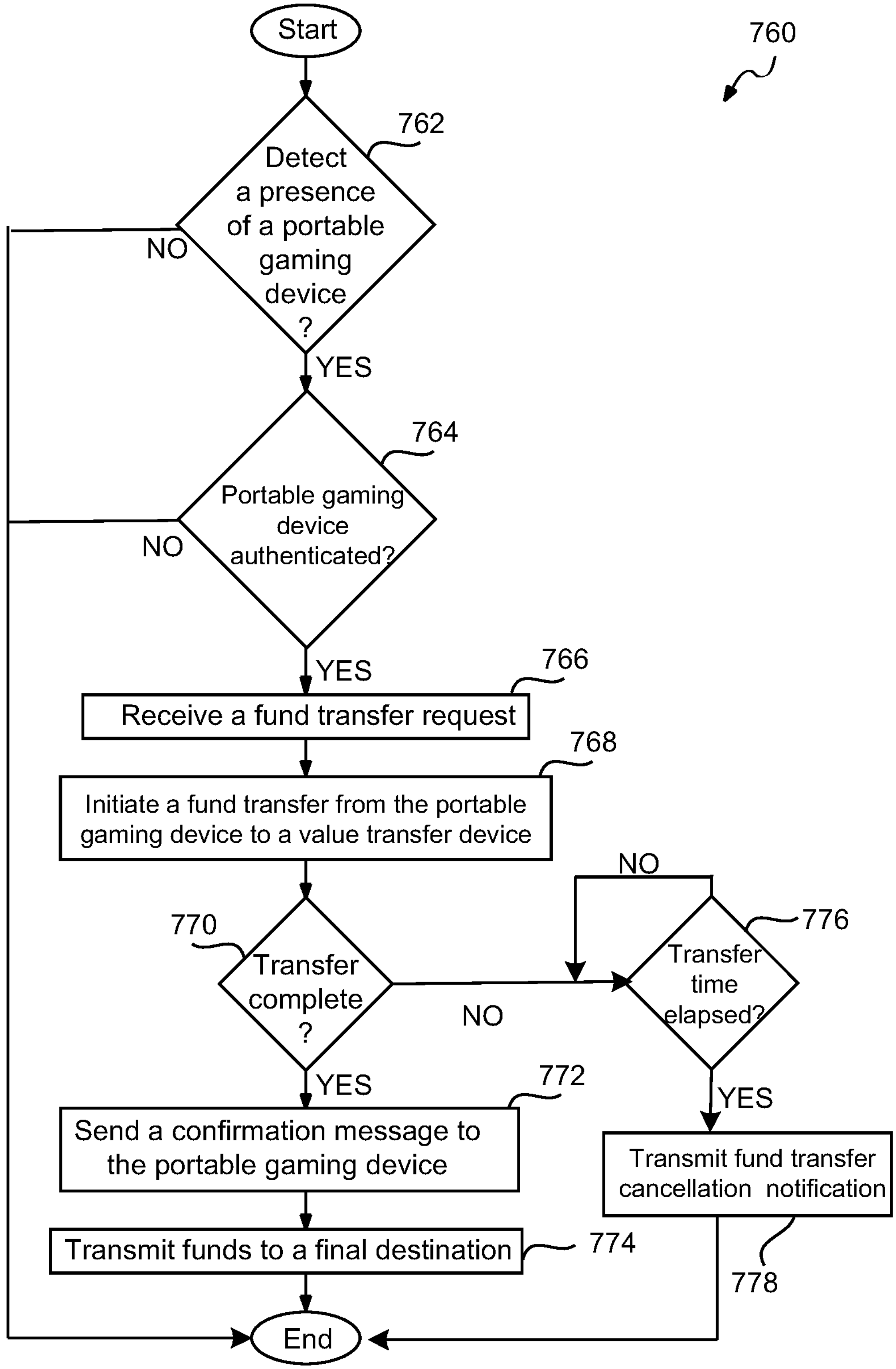
FIG. 7D illustrates a flow diagram of an example method for transferring funds to a value transfer device.

FIG. 7D illustrates a flow diagram of an example method for transferring funds to a value transfer device. A method 760 for transferring funds to a value transfer device may be performed in a gaming environment. The method 760 for transferring funds to a value transfer device may begin by detecting a presence of a portable electronic device at 762. If the presence of the portable electronic device is not detected at 762, the method 260 may await detection of the presence of the portable electronic device.

The value transfer device may detect the presence of the portable electronic device in various ways. In one embodiment, the value transfer device may detect the presence of the portable electronic device through physical contact. For example, the value transfer device may have a sensor configured to detect physical contact from the portable electronic device. The physical contact may be any contact such as a bump, tap, touch, slide, or any other physical contact that may be detected by the value transfer device.

In another example, the value transfer device may have a multi-functional peripheral device (as illustrated in FIG. 4C, 4D, 4E) with a sensor configured to detect physical contact. The sensor can be an accelerometer configured to detect vibrations, accelerations, or other movements. The vibrations, accelerations, or other movements can occur when a user bumps, taps, touches, or otherwise physically contacts the portable electronic device to any portion of the value transfer device.

In another embodiment, the value transfer device may detect the presence of the portable electronic device using contactless communications technology when the portable electronic device is in close proximity to the value transfer device. Example contactless communications technologies include NFC, RFID, Bluetooth, wireless Ethernet and the like. In an embodiment, close proximity may depend upon industry and/or technology standards for the particular contactless communications technology utilized by the value transfer device. In another embodiment, close proximity may be determined by a proximity setting of the value transfer device. For example, a slot machine or the value transfer device may have a memory storing a proximity setting of three (3) inches. The slot machine or value transfer device may detect any portable electronic device within three (3) inches of any portion of the slot machine.

In yet another embodiment, detection may be performed by a gaming environment device. The gaming environment device may detect the presence of the portable electronic device through physical contact or contactless communications technology. The gaming environment device can be any machine or device capable of detecting the presence of the portable electronic device. For example, the portable electronic device can be a server configured to detect the presence of the portable electronic device through IEEE 802.11x Ethernet technology using at least one wireless access point. In an example, the gaming environment device can be an information terminal, having an accelerometer, in a wall of a casino.

If the presence of the portable electronic device is detected at 762, a determination of whether the portable electronic device is authenticated is made at 764. If the portable electronic device is not authenticated at 764, the method 760 may end. In one embodiment, the processor of the value transfer device may determine whether the portable electronic device has been authenticated. Authentication may authorize and establish communication between the value transfer device and the portable electronic device. In one embodiment, the value transfer device may authenticate the portable electronic device by confirming validity of a password, biometric identifier, personal identification number(s), or the like. In another embodiment, the value transfer device may be configured to authenticate the portable electronic device based upon an identifier, such as a MAC address, confirming validity of a key file (which may or may not be encrypted) stored on the user device, hashing and comparing contents of the key file to a record maintained by the value transfer device or any server configured to communicate with the value transfer device, or any other commonly used methods of verifying the validity of a data file. In yet another embodiment, the value transfer device may authenticate the portable electronic device using a unique address, such as a short code or a web link.

In another embodiment, the gaming environment device may determine whether the portable electronic device has been authenticated. The gaming environment device may authenticate the portable electronic device using an identifier, data file, unique address, or any other common methods for authentication. Authentication may authorize and establish communication between the portable electronic device and a gaming environment network. The gaming environment network may be configured to allow communication between the gaming environment device, the portable electronic device, and at least one value transfer device.

If the portable electronic device is authenticated at 764, a fund transfer request can be received at 766. The fund transfer request can be received at the value transfer device to which the funds are to be transferred to or at the gaming environment device. In one embodiment, the fund transfer request can be received using any wireless communication technology such as IEEE 802.11x, Bluetooth, cellular technology such as 3G and 4G, radio frequency, near-field magnetics, and the like. In another embodiment, the fund transfer request can be received using wired communication technology, such as Ethernet cables, USB, Firewire, serial cables, and the like. The fund transfer request may include at least one fund transfer parameter to configure a fund transfer. In one example, the at least one fund transfer parameter may indicate which communications device to use for the fund transfer if the value transfer device has more than one communications device. In another example, the at least one fund transfer parameter may indicate which type of encryption to use to protect the fund transfer.

The fund transfer from the portable electronic device to the value transfer device may be initiated at 768. Initiation of the fund transfer can start the movement of funds from the portable electronic device to the value transfer device. The fund transfer can use any wireless communication technology such as IEEE 802.11x, Bluetooth, cellular technology such as 3G and 4G, radio frequency, near-field magnetics, and the like. Initiation may include preparing the fund transfer, entirely or in part, based upon the at least one fund transfer parameter from the fund transfer request. In one embodiment, initiation of the fund transfer may be performed by the processor of the value transfer device. In another embodiment, initiation of the fund transfer may be performed by the gaming environment device. The gaming environment device can be configured to direct the transfer from the portable electronic device to the value transfer device.

A determination of whether the fund transfer is completed may be made at 770. The determination of whether the fund transfer has completed may be performed by the value transfer device or the gaming environment device. In one example, it may be determined the fund transfer is not complete because funds are still moving from the portable electronic device to the value transfer device. In another example, it may be determined the fund transfer is not complete because of an error. Examples of errors may include, but are not limited to, hardware communication failure, the portable electronic device moving out of range, insufficient funds, and the like.

If the fund transfer is not complete at 770, a determination of whether a predetermined transfer time has elapsed may be made at 776. The predetermined transfer time may be any time limit necessary to transfer the funds. In one example, the transfer time may be approximately between one to five minutes. If the transfer time has elapsed at 776, a fund transfer cancellation notification may be transmitted to the portable electronic device at 778. The fund transfer cancellation notification may include any combination of text, graphics, or other indicia indicating to the user that the fund transfer was not successful.

Once the fund transfer is complete at 770, a confirmation message may be transmitted or sent to the portable electronic device at 772. The confirmation message can confirm that the fund transfer is completed. In one embodiment, the value transfer device may generate and transmit the confirmation message to the portable electronic device. In another embodiment, the gaming environment device may generate and transmit the confirmation message to the portable electronic device. Upon receiving the confirmation message, the portable electronic device may display a transfer success message. The transfer success message may include any combination of text, graphics, or other indicia indicating to the user that the fund transfer was successful.

The funds may be transmitted to the final destination at 774. The user may direct the transferred funds to the final destination using a destination input. The user may perform the destination input on the portable electronic device, the value transfer device, or the gaming environment device. In one embodiment, the final destination may be a tangible representation, such as a voucher, ticket, or currency. For example, the value transfer device may have a printer. The user may perform the destination input directing the value transfer device to print a voucher for the transferred funds. In another embodiment, the final destination may be an account with the gaming environment, a financial institution, or the like.

Figure 8:
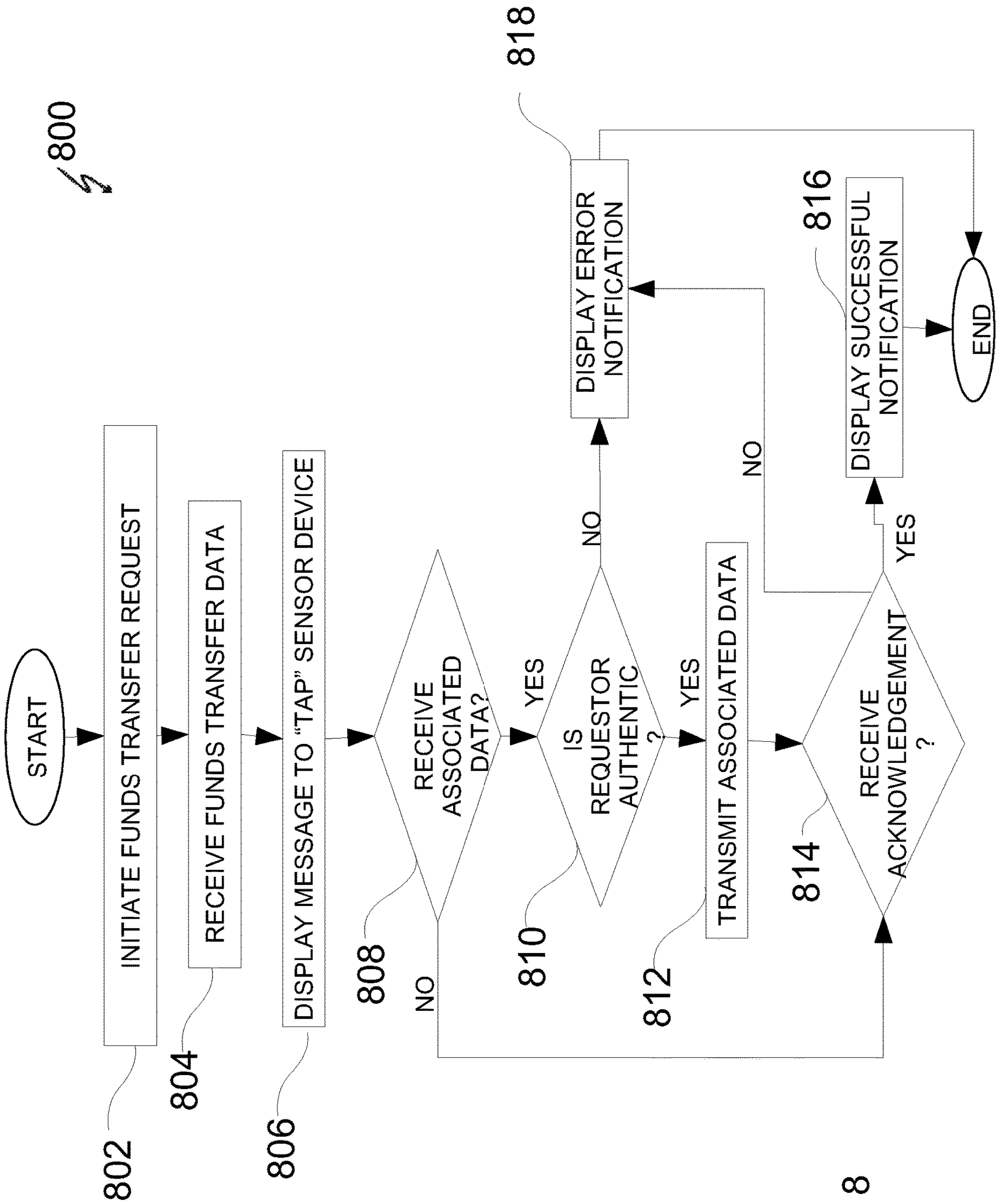
FIG. 8 illustrates an exemplary flow diagram of a method for transferring funds from or to a gaming device.

FIG. 8 illustrates an exemplary flow diagram of a method for transferring funds from or to a gaming device. The method 800 may begin with initiating, at a portable electronic device, a user request to transfer funds at 802. In one embodiment, the user request to transfer funds may be initiated by detecting a user selection of an associated indicator. For example, the portable electronic device may detect user selection of a “Cash Out” indicator, “Money Transfer” indicator (e.g., “Money Transfer” indicator 606 as illustrated in FIG. 6A) or any other similar indicator. In another embodiment, the user request to transfer funds may be an audio command. The audio command may be any audio command received and recognizable by the portable electronic device as an instruction or command to transfer funds. For example, the audio command may include words such as “cash out”, “transfer funds”, and the like.

The portable electronic device may receive funds transfer data for the requested funds transfer at 804. The funds transfer data may include any information, requests, and data to facilitate the transfer of funds. For example, the funds transfer data may include: (i) a request to transfer funds to the gaming machine; (ii) request to cash out and transfer funds from the gaming machine; (iii) fund amount to transfer to the gaming machine; (iv) source of the funds to transfer to the gaming machine; (v) unique user ID and password; (vi) whether to transfer receipt of the funds to the gaming machine or the portable electronic device; (vii) location of the transaction, and any other necessary information to facilitate the transfer of funds from or to the gaming machine.

In one embodiment, a message to "Tap" a sensor device (e.g. sensor device 116 as illustrated in FIG. 1 and sensor device 254 as illustrated in FIG. 2B) associated with the multi-functional peripheral device may be displayed on a display of the portable electronic device at 806. The portable electronic device may display instructions on the display to instruct the user how to initiate the transfer of funds to the gaming device. For example, the instructions may be to "Please Tap To Sensor Device To Initiate Money Transfer". In another embodiment, portable electronic device may instruct the user to orally confirm transfer of funds to a microphone of the multi-functional peripheral device rather than tap a sensor device. For example, the instructions 644 may be to "Please Confirm Transfer By Saying 'Initiate Money Transfer' Into The Microphone".

The multi-functional peripheral device may determine whether to request associated data from the portable electronic device at 808. In one embodiment, the associated data may be encrypted using any known encryption method such as Advanced Encryption Standard (AES), Message Authentication Code (MAC), Hash based Message Authentication Code (HMAC), SHA-2, and the like. The associated data may be any information or data necessary to complete a transfer of funds to the gaming machine such as: (i) the fund amount; (ii) the source of the funds; (iii) unique user ID and password; (iv) account information (e.g. bank routing number, checking account number, credit card number, and the like); (v) destination address (e.g. gaming machine identification to ensure funds are transferred to the proper gaming machine); (vi) location of the transaction, and any other necessary information to facilitate the transfer of funds to the gaming device. The gaming machine may be identified by any known methods such as MAC address, IP address, unique gaming machine identification, bar code on the gaming machine, location information for the gaming machine, and the like. For example, the user may manually input the unique gaming machine identification in the portable electronic device. In another embodiment, the user may scan a bar code on the gaming machine into the portable electronic device.

Thus, the determination may be based on whether the funds transfer request is requested from the gaming machine or to the gaming machine. In other words, if the funds transfer request is to transfer funds to the portable electronic device (i.e. the player would like to cash out of the gaming machine), then the multi-functional peripheral device need not obtain associated data. However, if the funds transfer request is to transfer funds to the gaming machine (i.e. the player would like to play a game of chance on the gaming machine), then the multi-functional peripheral device will need associated data to facilitate the transfer of funds.

If the multi-functional peripheral device receives associated data at 808, the multi-functional peripheral device may authenticate the user at 810. In one embodiment, the multi-functional peripheral device may authenticate the user by transmitting the username and password to the authentication server (e.g. authentication server 130 illustrated in FIG. 1). In another embodiment, an authentication request may be transmitted to the gaming machine to transmit the username and password to the authentication server. It will now be known that any server configured to authenticate and/or verify a user may be used, such as the player tracking server (e.g. player tracking server 124 illustrated in FIG. 1). Additionally, although username and password credentials are illustrated in the authentication process, any other type of credentials or criteria maybe used. For example, biometrics such as facial features, fingerprints, voice prints, and the like, may be used.

In one embodiment, verification the location of the gaming device and/or the location of the user's portable electronic device may be required as additional parameters for a complete authorization of the transaction. Location data may be obtained automatically without user interaction or input using various location determining technology such as global positioning systems (GPS), triangulation and trilateration with cellular towers, Wi-Fi access points locating, radio frequency (RF) fingerprinting, and the like. For instance, Wi-Fi based location appliances, such as the Cisco Wireless Location Appliance™ manufactured by Cisco Systems, Inc. (San Jose, California, US), may be used as a location tracking system to determine the location of the portable electronic device and the gaming devices inside a casino.

It is common for the local gaming control jurisdiction to have rules regarding where gaming can take place and the maximum funds that can be transferred in a transaction. Location data of the gaming device, inferred by the location of the multi-functional peripheral device housed inside its cabinet, is desirable to verify that the gaming device is in a location where gaming is allowed, such as a casino. Similarly, location data of the portable electronic device is desirable to verify that the user initiating the funds transfer request is indeed near the verified location of an approved gaming device. Other transaction requirements such as fund transfer amount can also be verified as not to exceed allowable amount.

The authentication server may compare the received username and password to a previously submitted and/or saved username and password stored in a database of the authentication server. If there is no match, the authentication server may transmit an error message to the gaming machine and/or the multi-functional peripheral device, which in turn may transmit an error notification to the portable electronic device for display on a display of the portable electronic device at 818.

If there is a match, the authentication server may transmit a successful message to the gaming machine and/or multi-functional peripheral device. In one embodiment, the multi-functional peripheral device may then transmit the associated data to the gaming machine at 812 to process the funds transfer request. In another embodiment, the multi-functional device may process the funds transfer request and transmit the associated data to a third party server (e.g. third-party server 120 as illustrated in FIG. 1) or the gaming server (e.g. gaming server 112 as illustrated in FIG. 1). The multi-functional device may parse the funds transfer request to determine at least one of (i) the fund amount; (ii) the source of the funds; (iii) unique user ID and password; (iv) sufficient funds to transfer the fund amount, (v) location of the transaction, and any other necessary information to facilitate the transfer of funds from or to the gaming machine. For example, the multi-functional peripheral device may determine that the user would like to debit $100 from his Credit Union checking account. The multi-functional peripheral device may transmit a debit request to the Credit Union server (e.g. third-party server 120 as illustrated in FIG. 1). The debit request may include the fund amount, user ID and password, bank routing and checking account number, and any other necessary information or data. If there are sufficient funds in the user's checking account, the Credit Union may debit the user's checking account by the fund amount and transmit the fund amount to the multi-functional peripheral device.

In another embodiment, the multi-functional peripheral device may determine that the user would like to charge $100 to his credit card. The multi-functional peripheral device may transmit a charge request to the credit card server (e.g. third-party server 120 as illustrated in FIG. 1). The charge request may include the fund amount, user ID and password, credit card number, security code, zip code, and any other necessary information or data. If the user's credit limit is not exceeded, the user's account may be charged the fund amount and the fund amount may be transmitted to the multi-functional peripheral device.

In still another embodiment, the multi-functional peripheral device may determine that the user would like to debit player credits from the user's player tracking account. The multi-functional peripheral device may transmit a debit credit request to the player tracking server (e.g. player tracking server 124 as illustrated in FIG. 1). The debit credit request may include the fund amount, user ID and password, player tracking number, and any other necessary information or data. If the user has sufficient credit in his player tracking account, the user's account may be debited the credit amount and the credit amount may be transmitted to the multi-functional peripheral device.

If the multi-functional peripheral device receives a fund amount acknowledgement at 814 from the third-party server or the gaming server, a successful acknowledgement may be transmitted to the portable electronic device for display on a display of the portable electronic device at 816. In one example, the portable electronic device 600 may present a message such as "Congratulations: You have successfully transferred $100.00". Additionally, the multi-functional peripheral device may also send a digital receipt of the transaction record to the portable electronic device as well as storing a copy in its own memory for accounting, auditing, dispute resolution, and verification purposes. In one embodiment, the amount of funds or credits received by the multi-functional peripheral device may also be displayed on a display of the gaming device as credits for use in playing a game of chance on the gaming machine. The multi-functional peripheral device may transmit a funds notification to the gaming machine processor to notify the gaming machine that the user has transferred funds to the gaming machine. The gaming machine processor may then display the credit amount on the display of the gaming device.

If the multi-functional peripheral device does not receive associated data at 808, in one embodiment, the multi-functional peripheral device may transmit a cash out request to the gaming machine and wait for a cash out acknowledgement and/or confirmation from the gaming machine at 814. If the multi-functional peripheral device does not receive a cash out acknowledgement at 814, an error notification may be transmitted to the portable electronic device for display on a display of the electronic device at 818.

If the multi-functional peripheral device receives a cash out acknowledgement at 814, in one embodiment, the multi-functional peripheral device may inform the portable electronic device of the successful transfer of funds to the portable electronic device at 816 and print an electronically-readable ticket on a printer associated with the multi-functional peripheral device. In another embodiment, the multi-functional peripheral device may inform the portable electronic device of the successful transfer of funds to the portable electronic device at 816 and transmit a digital ticket to the portable electronic device. The virtual digital ticket may be presented on the display and/or saved in a memory associated with the portable electronic device. In one embodiment, the virtual digital ticket may be encrypted using any known encryption method such as AES, MAC, HMAC, SHA-2, and the like.

Figure 9:
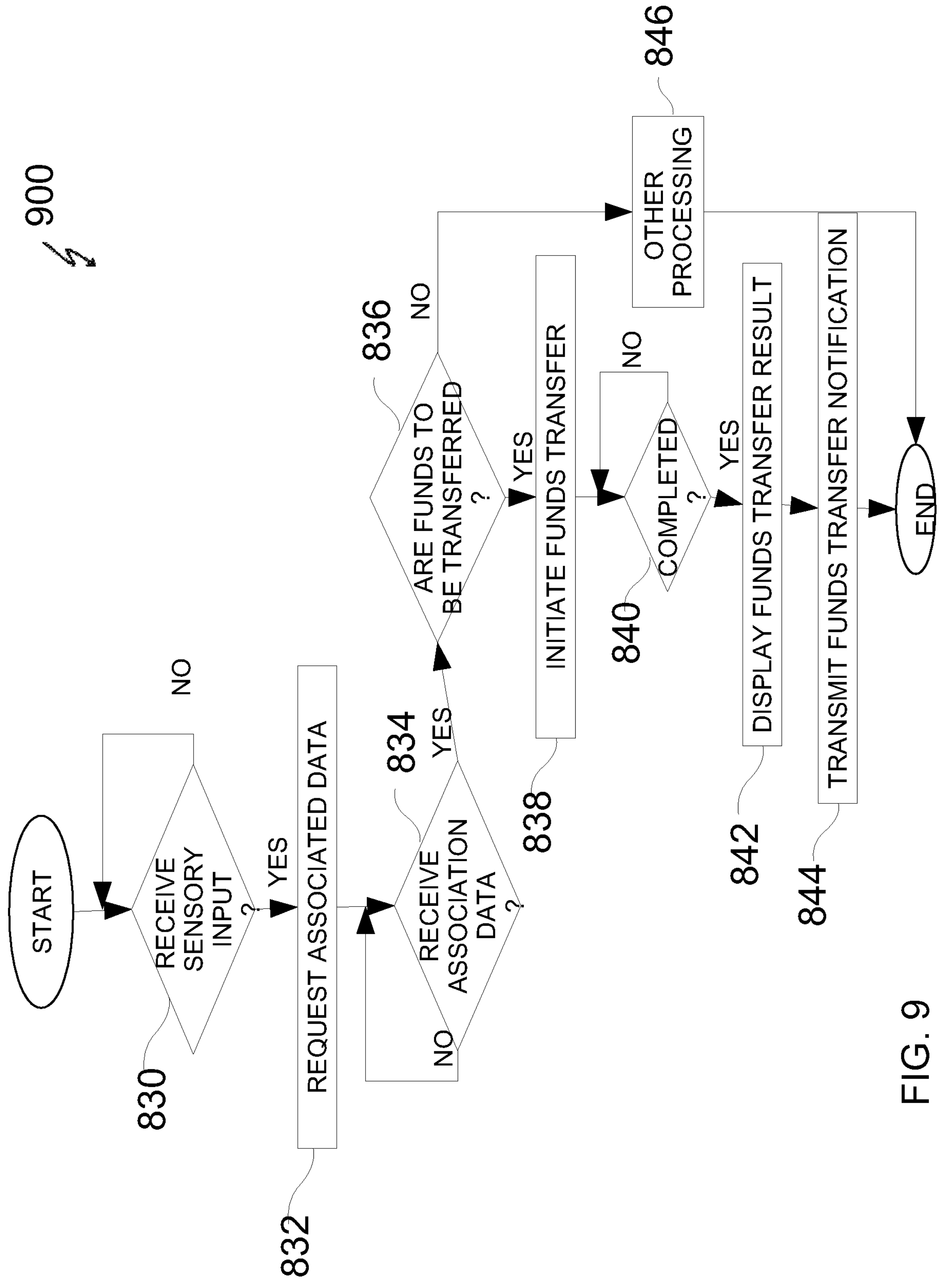
FIG. 9 illustrates an exemplary flow diagram of a method for transferring funds to a gaming device from a portable electronic device.

FIG. 9 illustrates an exemplary flow diagram of a method for transferring funds to a gaming device from a portable electronic device. The method 900 may begin with determining whether a sensory input is detected or received by a multi-functional peripheral device at 830. If no sensory input is detected or received, then the multi-functional peripheral device may continue to wait for a sensory input.

The sensory input may be detected or received by a sensor device associated with the multi-functional peripheral device. The sensory device may be any known device configured to detect and/or receive a sensory input. For example, the sensor device may be an accelerometer, camera, microphone, touchpad, retina scanner, radio frequency identification reader, near-field magnetic reader, or any other device capable of receiving and detecting sensory input.

The sensory input may be any type of known sensory input such as an audio, visual, and/or physical contact received from a user. The type of sensory input received or detected may be based on the sensory device. For example, a user may physically contact the sensor device via a tap, touch, or any other physical contact on a touchpad. The physical contact may initiated by the user (e.g. using a finger to tap the sensor device), physical object (e.g. pen, coin, and the like), and/or a remote device associated with the user. The remote device may, for example, be any portable computing device such as a cellular phone, portable media player, PDA, and the like. In another embodiment, the sensory input may be an audio input received by a microphone associated with the multi-functional peripheral device.

If the multi-functional peripheral device detects a sensory input at 830, the multi-functional peripheral device may request associated data from the portable electronic device at 832. The associated data may be any information or data necessary to complete a transfer of funds to the gaming machine such as: (i) the fund amount; (ii) the source of the funds; (iii) unique user ID and password; (iv) account information (e.g. bank routing number, checking account number, credit card number, and the like); (v) destination address (e.g. gaming machine identification to ensure funds are transferred to the proper gaming machine); (vi) location of the transaction, and any other necessary information to facilitate the transfer of funds to the gaming device. The gaming machine may be identified by any known methods such as MAC address, IP address, unique gaming machine identification, bar code on the gaming machine, location information for the gaming machine, and the like. For example, the user may manually input the unique gaming machine identification in the portable electronic device. In another embodiment, the user may scan a bar code on the gaming machine into the portable electronic device.

In one embodiment, verification the location of the gaming device and/or the location of the user's portable electronic device maybe required as additional parameters for a complete authorization of the transaction. Location data may be obtained automatically without needing the user inputs by various locating technology such as GPS, triangulation and trilateration with cellular towers, Wi-Fi access points locating, RF fingerprinting, and the like. For instance, Wi-Fi based location appliances, such as the Cisco Wireless Location Appliance™ manufactured by Cisco Systems, Inc. (San Jose, California, US), may be used as a location tracking system to determine the location of the portable electronic device and the gaming devices inside a casino.

It is common for the local gaming control jurisdiction to have rules regarding where gaming can take place and the maximum funds that can be transferred in a transaction. Location data of the gaming device, inferred by the location of the multi-functional peripheral device housed inside its cabinet, is desirable to verify that the gaming device is in a location where gaming is allowed, such as a casino. Similarly, location data of the portable electronic device is desirable to verify that the user initiating the funds transfer request is indeed near the verified location of an approved gaming device. Other transaction requirements such as fund transfer amount can also be verified as not to exceed allowable amount.

Once the multi-functional peripheral device receives the associated data at 834, the multi-functional peripheral device may process the associated data to determine whether funds are to be transferred at 836. In one embodiment, the associated data may be encrypted using any known encryption method such as AES, MAC, HMAC, SHA-2, and the like. The multi-functional peripheral device may parse the associated data for a unique user ID, password, fund amount, funding source (e.g. a bank routing and checking account number, player tracking account number, credit card number, and the like), transaction location, and any other information or data necessary to facilitate the transfer of funds.

If the multi-functional peripheral device determines that funds are to be transferred to the gaming device at 836, the multi-functional peripheral device may initiate a funds transfer at 838. On the other hand, if the multi-functional peripheral device determines that funds are not to be transferred to the gaming device 836, the multi-functional peripheral device may perform other processing functions at 846. Other processing functions may, for example, be determining whether the received sensory input is associated with playing a game of chance, social networking, or any other non-gaming functions. For example, a visual sensory input received by a camera may be used to play a game of chance. The camera may detect user gestures to represent user actions such as hit, stand, double down, and the like. In another example, a visual sensory input may be received by the camera to allow the player to video conference with friends within this social network.

If the funds transfer is completed at 840, the gaming device may display a funds transfer result on a display (e.g., display 208 as illustrated in FIG. 2A, display 256 as illustrated in FIG. 2B) of the gaming device at 842. The gaming device may display the additional funds transferred to the gaming machine as credits to allow the player to play the game of chance.

A funds transfer notification may be transmitted to the portable electronic device at 844 to inform the user of the successful transfer of funds. In one embodiment, the portable electronic device may display a successful funds transfer notification informing the user of the completion of the transfer of funds as well as the total amount of credits that are on the gaming machine. Additionally, the multi-function peripheral device may also send a digital receipt of the transaction record to the portable electronic device as well as storing a copy in its own memory for accounting, auditing, dispute resolution, and verification purposes.

Figure 10:
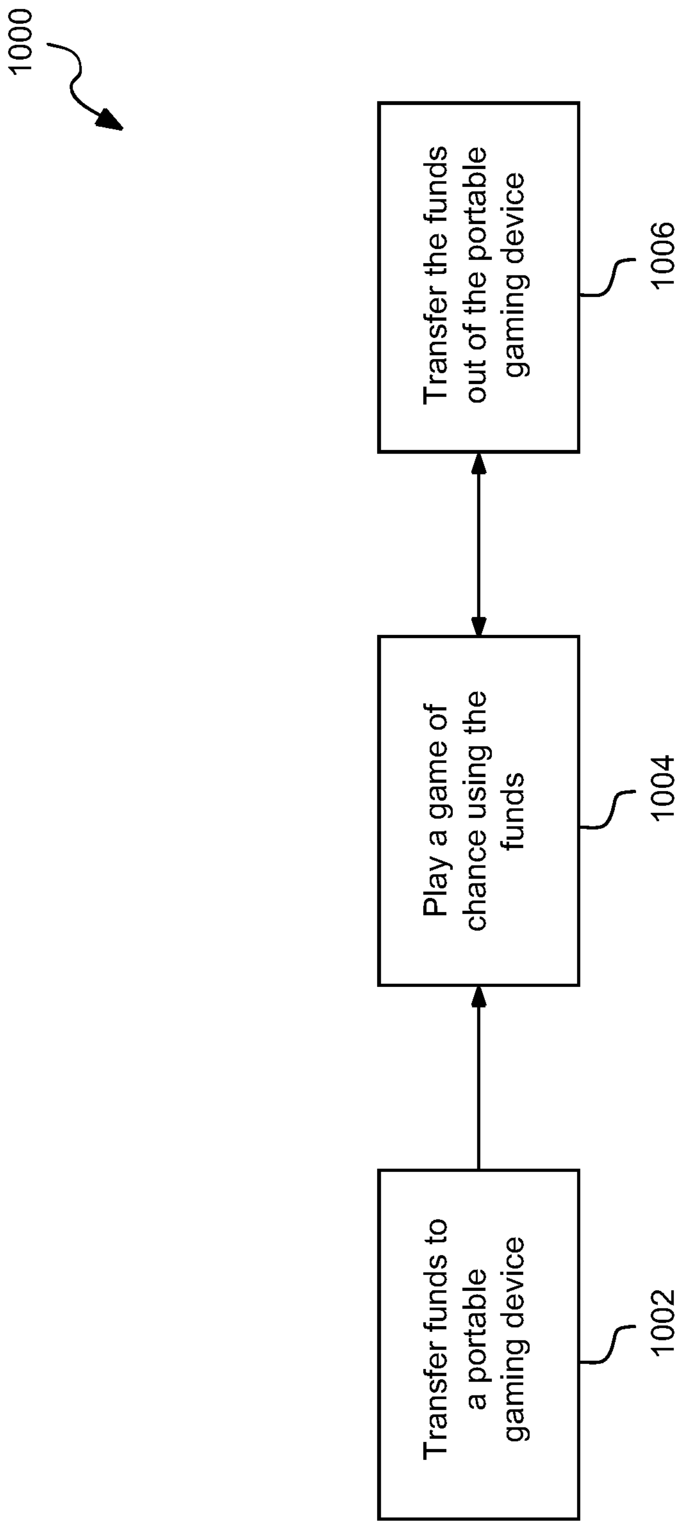
FIG. 10 illustrates a block diagram of example states of operation for the transfer of funds.
Figure 11:
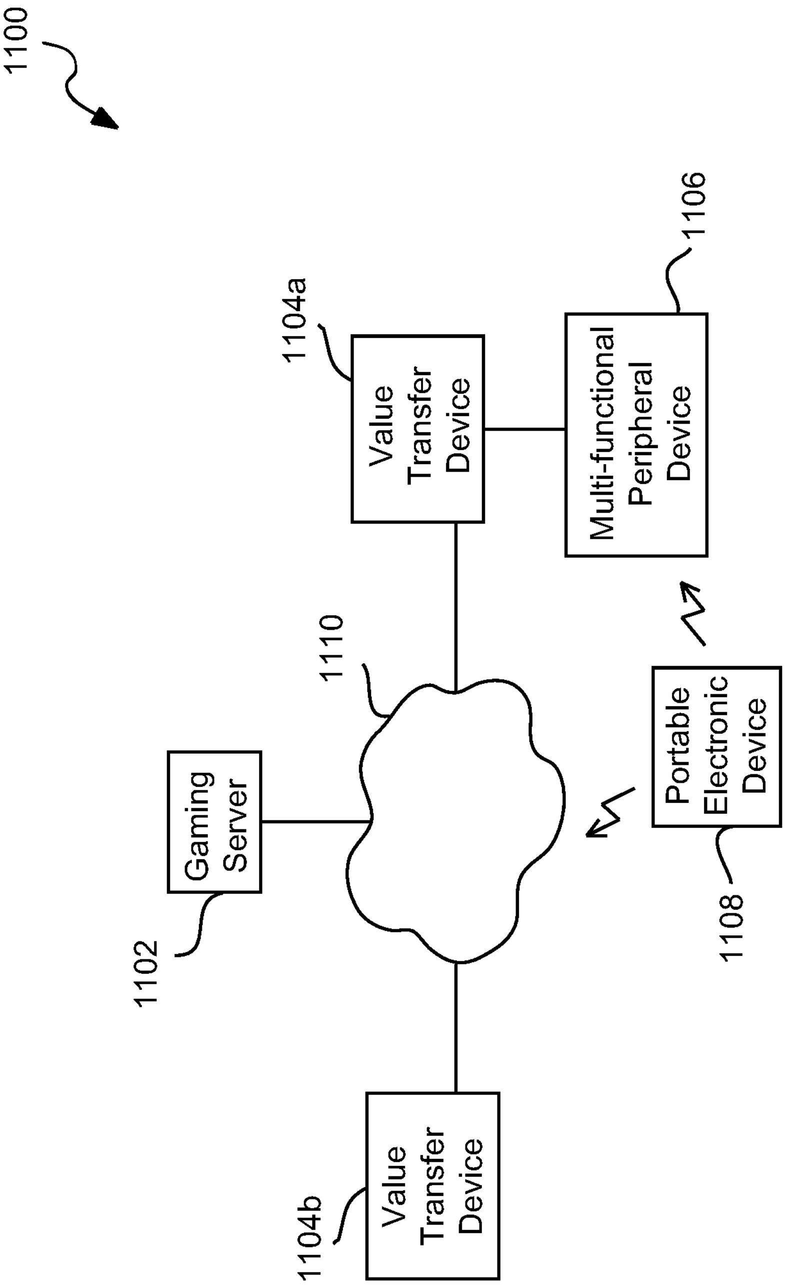
FIG. 11 illustrates an example fund transfer system.
Figure 12:
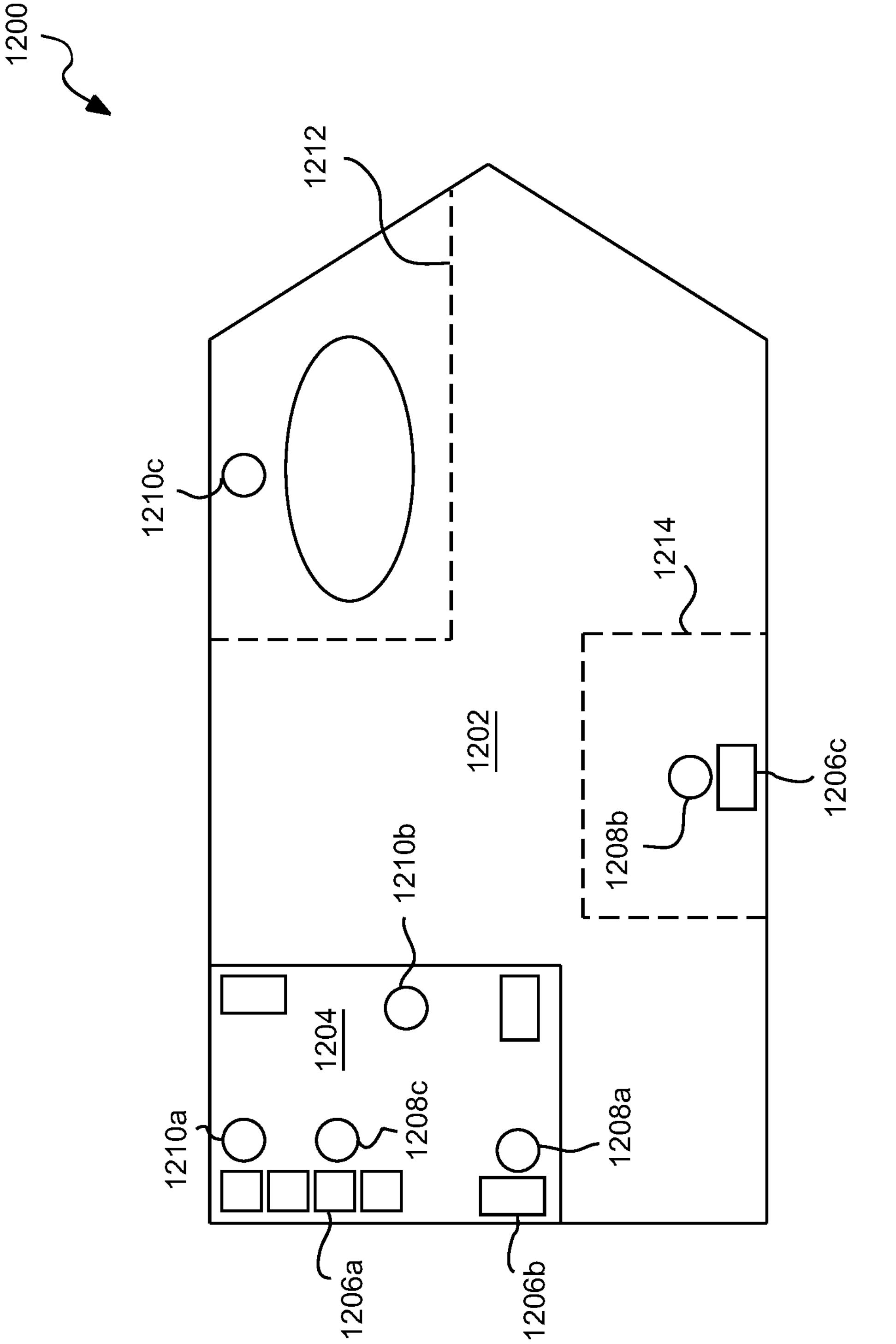
FIG. 12 illustrates an example gaming environment.

FIG. 10 illustrates a block diagram of example states of operation for the transfer of funds. States of operation for fund transfer may occur in a gaming environment (e.g. as illustrated in FIG. 12) and may be performed using a fund transfer system (e.g. as illustrated in FIG. 11).

During a transfer of funds to a portable electronic device state 1002, a user may transfer funds from a value transfer device to a portable electronic device, as described, for example in detail with reference to FIG. 7D. The portable electronic device can be any portable electronic device configured to play a game of chance, such as a cellular phone, smartphone, portable media player, tablet computer, laptop computer, PDA, or the like. During the transfer of funds to a portable electronic device state 1002, the value transfer device may detect a sensory input from the portable electronic device. A fund amount to be transferred can be determined as well as any other transfer criteria. The fund amount can be transferred to the portable electronic device.

In one embodiment, the value transfer device can be a gaming machine, such as a slot machine, video poker machine, and any other machine configured to play a game of chance. The gaming machine may have a multi-functional peripheral device. If the value transfer device is a gaming machine, the transfer of funds to a portable electronic device state 1002 may occur in a gaming section of the gaming environment. The gaming section may be a portion of the gaming environment authorized for gaming machines configured to play a game of chance.

In another embodiment, the value transfer device can be a non-gaming machine, such as a kiosk, a portable electronic device, information terminal, automatic teller machine, or the like. The non-gaming machine can have the multi-functional peripheral device. If the value transfer device is a non-gaming machine, the transfer of funds to a portable electronic device state 1002 can occur in the gaming section or a non-gaming section of the gaming environment. For example, on a cruise ship, a plurality of slot machines may reside in a casino, while a plurality of kiosks may reside both within the cruise ship and other non-gaming areas of the cruise ship.

The transferred fund amount may be used to play a game of chance at state 1004. The user may play a game of chance with the funds transferred to the portable electronic device. In one embodiment, the user can play the game of chance on the portable electronic device via a representation on the portable electronic device. The representation can be a game terminal application configured to receive a plurality of game data generated by the gaming machine. In another example, the representation may be configured to receive the plurality of game data generated by a gaming server.

The user may perform at least one gaming input using an input mechanism (e.g. buttons, joystick, keyboard, and the like) of the portable electronic device. The portable electronic device may transmit the input to the gaming machine or the gaming server for execution. In another embodiment, the user can play the game of chance on the portable electronic device using a game of chance program. The game of chance program may be configured to generate the plurality of game data and execute the at least one gaming input on the portable electronic device. If the user plays the game of chance on the portable electronic device, game of chance using the transfer fund amount at state 1004 may occur in the gaming section or the non-gaming section.

In yet another embodiment, the user can play the game of chance on a gaming machine. For example, after transferring funds to the portable electronic device, the user may walk around the gaming environment to locate a gaming machine of interest. Upon locating the gaming machine of interest, the user may transfer the funds to the gaming machine of interest during a transfer of funds out the portable electronic device at state 1006. The user may transfer the funds from the portable electronic device to the gaming machine of interest.

During the transfer the funds out of the portable electronic device at state 1006, the funds may be transferred to a value transfer device. The value transfer device may detect a presence of the portable electronic device and authenticate the portable electronic device. The value transfer device can then receive a fund transfer request. The value transfer device may initiate transfer of the funds to the value transfer device to play a game of chance on the gaming machine.

FIG. 11 illustrates an example fund transfer system 1100. The fund transfer system 1100 can be used in a gaming environment (e.g., the gaming environment described and illustrated in FIG. 12). States of operation for a fund transfer (e.g., as described and illustrated in FIG. 10) may be performed via the fund transfer system 1100. The fund transfer system 1100 may include a gaming server 1102, at least one value transfer device 1104*a-b*, a multi-functional peripheral device 1106, a portable electronic device 1108, and a network 1110. Although FIG. 11 is illustrated with one portable electronic device, one multi-functional peripheral device, and one gaming server, this is not intended to be limiting as there may be any number of portable electronic devices, multi-functional peripheral devices, and servers. For example, value transfer device 1104*b* may also have a multi-functional peripheral device.

Network 1110 can be configured to provide and allow communication between the gaming server 1102, the at least one value transfer device 1104*a-b*, the multi-functional peripheral device 1106 (as illustrated in FIGS. 4C, 4D, 4E), and the portable electronic device 1108. The network 1110 can use any combination of wireless and wired communications technology such as IEEE 802.11x, cellular technology such as 3G and 4G, radio frequency, Ethernet cabling, and the like.

The gaming server 1102 can be configured to communicate with other servers, such as a player tracking server, authentication server, TITO server, social networking server, and the like. In one embodiment, if the at least one value transfer device 1104*a-b* is a gaming machine, the gaming server 1102 may transmit game of chance software to the at least one value transfer device 1104*a-b* for execution by the at least one value transfer device 1104*a-b*.

In one embodiment, the gaming server 1102 may facilitate playing a game of chance on the portable electronic device 1108. The gaming server 1102 may facilitate playing the game of chance on the portable electronic device 1108 by generating a plurality of game data for the game of chance. The plurality of game data can be presented to a player using a graphical user interface of the portable electronic device 1108. In an embodiment, the gaming server 1102 may transmit the plurality of game data to the portable electronic device 1108 via the network 1110. In another embodiment, the gaming server 1102 can transmit the plurality of game data to one of the at least one value transfer devices 1104*a*. The one of the at least one value transfer devices 1104*a* may be operative with the multi-functional peripheral device 1106. The multi-functional peripheral devices 1106 can wireless transmit the plurality of game data to the portable electronic device 1108.

The at least one value transfer device 1104*a-b* can transfer funds to and from the portable electronic device 1108. The at least one value transfer device 1104*a-b* can transfer funds by detecting a sensory input from the portable electronic device 1108, identifying a fund amount to be transferred, and initiating transfer of funds. The at least one value transfer device 1104*a-b* can be a gaming machine, automatic teller machine, kiosk, another portable electronic device, information terminal, or any other primary machine from which funds can be transferred to and from the portable electronic device 1108. If the at least one value transfer device 1104*a-b* is a gaming machine, the game of chance can be played on the gaming machine. In one embodiment, the at least one value transfer device 1104*a* may be operative with the multi-functional peripheral device 1106. In another embodiment, the multi-functional peripheral device 1106 can be integrated into the at least one value transfer device 1104*b*. The multi-functional peripheral device 1106 may be the multi-functional peripheral device as described and illustrated in FIGS. 4C, 4D, and 4E.

The portable electronic device 110 can be a cellular phone, smartphone, portable media player, tablet computer, laptop computer, PDA, or the like. The portable electronic device 1108 can have a processor, a display, an input device and a PED memory. The processor may be configured to communicate with the multi-functional peripheral device 1106, the at least one value transfer device 1104*a-b*, and the gaming server 1102. The display can be any display technology commonly used in portable electronic devices, such as LCD, OLED, AMOLED, and the like. The input device may be any mechanism commonly used to make inputs, such as a button, key, touch screen, microphone, and the like.

The PED memory may be configured to store a PED software module. The PED software module may include a fund management application configured to facilitate transfer of funds. The PED software module can include a game application. In one embodiment, the game application may generate the plurality of game data for the game of chance. In another embodiment, the game application may present the plurality of game data received from the gaming server 1102. Any programs or application of the PED software module, including the fund management application and the game application, may be presented on the display of the portable electronic device 1108 using a graphical user interface.

In one embodiment, where the gaming server 1102 generates the plurality of game data, the player may play the game of chance by performing at least one game input using the input device of the portable electronic device which can be transmitted to the gaming server 1102, for execution, over the network 1110. In another embodiment, where the portable electronic device 1108 generates the plurality of game data, the at least one game input can be processed and executed by the processor of the portable electronic device.

FIG. 12 illustrates an example gaming environment. Although the gaming environment 1200 is illustrated as a ship, this is not intended to be limiting as the gaming environment 1200 can be any environment where a game of chance may be played, such as a casino, race track, restaurant, shopping center, airport, fair ground, and the like.

The gaming environment 1200 may have at least one gaming section 1204 and at least one non-gaming section 1202. The gaming section 1204 may be a portion of the gaming environment 1200 authorized to house gaming machines configured to play a game of chance. The non-gaming section 1202 can be any portion of the gaming environment where no gaming machines are housed.

As illustrated, the gaming environment may be a cruise ship. The gaming section 1204 may be a specific area whereby a plurality of gaming machines is housed. The non-gaming section 1202 may be the remaining areas of the cruise ship such as a dining area (e.g., such as a restaurant, a bar 1214, a cafeteria, and the like); the cabins or rooms; an entertainment area; or recreation areas (e.g., pool 1212, gym, basketball court, and the like).

The gaming environment 1200 may have a plurality of value transfer devices 1206*a-c*. The value transfer device 1206*a-c* may be a gaming machine, automatic teller machine, kiosk, another portable electronic device, information terminal, and the like. The value transfer devices 1206*a-c* may be configured to transfer funds to and from of the gaming machines and/or portable electronic devices as described above.

The at least one gaming machines may be located in the gaming section 1204 and configured to transfer funds to and from the portable electronic device as well as allow the user to play a game of chance. The at least one automatic teller machine, the at least one kiosk, the at least one other portable electronic device, and the at least one information terminal can be located in the gaming section 1204 and the non-gaming section 1202 and configured to transfer funds to and from the portable electronic device.

Users of the gaming environment 1200 can transfer funds to and from the portable electronic device. In one embodiment, the users can transfer funds to and from the portable electronic device using a value transfer device 1206*a-b* of the gaming section 1204. For example, a user 1208*a* can transfer funds to or from a smartphone using an information terminal 1206*b* of the cruise casino. In another example, a user 1208*c* may transfer funds to or from a netbook computer of the user 1208*c* using a slot machine 1206*a* of the cruise casino. In another embodiment, the plurality of users can transfer funds to and from the portable electronic device us a value transfer device 1206*c* of the non-gaming section 1202. For example, a user 1208*b* can transfer funds to or from a personal digital assistant using an automatic teller machine 1206*c* positioned at or near the bar 1214, the non-gaming section 1202 of the cruise ship gaming environment.

Users of the gaming environment 1200 can play a game of chance. In one embodiment, the plurality of users can play the game of chance on the at least one gaming machine 1206*a*. If the game of chance is played on the at least one gaming machine, the game of chance can be played in the gaming section 1204. For example, a user 1210*a* can be playing video poker with funds transferred to a laptop of the user 12010*a* at a video poker machine in the cruise casino. In another embodiment, the plurality of users can play the game of chance on the portable electronic device. If the game of chance is played on the portable electronic device, the game of chance can be played in the gaming section 1204 or the non-gaming section 1202. For example, a user 1210*b* can play a Wheel of Fortune game of chance on a portable media player while on the cruise casino. Gaming data for the Wheel of Fortune game of chance may be generated on the portable electronic device of the user 1210*b*. Gaming data for the Wheel of fortune game of chance may also be generated on a Wheel of Fortune gaming machine and streamed to the portable electronic device of user 1210*b*. In another example, user 1210*c* can play a blackjack game of chance on a tablet computer while the user 1210*c* is sitting in the pool 1212, the non-gaming section 1202 of the cruise boat gaming environment.

Additional details on peripheral devices for gaming machines are provided in U.S. patent application Ser. No. 12/945,889, entitled "PERIPHERAL MANAGEMENT DEVICE FOR VIRTUAL GAME INTERACTION," filed Nov. 14, 2010, and hereby incorporated herein by reference.

While embodiments and applications of this invention have been shown and described, it would be apparent to those skilled in the art having the benefit of this disclosure that many more modifications than mentioned above are possible without departing from the inventive concepts herein. For example, although illustrated with use in a gaming environment, this is not intended to be limiting as other uses are contemplated, such as in a banking machine, snack or drink machine at an educational environment, grocery store, gas station and the like.

What is claimed is:

1. A method for electronically transferring funds from an electronic gaming device, the method comprising:

storing, in memory circuitry of the electronic gaming device, a cashable credit value available to play a game of chance on the electronic gaming device;

receiving, by a sensor of a cashless wagering system of the electronic gaming device, a sensory input from a debit instrument, the sensor comprising an accelerometer, a near field magnetic reader, or a Bluetooth sensor;

determining, using the processing circuitry of the electronic gaming device, whether the sensory input indicates that the debit instrument is in close proximity to the electronic gaming device, wherein determining whether the sensory input indicates that the debit instrument is in close proximity to the electronic gaming device comprises accessing a proximity setting stored in the memory circuitry of the electronic gaming device, and determining whether the sensory input indicates the debit instrument is within a threshold distance of the electronic gaming device, the proximity setting indicating the threshold distance;

in response to the sensory input indicating that the debit instrument is in close proximity to the electronic gaming device, establishing a wireless connection between the debit instrument and the electronic gaming device;

receiving from the debit instrument, at the electronic gaming device, by the wireless connection, a request to electronically transfer the cashable credit value from the electronic gaming device to a wagering account associated with the debit instrument, as well as a transfer parameter identifying the wagering account; and processing the request by processing circuitry of the electronic gaming device to electronically transfer the cashable credit value from the electronic gaming device to the wagering account.

2. The method as recited in claim 1, wherein the sensor is not an RFID sensor.

3. The method as recited in claim 1, wherein the sensor comprises the Bluetooth sensor.

4. The method as recited in claim 1, wherein the debit instrument comprises a device with which a patron can initiate an electronic transfer of funds to the electronic gaming device or initiate an electronic debit.

5. The method as recited in claim 1, wherein processing the request comprises: communicating with a server associated with the wagering account or initiating an electronic transfer program stored in the memory circuitry of the electronic gaming device.

6. The method as recited in claim 1, wherein the wireless connection is established by a wireless communication device of the electronic gaming device.

7. The method as recited in claim 6, wherein the cashless wagering system comprises a value receiving device, the wireless communication device, the processing circuitry, and the memory circuitry.

8. The method as recited in claim 1, wherein the debit instrument is considered to be in close proximity to the electronic gaming device if the debit instrument is within three inches of the electronic gaming device.

9. A non-transitory computer readable medium comprising machine readable instructions which, when executed by a processor, cause the processor to:

store a cashable credit value available to play a game of chance on an electronic gaming device;

determine whether a sensory input from the debit instrument at a sensor of the electronic gaming device indicates that the debit instrument is within a threshold proximity of the electronic gaming device, the sensor comprising an accelerometer, or a Bluetooth sensor, wherein determining whether the sensory input indicates that the debit instrument is in the threshold proximity of the electronic gaming device comprises accessing a proximity setting stored in memory circuitry of the electronic gaming device, and determining whether the sensory input indicates the debit instrument is within a threshold distance of the electronic gaming device, the proximity setting indicating the threshold distance;

establish a wireless connection between a debit instrument and the electronic gaming device in response to determining that the debit instrument is within the threshold proximity of the electronic gaming device;

process an electronic transfer request received from the debit instrument through the wireless connection, the electronic transfer request being a request to electronically transfer the cashable credit value from the electronic gaming device to a wagering account associated with the debit instrument; and electronically transfer the cashable credit value to the wagering account according to one or more transfer parameters associated with the electronic transfer request.

10. The non-transitory computer readable medium of claim 9, wherein electronically transferring the cashable credit value to the wagering account comprises communicating with a server associated with the wagering account.

11. The non-transitory computer readable medium of claim 9, wherein the threshold distance comprises three inches.

12. The non-transitory computer readable medium of claim 9, wherein the one or more transfer parameters identify the wagering account, or comprise credentials of a patron associated with the wagering account and the debit instrument.

13. The non-transitory computer readable medium of claim 9, wherein the debit instrument comprises a device with which a patron can initiate an electronic transfer of funds to the electronic gaming device or initiate an electronic debit.

14. A method for initiating an electronic fund transfer from an electronic gaming device by a debit instrument, the method comprising:

providing, by the debit instrument, a sensory input to a sensor of the electronic gaming device, the sensory input also being received by a sensor device of the debit instrument;

establishing a wireless connection between the debit instrument and the electronic gaming device using a wireless communication module of the debit instrument;

determining a function associated with the sensory input via processing circuitry of the debit instrument, wherein determining the function comprises accessing, via the processing circuitry, a sensory database of the debit instrument, the sensory database storing at least one sensory input and at least one sensory associated function, the at least one sensory input comprising the sensory input, and the at least one sensory associated function comprising the electronic transfer function;

in response to determining the function associated with the sensory input is an electronic transfer function, sending an electronic transfer request from the debit instrument to the electronic gaming device through the wireless connection, the electronic transfer request indicating that a cashable credit value available to play a game of chance on the electronic gaming device should be transferred to a wagering account associated with the debit instrument; and accessing, at the debit instrument, the cashable credit value in the wagering account.

15. The method of claim 14, further comprising sending one or more transfer parameters from the debit instrument to the electronic gaming device through the wireless connection, the one or more transfer parameters identifying the wagering account, or comprising credentials of a patron associated with the wagering account and the debit instrument.

16. The method of claim 14, wherein the debit instrument comprises a device with which a patron can initiate an electronic transfer of funds to the electronic gaming device or initiate an electronic debit.

17. The method of claim 14, wherein the sensory input indicates that the debit instrument is proximate to the electronic gaming device.

18. The method of claim 14, wherein the sensor comprises an accelerometer, a near field magnetic reader, or a Bluetooth sensor.

19. The method of claim 18, wherein the sensor comprises the Bluetooth sensor.

20. The method of claim 14, wherein the game of chance comprises a first game of chance, and the method further comprises playing a game of chance on the debit instrument using the cashable credit value in the wagering account.

* * * * *